US012669990B2

(12) United States Patent
Portisch et al.

(10) Patent No.: US 12,669,990 B2
(45) Date of Patent: Jun. 30, 2026

(54) INTELLIGENT UPDATE OF APPLICATION PROGRAMMING INTERFACES

(71) Applicant: SAP SE, Walldorf (DE)

(72) Inventors: Jan Portisch, Bruchsal (DE); Sandra Bracholdt, Dielheim (DE)

(73) Assignee: SAP SE, Walldorf (DE)

( * ) Notice: Subject to any disclaimer, the term of this patent is extended or adjusted under 35 U.S.C. 154(b) by 381 days.

(21) Appl. No.: 18/357,023

(22) Filed: Jul. 21, 2023

(65) Prior Publication Data

US 2025/0028518 A1    Jan. 23, 2025

(51) Int. Cl.
| | |
|---|---|
| *G06F 8/658* | (2018.01) |
| *G06F 8/61* | (2018.01) |
| *G06F 8/65* | (2018.01) |
| *G06F 9/54* | (2006.01) |
| *G06F 11/00* | (2006.01) |

(52) U.S. Cl.
CPC .................. *G06F 8/65* (2013.01); *G06F 8/61* (2013.01); *G06F 9/541* (2013.01)

(58) Field of Classification Search
CPC ..... G06F 8/61; G06F 8/65; G06F 8/36; G06F 8/71; G06F 8/658; G06F 9/541; G06N 5/022
See application file for complete search history.

(56) References Cited

U.S. PATENT DOCUMENTS

| | | | | |
|---|---|---|---|---|
| 8,510,762 | B1 * | 8/2013 | Gregorio | .................. G06F 8/36 |
| | | | | 717/106 |
| 10,853,150 | B1 | 12/2020 | Bahrami | |
| 10,929,211 | B1 | 2/2021 | Mylavarapu | |
| 11,790,892 | B1 | 10/2023 | Kessler | |
| 2013/0326481 | A1 | 12/2013 | Kannan | |
| 2015/0007202 | A1 | 1/2015 | Doerpmund | |
| 2017/0337052 | A1 | 11/2017 | Elkabany | |
| 2019/0303135 | A1 * | 10/2019 | Li | ........................... G06F 8/658 |

(Continued)

FOREIGN PATENT DOCUMENTS

| | | | | |
|---|---|---|---|---|
| EP | 3846089 | A1 * | 7/2021 | ............. G06N 5/022 |
| WO | WO 2021010977 | | 1/2021 | |
| WO | WO-2021010977 | A1 * | 1/2021 | ............. G06N 5/022 |

OTHER PUBLICATIONS

Extended European Search Report, European Application No. 24160854. 6, 10 pages, Jul. 25, 2024.

(Continued)

*Primary Examiner* — S. Sough
*Assistant Examiner* — Mohammad H Kabir
(74) *Attorney, Agent, or Firm* — Klarquist Sparkman, LLP

(57) ABSTRACT

A computer-implemented method can specify a source version and a target version of an application programming interface (API) and a target programming language; and retrieve a difference graph connecting from a source knowledge graph characterizing the source version of the API to a target knowledge graph characterizing the target version of the API. The difference graph includes one or more revision edges representing changes of the API between the source version and the target version. The method can install one or more function packages written in the target programming (Continued)

Specify a source version and a target version of an API and a target programming language;. 2310

Retrieve a difference graph connecting from a source knowledge graph characterizing the source version of the API to a target knowledge graph characterizing the target version of the API. 2320

Install one or more function packages written in the target programming language and associated with one or more revision edges of the difference graph. 2330

Run the one or more function packages to update the API from the source version to the target version. 2340

2300 language and associated with the one or more revision edges; and run the one or more function packages to update the API from the source version to the target version.

20 Claims, 41 Drawing Sheets

(56)                    References Cited

U.S. PATENT DOCUMENTS

| | | |
|---|---|---|
| 2020/0226185 A1 | 7/2020 | Yan |
| 2021/0089291 A1 | 3/2021 | Evans et al. |
| 2021/0385124 A1 | 12/2021 | Roy |
| 2023/0025896 A1 | 1/2023 | Levin |
| 2023/0171244 A1 | 6/2023 | Peddada |
| 2023/0342587 A1 | 10/2023 | McCreary |
| 2024/0184829 A1 | 6/2024 | Roy |

OTHER PUBLICATIONS

De Oliveira Arantes, "An Infrastructure for Managing Semantic Documents," 2010 14th IEEE International Enterprise Distributed Object Computing Conference Workshops, pp. 235-244, Oct. 25, 2010.

Extended European Search Report, European Application No. 24182974. 6, 9 pages, Jul. 25, 2024.

Tim Burks, "The API Registry API, Google Open Source Blog," Apigee API Lifecyle and Governance, https://opensource.googleblog. com/2021/01/the-api-registry-api.html, Jan. 8, 2021, 2 pages.

"Comparison of WSDL & OpenAPI API Documentation Formats," https://www.achieveinternet.com/post/comparison-of-wsdl-openapi-api-documentation-formats, printed Feb. 3, 2023, 5 pages.

Cognos Analytics, "Cardinality in Generated Queries," Cardinality in generated queries—IBM Documentation, https://www.IBM.com/ docs/en/cognos-analytics/11.1.0?topic=SSEP7J_11.1.0/com.IBM. swg.ba.cognos.ug_fm.doc/c_how_cardinality_used.htm, Printed Feb. 3, 2023, 2 pages.

Cieszko et al., "Graph Based Messaging APIs—concept and implementation," Proceedings of the FEDCSIS, Warsaw, Poland, 2014, DOI: 10.15439/2014F192, ACSIS, vol. 2, pp. 925-932.

Ontotext, "What is an RDF Triplestore?", Ontotext Fundamentals, printed Feb. 3, 2023, https://www.ontotext.com/knowledgehub/ fundamentals/what-is-rdf-triplestore/, 6 pages.

WhatIs.com, "What is Swagger?", API design and management, Definition Swagger, https://www.techtarget.com/searchapparchitecture/ definition/Swagger#:~:text=Swagger is an open source,and human-readable API documentation, printed Feb. 3, 2023, 3 pages.

\* cited by examiner

Receive a software code of an API. 610

Instantiate a plurality of nodes representing metadata objects and data values associated with the API. 630

Ceate a plurality of edges connecting the plurality of nodes. 640

Generate a knowledge graph representation of the API based on the software code of the API. 620

600

700

```
<?xml version="1.0" encoding="UTF-8"?>
<soapenv:Envelope xmlns:soapenv="http://schemas.xmlsoap.org/soap/envelope/" xmlns:glob="http://s
    <soapenv:Header>
        <messageId xmlns="http://www.sap.com/webas/640/soap/features/messageid/">urn:uuid:911241:
    </soapenv:Header>
    <soapenv:Body>
        <glob:CostCentreReplicationBulkRequest>
            <MessageHeader>
                <CreationDateTime>2020-07-07T15:00:00.12345672</CreationDateTime>
            </MessageHeader>
            <CostCentreReplicationRequestMessage>
                <CostCentre actionCode=" " nameListCompleteTransmissionIndicator="false">
                    <ID>A0002CCTEST1</ID>
                    <BusinessCharacterValidityPeriod>
                        <!--Optional:-->
                        <StartDate>2020-07-07</StartDate>
                        <!--Optional:-->
                        <EndDate>9999-12-31</EndDate>
                    </BusinessCharacterValidityPeriod>
                    <!--Zero or more repetitions:-->
                    <Name actionCode="">
                        <Name languageCode="EN">TEST CC IN</Name>
                        <Description languageCode="EN">TEST CC IN </Description>
                    </Name>
                    <!--Optional:-->
                    <Attributes>
                        <CompanyFinancialAccountingEntityID>1010</CompanyFinancialAccountingEntityID>
                        <CostCentreTypeCode>F</CostCentreTypeCode>
                        <!--Optional:-->
                        <AccountingBusinessAreaCode listVersionID=" " listAgencyID=" "> </AccountingBus
                        <!--Optional:-->
                        <TaxJurisdictionCode listID=" " listVersionID=" " listAgencyID=" " listAgencyS
                        <!--Optional:-->
                        <ExpenseClassificationFunctionalAreaCode listID=" " listVersionID=" " listVersi
                        <!--Optional:-->
                        <LONG_ExpenseClassificationFunctionalAreaCode listID=" " listVersionID=" " list
                        <!--Optional:-->
                        <CurrencyCode> </CurrencyCode>
```

| Node or Field | Description | Cardinality |
|---|---|---|
| ID | Concatenation of 4-digit controlling area and max 10-digit cost center<br><br>Maximum field length: 20 | 1 |

820

| Node or Field | | Description | Cardinality |
|---|---|---|---|
| BusinessCharacterValidityPeriod<br><br>Cardinality: 1 | StartDate | Format: YYYY-MM-DD | 1 |
| | EndDate | Format: YYYY-MM-DD | 1 |

830

| Node or Field | | | Description | Cardinality |
|---|---|---|---|---|
| Name<br><br>Cardinality:<br>0...unbounded | Name | languageCode | Name of Cost Center<br><br>Maximum field length: 20 | 1 |
| | Description | languageCode | Description of Cost Center<br><br>Maximum field length: 40 | 0..1 |
| | actionCode | | You can use the following values:<br><br>02 - Update<br><br>03 - Delete<br><br>04 - Modify<br><br>Initial - Create<br><br>Maximum field length: 2 | 0..1 |

840

| Node or Field | | Description | Cardinality |
|---|---|---|---|
| Attributes<br><br>Cardinality: 0..1 | CompanyFinancialAccountingEntityID | Company Code<br><br>Maximum field length: 4 | 1 |
| | HomeBusinessSystemID | Product Availability Requirement Business System ID<br><br>Maximum field length: 60 | 0..1 |
| | CostCentreTypeCode | Indicator used to define | 1 |

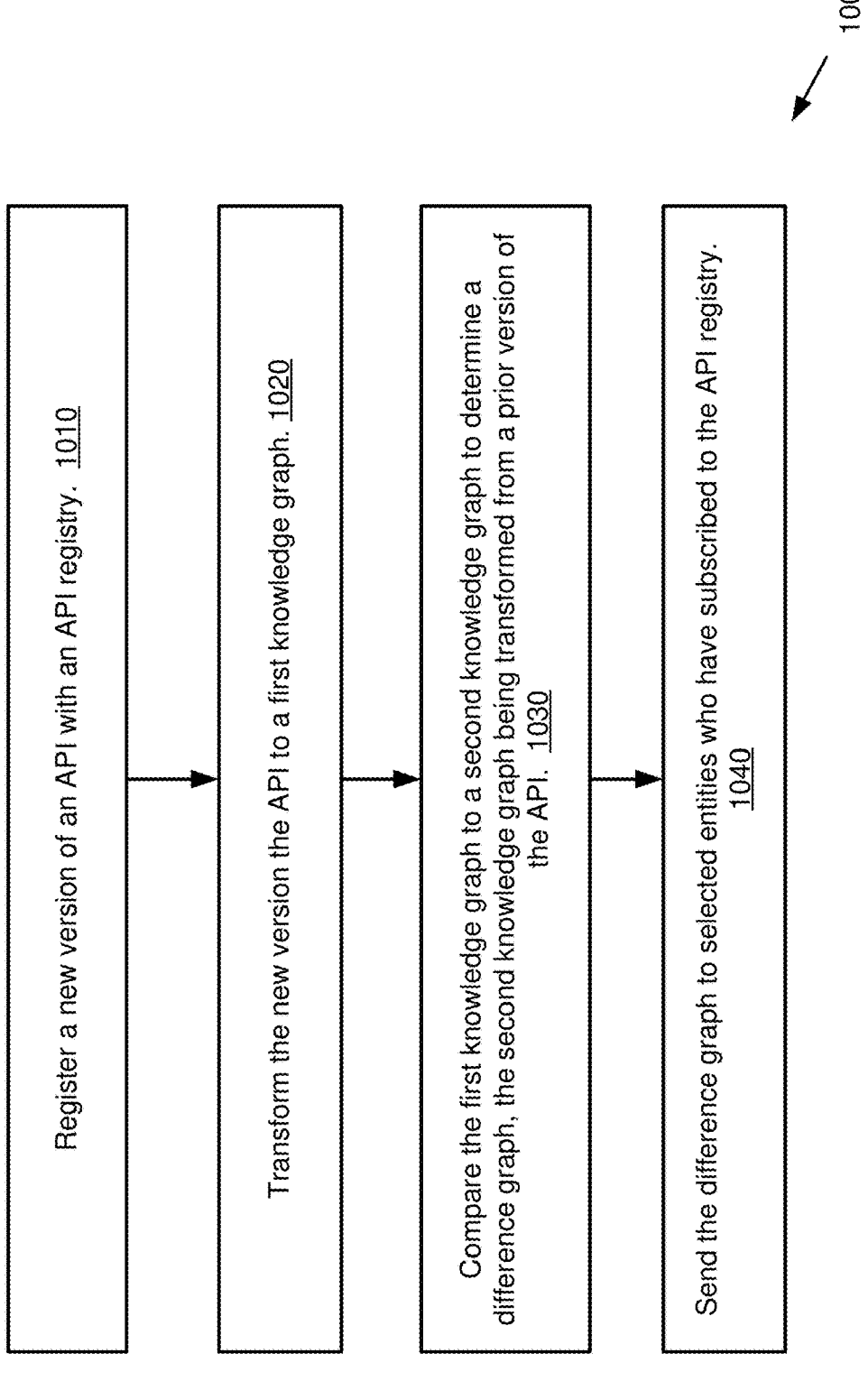

1000

Register a new version of an API with an API registry. 1010

Transform the new version the API to a first knowledge graph. 1020

Compare the first knowledge graph to a second knowledge graph to determine a difference graph, the second knowledge graph being transformed from a prior version of the API. 1030

Send the difference graph to selected entities who have subscribed to the API registry. 1040

Receive a first knowledge graph transformed from a first version of an API. 1110

Receive a second knowledge graph transformed from a second version of the API. 1120

Identify changes from the second knowledge graph to the first knowledge graph. 1130

Generate a difference graph based on the identified changes. 1140

2210 API Subscription

2220 Configuration Selection

2230 Action Recommendation

2240 Recommendation Implementation

2250 Solution Provisioning (optional)

2200

Specify a source version and a target version of an API and a target programming language:. 2310

Retrieve a difference graph connecting from a source knowledge graph characterizing the source version of the API to a target knowledge graph characterizing the target version of the API. 2320

Install one or more function packages written in the target programming language and associated with one or more revision edges of the difference graph. 2330

Run the one or more function packages to update the API from the source version to the target version. 2340

```
Import java.util.Map;

/**
 * Exemplary interface for standard action in Java.
 * @param <InputType> The input type (type of the node of the source API).
 * @param <ReturnType> The type that is returned by the standard action (type of the node of the target API).
**/
Public interface standardAction<InputType, ReturnType> {

/**
 * Exemplary generic method of the standard action.
 * @param input          The source node value.
 * @param parameters     A generic construct for parameters. The key of the map refers to the parameter name,
                         the value represents the parameter value.
 * @return               The value as it would be represented in the target API.
 * @throws Exception     Any exception.
**/
ReturnType standardAction {
    InputType     input,
    Map<String, Object> parameters)
    throws Exeption;

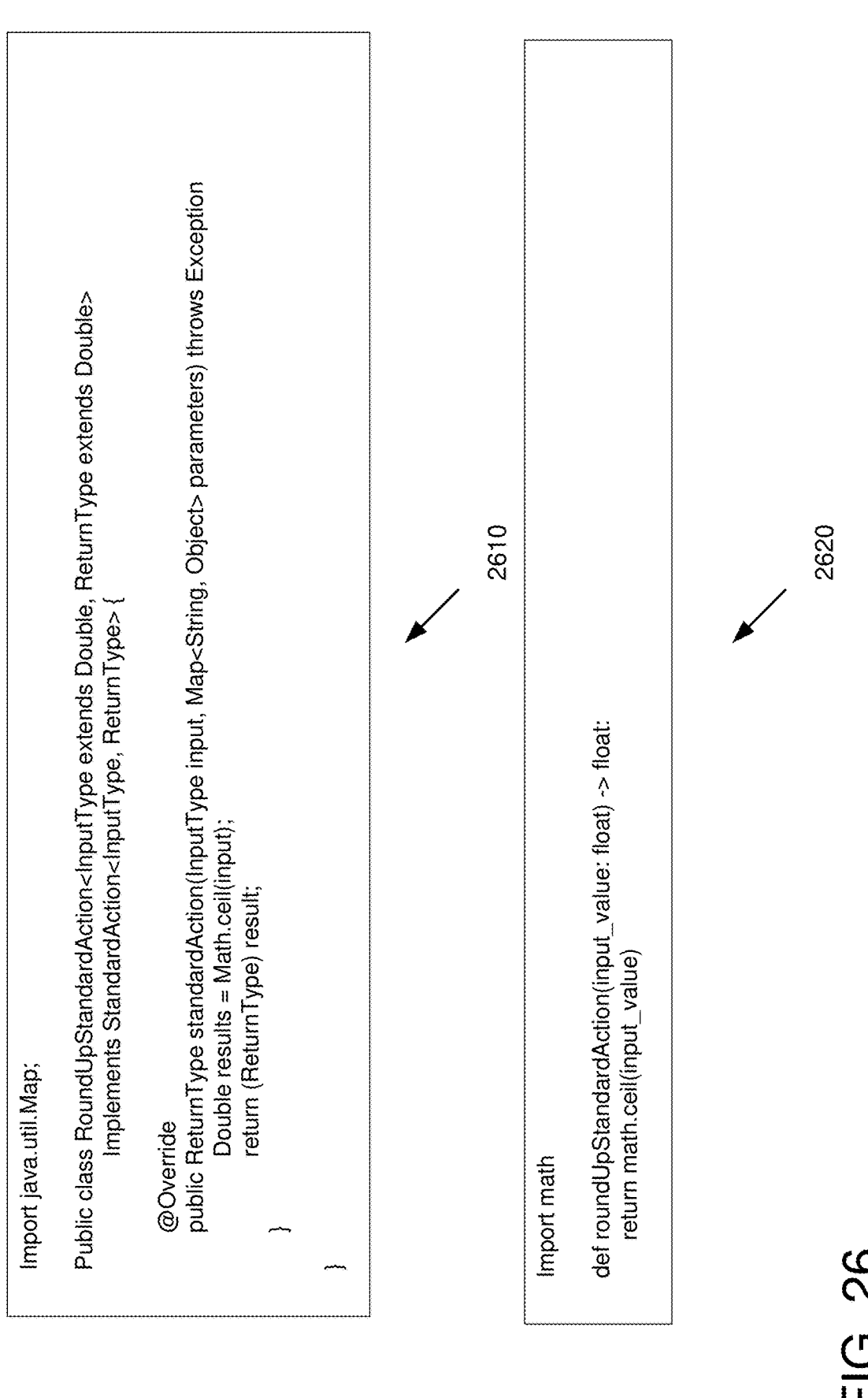

```
Import java.util.Map;

Public class RoundUpStandardAction<InputType extends Double, ReturnType extends Double>
        Implements StandardAction<InputType, ReturnType> {

@Override
public ReturnType standardAction(InputType input, Map<String, Object> parameters) throws Exception
        Double results = Math.ceil(input);
        return (ReturnType) result;
    }
}
```

2610

```
Import math
def roundUpStandardAction(input_value: float) -> float:
    return math.ceil(input_value)
```

SOFTWARE 4080 IMPLEMENTING TECHNOLOGIES

INTELLIGENT UPDATE OF APPLICATION PROGRAMMING INTERFACES

BACKGROUND

Software development is continuous. Typically, multiple independently developed software applications can interact with each other via application programming interfaces, also known as APIs. The APIs define protocols which specify how different software applications can exchange data and interact with each other. In other words, APIs are software intermediaries that allow different software applications to talk to each other. Unfortunately, to keep all software applications work in sync with the most up to date APIs is almost improbable as different software applications can have different lifecycles. Additionally, a software application may not know all its API consumers, i.e., other software modules that interacts with this software application through its API. The development of distributed and cloud computing has further exacerbated these problems as the software development model moves from the traditional monolithic architecture (where an application is built as a single unified unit) to a microservices architecture (where an application can be divided into a collection of smaller independent units), as APIs of numerous microservices can be distributed in many places, and each API may have its unique life cycle. As a result, managing software update and the corresponding update of APIs can be extremely risky and costly for enterprises. Thus, room for improvement exists for managing software API updates.

BRIEF DESCRIPTION OF THE DRAWINGS

FIG. 7 depicts a portion of software code of an example API.

FIG. 8 depicts a portion of an API specification document generated from the software code of the API of FIG. 7.

FIG. 10 is a flowchart illustrating an example overall method of publishing API updates to an API registry to notifying relevant API updates to selected subscribers.

FIG. 23 is a flowchart illustrating an example overall method of performing intelligent API updates.

FIG. 25 depicts an example implementation of a generic standard action in Java.

FIG. 26 depicts example implementations of a round-up function in Java and Python based on the generic standard action of FIG. 25.

DETAILED DESCRIPTION

Example 1—Overview of API Management

Figure 1:
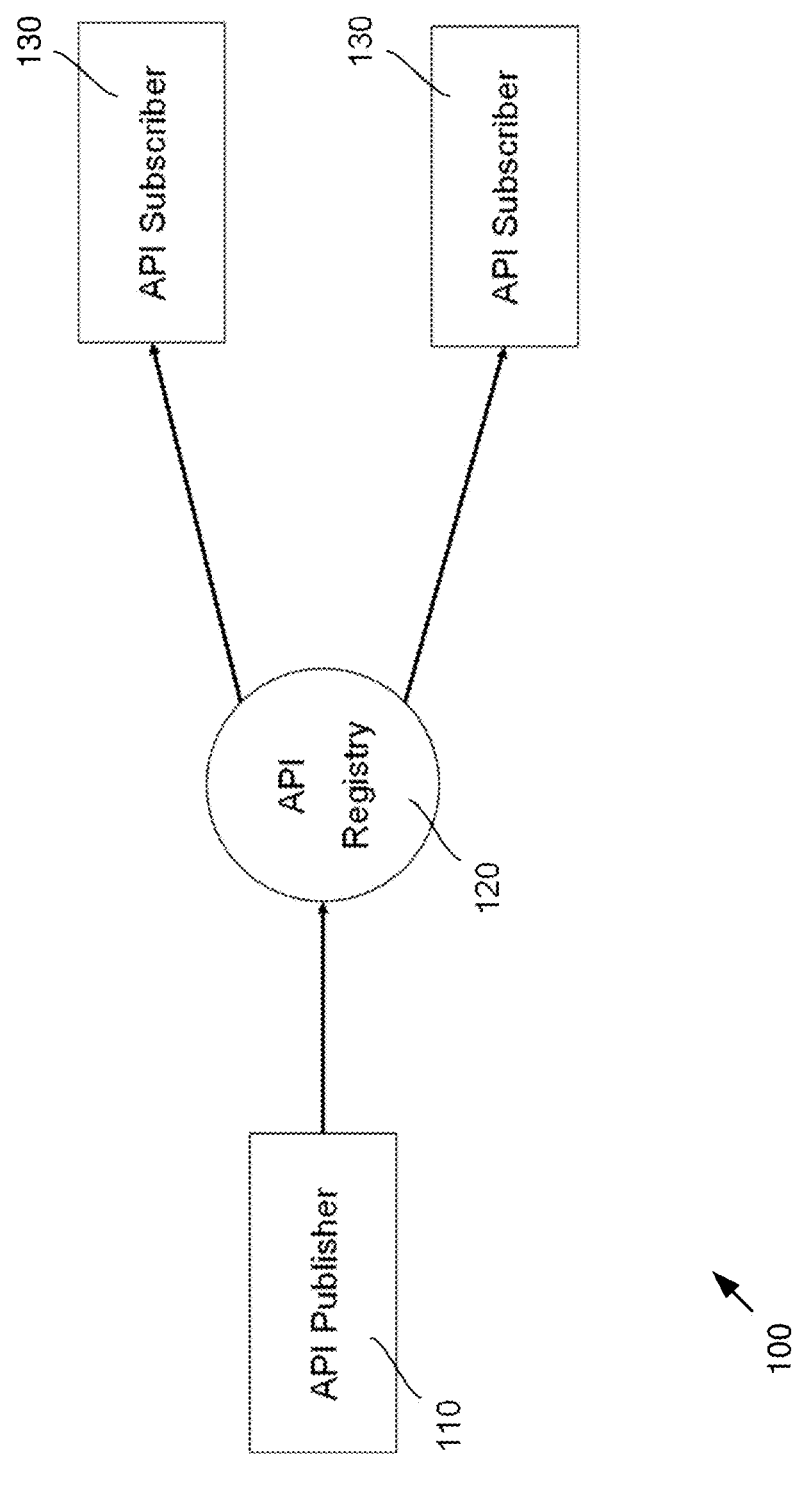
FIG. 1 is a high-level block diagram of an example framework for API management.

Software providers often continuously release new versions of software applications to provide new functionalities and/or fix bugs. Accordingly, software providers also frequently update APIs associated with the corresponding software applications. Customers who consume or utilize the APIs may choose to integrate the updated APIs in their software applications or keep using old versions of APIs. Conventionally, communications about API updates between the software providers and customers are asynchronous. For example, customers may not be immediately notified about the release of new APIs by software providers. The potential impact of API updates on existing software applications is also difficult to assess.

One challenging problem for software providers is API lifecycle management, which refers to the process of overseeing an API from its creation to retirement across its full life span. For example, a software provider not only needs to provide updated APIs that work with the newly released software applications, but also need to maintain some old versions of APIs that work with some legacy applications which some customers may still use. Retiring an old version of API prematurely may break some customers' applications which still rely on that old version of API. However, maintaining old versions of APIs, especially if there are many old versions of APIs spanning over many years, can be very expensive for software providers. Thus, maintaining old versions of APIs that are not actively used by customers represent a significant waste of resources. The API lifecycle management becomes even more convoluted when considering distributed APIs that are deployed both across multiple clouds and on-premises. For example, it can be difficult for software providers to know how many customers are still using old versions of APIs, and it can be even more difficult to know what features in those old versions of APIs are still being used.

Another challenging problem faced by software providers and/or technical experts specializing in API upgrade is that the impact of an API change is often unknown. For example, an API upgrade may crash software applications for some customers, but the same API upgrade may run smoothly for other customers. One reason underlying such a discrepancy may be related to the consuming applications interacting with the API and their technology stacks. Some Java implementations, for instance, may not care about a change in the order of attributes. But in another instance, when an INSERT statement is created for a relational database, the order of attributes can be vital for the program to run correctly. As another example, some applications may ignore attributes completely and have no problems processing type changes whereas other applications may rely on specific data types.

At the customer side, API management also brings many challenges. Nowadays, API integration is essential for any organizations deploying enterprise software applications, as each organization may rely on dozens or hundreds of third-party APIs, each of which may have a significant downstream effect on the organization's normal operations. Although ideally it may be desirable to keep all APIs up to date, this is often not feasible for many organizations because frequent API updates can incur high expense and/or increase downtime. As a result, some organizations may forgo updating API updates until it becomes necessary. For example, an organization may choose to continue using old versions of APIs, despite the fact that those old versions of APIs may not take advantage of some useful features in the newly released software applications. Sometimes, an organization may have to design workarounds in order to make the old versions of APIs to be compatible with other applications. However, an organization may eventually have to upgrade the APIs. This may occur, for example, when the software providers stopped supporting the old versions of APIs, and/or the old versions of APIs may be incompatible with some crucial software applications. As another example, regulatory requirements (e.g., new regulatory features in accounting or reporting, etc.) and/or security concerns may force an organization to upgrade certain APIs.

When an organization does perform API upgrade, still more problems can occur. For example, a new version of an API can have breaking changes compared to an old version of the API. As a result, upgrading the API from the old version to the new version may crash the organization's other software applications or render them inoperable. It can be extremely challenging to identify what are those breaking changes. For example, some of the API changes between different versions may not be formally documented. To debug the problem, manual comparison between the old and new APIs may be necessary. This can be very tedious because some APIs may have several hundred attributes, and manually spotting minuscule changes (e.g., datatype updates from CHAR(4) to CHAR(5), changes in the order of attributes, etc.) can be extremely difficult. Even if all API changes are meticulously documented, pinpointing which changes have led to the crash condition may require complicated analysis, especially if there are several intermediate versions of the API existing between the old version and the new version (in which case one must trace back to multiple versions of the API to debug the problem). Further, the new version of API may have "hidden" breaking changes which do not cause immediate problem after the initial API upgrade but can lead to crashes down the road. This can happen, for example, when the breaking conditions do not exist at the time of API upgrade but manifest later.

Furthermore, even if all API changes are correctly identified, how to implement those API changes often require special expertise. Finding and hiring expertise to implement desired API changes can be time consuming and expensive.

The technologies described herein can address many of the above-described problems and can be applied across a wide variety of enterprise software environments.

Example 2—Example Framework for API Management

FIG. 1 is a high-level block diagram depicting an example computing framework 100 for API managing API, according to the technologies described herein.

The computing framework 100 includes an API registry 120, which serves as a central messaging platform connecting providers and consumers of APIs. As illustrated in FIG. 1, a software provider of APIs, which is denoted as an API publisher 110 (which can also be referred to as API providers), can publish different versions of APIs on the API registry 120. Consumers of the APIs, which are denoted as API subscribers 130, can register with the API registry 120. In some examples, the API registry 120 can include a message broker configured to send customized messages using certain messaging protocols to selected API subscribers 130 upon receiving APIs published by the API publisher 110. Although FIG. 1 shows only one API publisher 110 and two API subscribers 130, it is to be understood that there can be more than one API publisher 110 and the number of API subscribers 130 can be one or more than two.

As described more fully below, the API registry 120 is technology-agnostic and can transform the software code of an API (including metadata objects and data values embedded in the API) published by the API publisher 110 into a knowledge graph and store the knowledge graph in a knowledge graph repository (also referred to as a "triple store"). Based on the knowledge graph representations of different versions of the API, the API registry 120 can further identify changes between different versions of the API and also represent these changes in a knowledge graph format (e.g., difference graphs, as described below).

The API subscribers 130 can create, on the API registry 120, respective profiles (e.g., subscription configuration files) which specify API change conditions that are of interests to each of the individual API subscribers 130. For example, an API subscriber can create a profile that includes specific API change conditions that are implementation relevant to that particular API subscriber (e.g., API changes that can affect software applications running on the API subscriber's computing environment).

After detecting identified changes between different versions of the API, the API registry 120 can automatically send messages which include customized alerts to selected API subscribers 130 based on their respective profiles. Importantly, the customized alerts are implementation relevant for each recipient of the message. Further, notification to the API subscribers 130 can be synchronous with and/or nearly instantaneous after publication of the APIs by the API publisher 110.

In addition, both the API publisher 110 and the API subscribers 130 can use the API registry 120 for simulation. For example, the API publisher 110 can simulate, based on the profiles stored on the API registry 120, how many API subscribers 130 would be impacted by an API upgrade or downgrade. An API subscriber 130 can also simulate what would happen to software applications (e.g., in terms of compatibility or incompatibility) running on the API subscriber's computing environment if upgrading or downgrading the API.

Business decisions can be made based on the simulation results. For example, the API publisher 110 can decide to release a newer version of the API with limited technical support if the impact of the API upgrade is unlikely to cause problems for many API subscribers 130. The API publisher 110 may also decide to retire an old version of the API if it is found, e.g., based on the profiles, that few API subscribers 130 concern about certain features implemented in the old version of the API. Additionally, an API subscriber 130 can decide, based on the simulation results, whether it is worthwhile to invest resources in upgrading the API.

Figure 2:
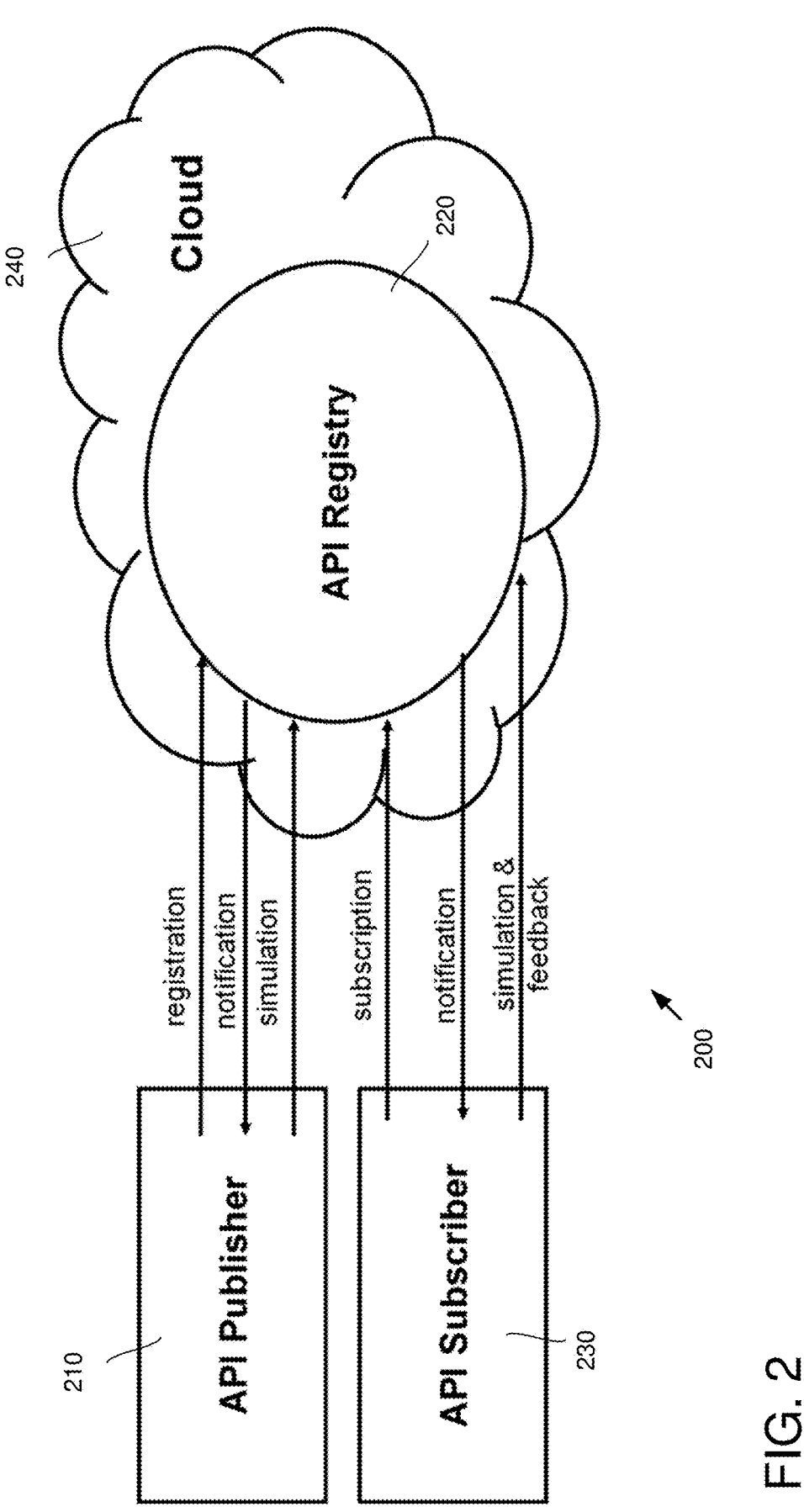
FIG. 2 is another high-level block diagram of an example framework for API management and example data communications within the framework.

FIG. 2 is another high-level block diagram of an example computing framework 200 for API management. Similar to the example of FIG. 1, the computing framework 200 includes an API registry 220 interacting with an API provider 210 and a API subscriber 230. Although FIG. 2 shows only one API publisher 210 and one API subscriber 230, it is to be understood that there can be more than one API publisher 210 and/or more than one API subscribers 230. The API registry 220, which can be similar to the API registry 120 describe above, can be implemented in a cloud environment 240.

FIG. 2 also shows some example data communications within the framework 200. For example, the API publisher 210 can publish different versions of APIs and these published APIs can be registered on the API registry 220 in a knowledge graph format. The API publisher 210 can perform simulations on the API registry to estimate impact of an API change on consumers of the API and receive simulation results from the API registry 200. The API publisher 210 can also query the API registry 200 to determine the number of API subscribers 230 who are still actively using certain versions of the APIs based on their profiles.

As shown in FIG. 2, the API subscriber 230 can subscribe to and create a profile on the API registry 220. After the subscription, the API subscriber 230 can immediately receive messages or notifications from the API registry 220 after a new version of the API is registered on the API registry 220 if that new version of the API meets one of the API change conditions specified in the subscriber's profile. The API subscriber 230 can also run simulations on the API registry 220 to determine impact of upgrading and/or downgrading the API on software applications running on the subscriber's computing environment. Additionally, the API subscriber 230 can provide feedback, through the API registry 220, to the API publisher 210 about the published API.

Example 3—Example Overview of API Registry System

Figure 3:
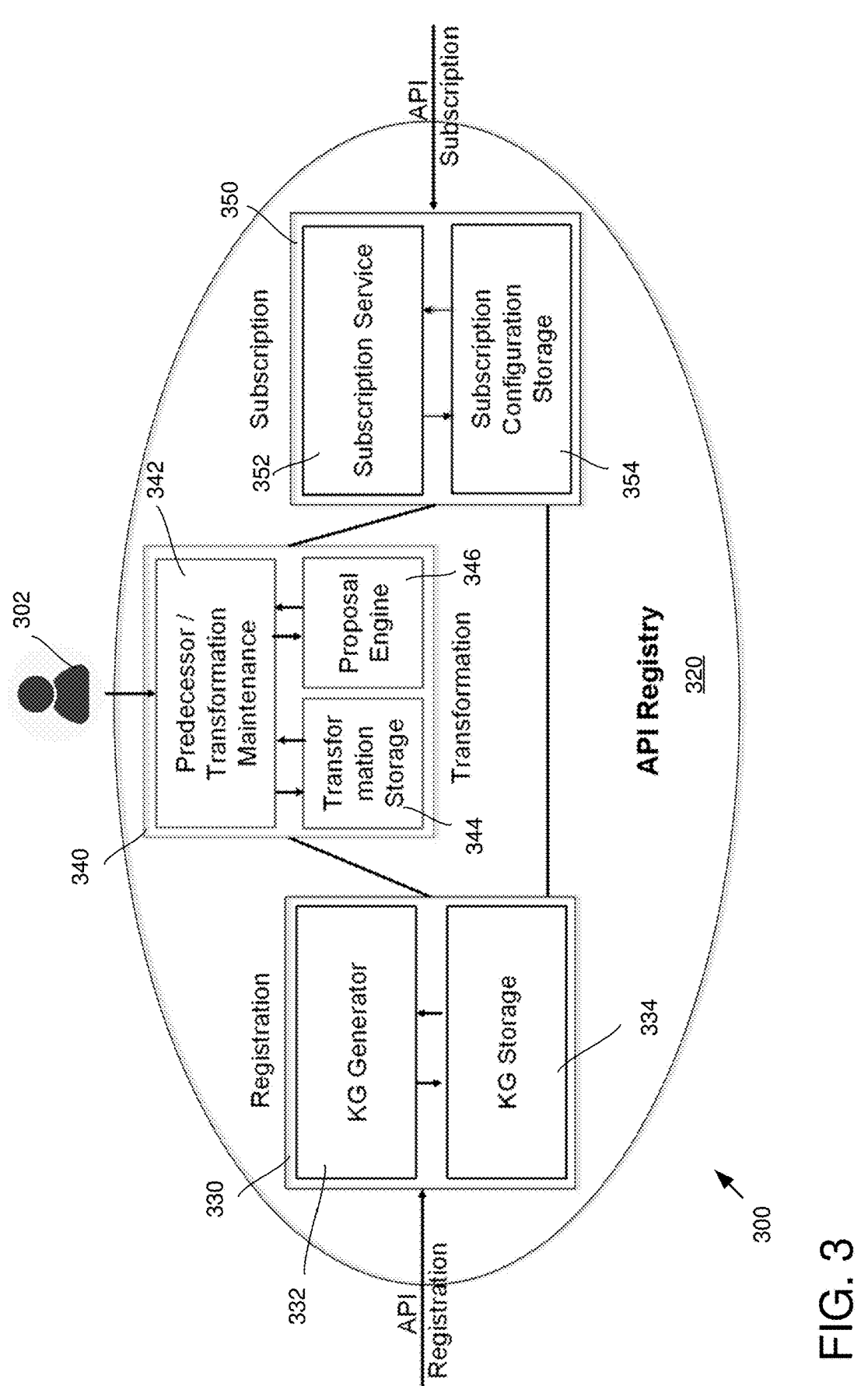
FIG. 3 is an overall block diagram of an example computing system including an API registry for managing API updates.

FIG. 3 shows an overall block diagram of an example computing system 300 supporting message-based API management. The system 300 includes an API registry 320, which can be an example embodiment of the API registry 120 depicted in FIG. 1 or 220 depicted in FIG. 2.

As shown in FIG. 3, the API registry 320 can include a registration unit 330, a transformation unit 340, and a subscription unit 350. The API registration unit 330 can include a knowledge graph (KG) generator 332 and a knowledge graph storage or repository 334 (which can also be referred to as a triple store). The transformation unit 340 can include a predecessor and transformation maintenance module 342, a transformation storage module 344, and a proposal engine 346. The subscription unit 350 can include a subscription service module 352 and a subscription configuration storage 354.

In some examples, published APIs can be registered on the API registry 320 through the registration unit 330. Specifically, the knowledge graph generator 332 can transform the software code of an API into a knowledge graph representation of the API. The generated knowledge graph can be stored in the knowledge graph storage 334.

The generated knowledge graphs can be analyzed by the transformation unit 340. For example, differences between two knowledge graphs representing two different versions of the API can be automatically identified by the predecessor and transformation maintenance module 342. The predecessor and transformation maintenance module 342 can further represent the identified differences in a graph format, e.g., a difference graph, as described further below. The transformation storage module 344 can store the generated difference graphs.

In some examples, a user 302, such as an API registry administrator or a software developer of the API (representing the API publisher), can have access to the API registry through the transformation unit 340. For example, the proposal engine 346 can display a knowledge graph that is automatically generated by the knowledge graph generator 332 in a graphical user interface, through which the user 302 can view, annotate, and/or modify the knowledge graph. Additionally, the proposal engine 346 can also display a difference graph that is automatically generated by the predecessor and transformation maintenance module 342 on the graphical user interface, through which the user 302 can view, annotate, and/or modify the difference graph.

In some examples, API subscribers can subscribe to the API registry 320 through the subscription unit 350. Specifically, each API subscriber can create its own profile (e.g., a subscription configuration file) using the subscription service module 352. The profile of an API subscriber can specify API change conditions that are of interests to that API subscriber. A collection of profiles for all API subscribers can be stored in the subscription configuration storage 354.

In practice, the systems shown herein, such as system 300, can vary in complexity, with additional functionality, more complex components, and the like. For example, there can be additional functionality within the API registry 320. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 300 and any of the other systems described herein can be implemented in conjunction with any of the hardware components described herein, such as the computing systems described below (e.g., processing units, memory, and the like). In any of the examples herein, the knowledge graphs, difference graphs, profiles, and the like can be stored in one or more computer-readable storage media or computer-readable storage devices. The technologies described herein can be generic to the specifics of operating systems or hardware and can be applied in any variety of environments to take advantage of the described features.

Example 4—Example Overview of Knowledge Graphs

A knowledge graph is a special type of database that maintains knowledge or information in a graph form. A typical knowledge graph includes a plurality of nodes representing objects and a plurality of edges (also referred to as "properties") connecting the nodes. The edges represent hierarchical relationship between the objects (e.g., is a parent of, is located in, etc.). One common type of knowledge graph is based on the resource description framework (RDF), which models statements of facts or web resources in expressions of the form subject-predicate-object, known as triples. For example, two nodes connected by a directional edge can describe a fact, which can be represented as (subject, predicate, object) triples. All triples defined by a knowledge graph can be serialized into an RDF file stored in a database known as a triple store.

In certain examples, the nodes in a knowledge graph can be organized in a hierarchical structure where a lower-level node (representing a more specific object) may be connected to a higher-level node (representing a more generic object) by one or more edges. The lower-level node (or the lower-level object it represents) can be called a descendant or child of the higher-level node (or the higher-level object it represents), and the higher-level node (or the higher-level object it represents) can be called an ancestor or parent of the lower-level node (or the lower-level object it represents).

Figure 4:
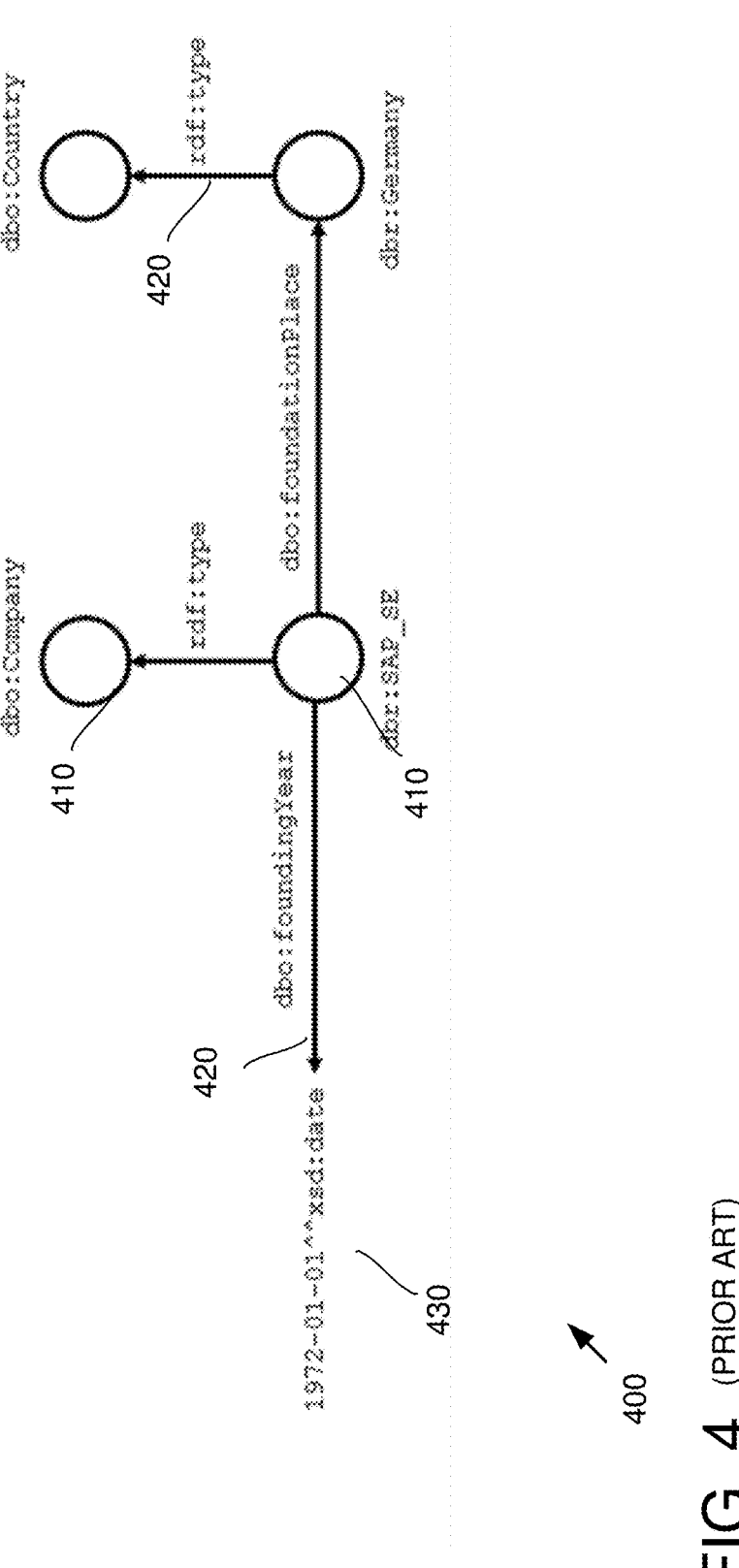
FIG. 4 is an example diagram illustrating a partial knowledge graph.

As an example, FIG. 4 shows a portion of a DBpedia knowledge graph 400 containing four nodes 410 respectively representing objects of SAP_SE, Germany, Company, and Country. The knowledge graph 400 also includes directional edges or properties 420, such as type, foundationPlace, and founding Year, which represent hierarchical relationships between the nodes 410. A data value, such as a string 1972-01-01, can be deemed as a leaf node or value node 430 of the knowledge graph. As described herein, a leaf node or value node refers to a node in the knowledge graph that has no child node. In other words, a leaf node (value node) can be connected to one or more parent nodes by edges pointing from the parent nodes to the leaf node (value node), but there is no edge originating from a leaf node (value node). In the RDF schema, the value nodes can be defined by the class "rdfs:Literal." As shown, several facts can be contained in this knowledge graph, such as (SAP_SE, is a type of, Company), (SAP_SE, has foundation place, Germany), (Germany, is a, Country), and (SAP_SE, has founding year, 1972-01-01).

Typically, an object represented by a node can include an identifier and a label representing a name of the object. The node can also have an associated uniform resource identifier (URI) (sometimes also referred to as uniform resource locator, or URL). The relationships represented by edges can be characterized by a set of edge properties that are specific to the knowledge graph. Each edge property can also have a unique URI.

Nodes in a knowledge graph can form hierarchies. Some of the nodes may represent more specific objects and can be deemed as instances contained in the knowledge graph. For example, SAP_SE can be an instance representing a specific Company, and Germany can be an instance representing a specific Country. The strings (e.g., 1972-01-01) can also be deemed as instances. Some of the nodes may represent more generic objects and can be deemed as classes. For example, Company is a class that captures the common concept shared by many individual companies including SAP_SE and Country is a class that captures the common concept shared by many individual countries including Germany. According to the RDF schema, the rdfs:subClassOf property may be used to state that one class is a subclass of another. For example, the statement ":EuropeanState rdfs:subClassOf:State" indicates that the class EuropeanState is a subclass of another class State.

There can be different ways to differentiate between instances and classes. For example, a knowledge graph can have predefined property prefixes, which can indicate whether a node is an instance or a class (e.g., a node can be deemed as a class if it has a prefix "dbo," which represents DBpedia ontology, and a node can be deemed as an instance if it has a prefix "dbr," which represents DBpedia resource). In certain cases, a knowledge graph can use URI design to differentiate between instances and classes. In certain cases, a knowledge graph can include statements which explicitly indicates certain nodes are classes. In certain cases, whether a specific node represents an instance or a class can depend on the underlying model or concept. For example, in DBpedia, whether a node is a class (thus belongs to an ontology of the knowledge graph) or an instance (thus not included in the ontology of the knowledge graph) can be determined by checking the rdf:type property: If the type is owl:Class, then it is a class and belongs to the ontology; otherwise, it is deemed as an instance and not belongs to the ontology.

Edges or properties in a knowledge graph define relationship between subject resources (e.g., nodes where the edges originate from) and object resources (e.g., nodes where the edges point to). In some cases, edges or properties in a knowledge graph can also form hierarchies. According to the RDF schema, the rdfs:subPropertyOf property may be used to state that one property is a sub-property of another. For example, the statement ":capitalOf rdfs:subPropertyOf locatedIn" indicates that an edge or property captialOf is a sub-property of another edge or property locatedIn.

For a given knowledge graph, an ontology can be created by describing the classes with a list of properties represented by the edges. In other words, the aggregation of all classes and edges in a knowledge graph can define an ontology. For example, the DBpedia ontology currently covers over 600 class objects which form a subsumption hierarchy and are described by over 2,000 different edge properties.

As described herein, the ontology of a knowledge graph can contain the schema or common vocabulary that defines edges or properties of the nodes that are available in the knowledge graph. For example, the ontology of the knowledge graph depicted in FIG. 4 defines at least the following properties of the instance SAP_SE, type,foundationPlace, and foundingYear. In addition, the ontology of the knowledge graph depicted in FIG. 4 also defines at least the following two classes: Company and Country.

In some knowledge graphs (e.g., RDF knowledge graphs), it is also possible to apply reasoning to the (subject, predicate, object) triples (e.g., rather than stating explicitly that Germany is a Country as exemplified in FIG. 4). For example, according to a preconstructed reasoning rule, every object of dbo:foundationPlace is a Country (by setting a property range). Thus, through reasoning, the triple (Germany, type, Country) can be "reasoned" or "materialized" into a statement of fact: "Germany is a country." Other reasoning rules can be similarly constructed. In addition, some reasoning rules can include restrictions to certain nodes and/or edges. For example, one restriction can be that the node Company must not represent a person. Another restriction can be that the starting point of the edge foundingYear must be an organization and the target of the edge foundingYear must be a string; etc. According to the RDF scheme, restricting the starting point and the target of an edge can be achieved by specifying the domain and range properties. For example, the statements ":capitalOf rdfs:domain:City"and":capitalOf rdfs:range:Country" collectively indicate that the starting point of the edge capitalOf must be a node representing (or in the domain of) City and the target of the edge capitalOf must be a node representing (or within the range of) a Country.

Compared to relational databases, the knowledge graph has a more flexible data structure because the types of data provided by the knowledge graph can vary. The technologies described herein can transform any software APIs (regardless of language being used in the APIs) into corresponding knowledge graphs with a generic ontology. The technologies described herein can also identify differences between different versions of APIs and represent such differences in a knowledge graph format. Such graphical representations provide users an intuitive way of analyzing metadata objects within the APIs, and assist users to quickly identify, understand, and/or document changes made between different versions of the APIs. Moreover, using the central API registry, the technologies described herein can generate customized alerts to selected API subscribers if certain API updates provided by API publishers may potentially cause implementation-relevant issues for those API subscribers.

Example 5—Example Knowledge Graph Registration

Figure 5:
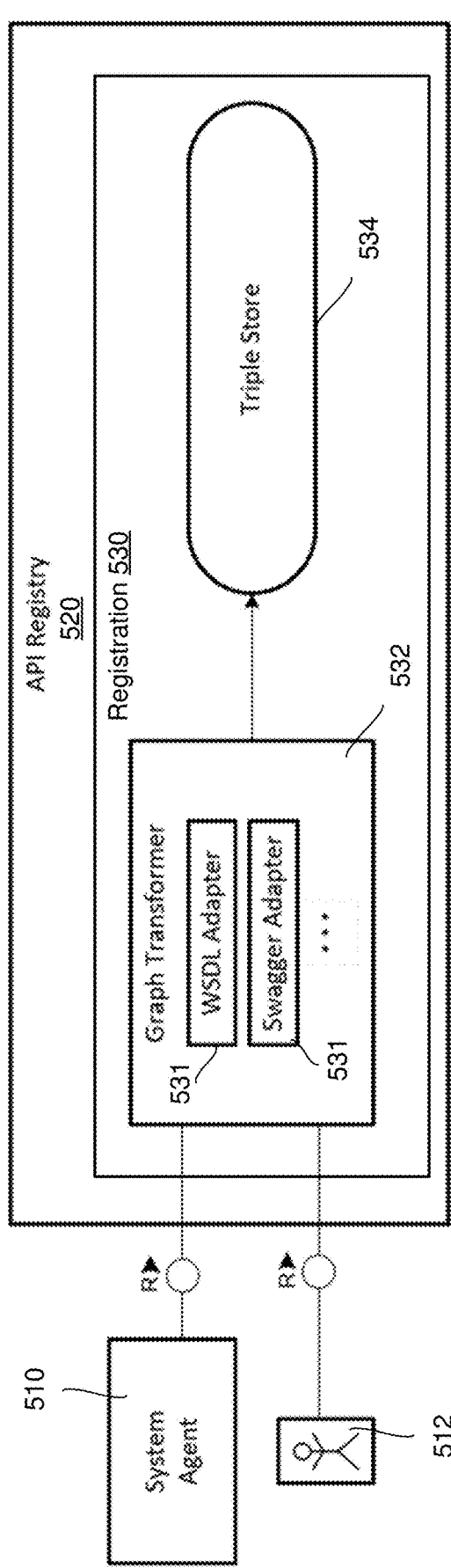
FIG. 5 is a block diagram illustrating an example registration unit of an API registry.

FIG. 5 is a block diagram illustrating an example registration unit 530 of an API registry 520. The API registry 520 can be similar to the API registry 320, and the registration unit 530 can be similar to the registration unit 330. For example, the API registration unit 530 can include a graph transformer 532 (which can be an example embodiment of the knowledge graph generator 332) and a triple store 534 (which can be an example embodiment of the knowledge graph storage 334).

The registration unit 530 can receive software codes of APIs provided by API publishers. In some cases, the software codes of APIs can be sent automatically, e.g., by a system agent 510 of an API provider. For example, the system agent 510 can be a software application running on the computing system of the API provider. Anytime a new version of API is compiled, validated, and ready for release, the system agent 510 can push the new version of the API to the registration unit 530. In some cases, the software codes of APIs can be manually sent to the registration unit 530, for example, by a user 512. After receiving the software code of an API, the graph transformer 532 can be triggered to convert the software code of the API to a knowledge graph, which can then be stored in the triple store 534.

In some examples, the graph transformer 532 can include one or more adapters 511 (also referred to as converters), such as a Web Services Description Language (WSDL) adapter, a Swagger adapter, etc. Such adapters can parse the software code of APIs to extract metadata objects and schematic data values therein, and generate corresponding text-based API specification documents that describe such metadata objects and data values in standard formats. For example, the WSDL adapter can parse software code of APIs for Simple Object Assessment and Plan (SOAP) web services and organize the extracted API metadata objects in a WSDL documentation format, and the Swagger adapter can parse software code of APIs for RESTful (Representation State Transfer) services and describe the extracted API metadata objects in JSON or YAML format. In some examples, additional data processing can be performed to organize the extracted metadata objects and relevant data values into desired data format (e.g., the metadata objects can be tabulated, etc.). As described herein, the graph transformer 532 can be configured to generate a knowledge graph representation of an input API based on the text-based API specification document generated by one of the adapters 531.

As a result, even if the input APIs may be written in different programming languages, metadata objects and relevant data values of the APIs can be extracted by corresponding adapters 531. Even if the text-based API specification documents generated by different adapters 531 may have different formats, the knowledge graphs generated by the graph transformer 532 can have a generic ontology. In other words, the generated knowledge graphs are technology-agnostic because all APIs, regardless of their underlying technologies, can be universally represented by knowledge graphs having the same ontology.

Figure 6:
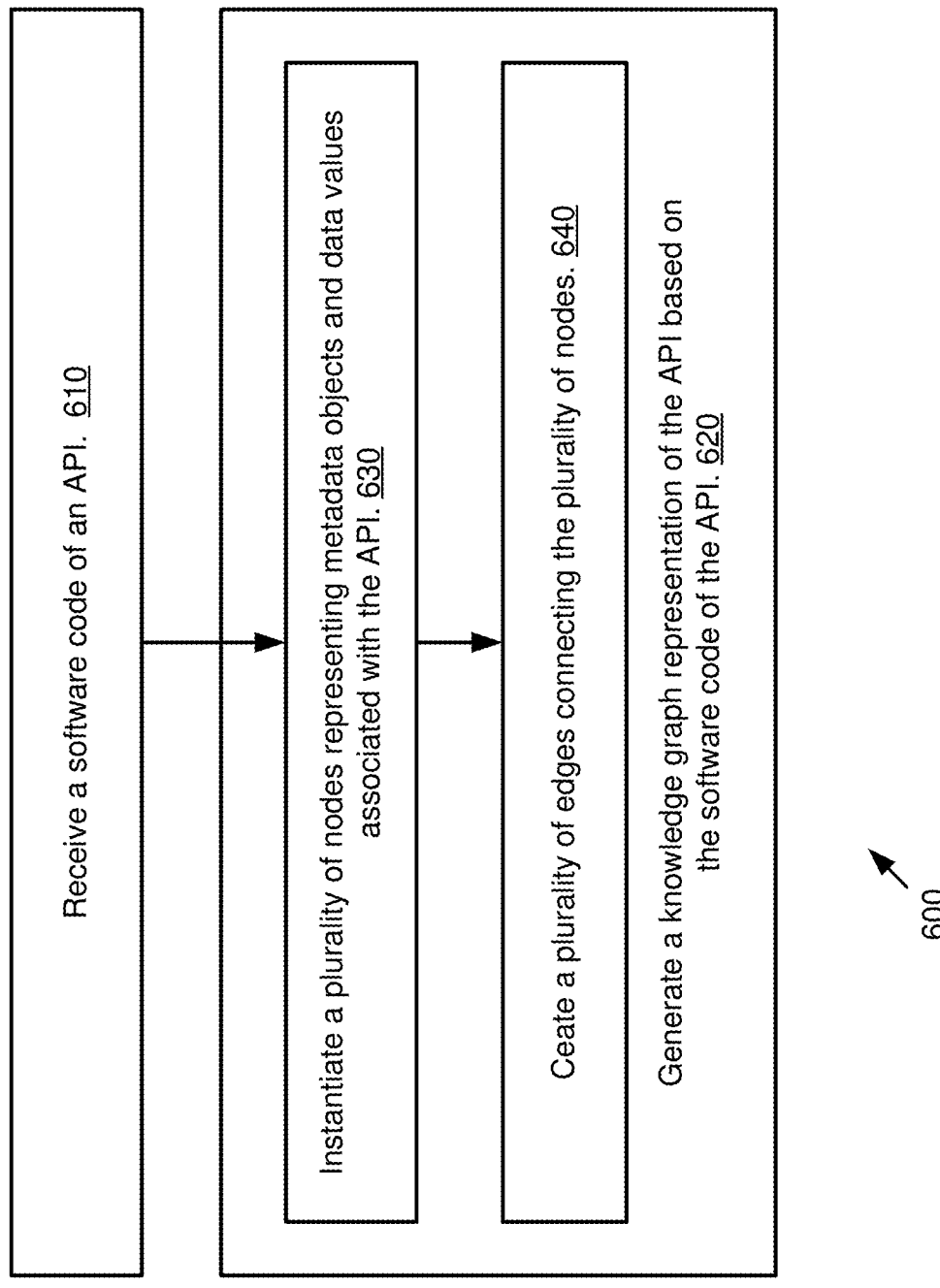
FIG. 6 is a flowchart illustrating an example overall method of transforming the software code of an API to a knowledge graph representing the API.

Example 6—Example Overall Method of
Generating Knowledge Graph Representation of
API FIG. 6 is a flowchart of an example overall method 600
for generating a knowledge graph representation of an API,
and can be performed, for example, by the graph transformer
532 of FIG. 5 or the knowledge graph generator 332 of FIG.
3.

At 610, the method 600 can receive a software code of an
API. At 620, the method 600 can generate a knowledge
graph representation of the API based on the software code
of the API. In some examples, the received software code of
the API can be first transformed into a text-based API
specification document (e.g., by one of the adapters 511).
Then, the text-based API specification document can be
converted to the knowledge graph representation of the API.

As shown in FIG. 6, the step 620 can include two
sub-steps: At 630, the method 600 can instantiate a plurality
of nodes representing metadata objects and data values
associated with the API. In some examples, the metadata
objects and data values associated with the API can be
extracted by a corresponding adapter (e.g., 531), as
described above. Then at 640, the method 600 can create a
plurality of edges connecting the plurality of nodes. The
plurality of edges define hierarchical relationship between
the metadata objects and data values represented by the
plurality of nodes.

The method 600 and any of the other methods described
herein can be performed by computer-executable instruc-
tions (e.g., causing a computing system to perform the
method) stored in one or more computer-readable media
(e.g., storage or other tangible media) or stored in one or
more computer-readable storage devices. Such methods can
be performed in software, firmware, hardware, or combina-
tions thereof. Such methods can be performed at least in part
by a computing system (e.g., one or more computing
devices).

Example 7—Example Ontology of Knowledge
Graphs Representing APIs

In any of the examples described herein, the knowledge
graph representations of APIs can have a predefined ontol-
ogy, which contains the schema that defines node types and
edges (properties) of the nodes that are available in the
knowledge graph.

In some examples, the ontology of knowledge graphs
representing APIs can have the following node types or
classes: RootNode which represents a specific API; Sub-
Node which represents a structural element or a metadata
object of the API; Value which represents a data value of the
API (holding schematic element). Generally, each knowl-
edge graph representation of an API can have one root node
(with the node type RootNode) denoting the API, a plurality
of sub-nodes (with the node type SubNode) representing
metadata objects of the API, and a plurality of value nodes
(with the node type Value) representing schematic data
values of the API.

In some examples, each sub-node in the knowledge graph
can include one or more properties or fields, such as a label
(e.g., rdfs:label), a description or comment field (e.g., rdfs:
comment), etc. The properties of a sub-node can represent
corresponding attributes of the metadata object represented
by the sub-node. In some examples, the ontology of knowl-
edge graphs representing APIs can further include a node type Datatype, which represents different datatypes (e.g.,
expressed in strings) of metadata objects or data values.

It is to be understood that the above labels of the node
types are merely exemplary, and different naming conven-
tions can be used to label the node types. Additionally, it is
to be understood that the number of node types can be more
or less than the ones described above. For example, the
Datatype may be optional in certain circumstances. As
another example, the ontology of knowledge graphs repre-
senting APIs can define additional node types, as needed.

Additionally, the ontology of knowledge graphs repre-
senting APIs can have a plurality of predefined edges or
properties. For example, the ontology can define an edge or
property hasSubnode which has the range of SubNode (i.e.,
the edge points to a SubNode). As another example, the
ontology can define an edge or property hasDatatype which
has the range of Datatype (i.e., the edge points to a Data-
type).

In some examples, the ontology of knowledge graphs
representing APIs can define an edge or property hasPrior-
Version which has the range of RootNode. In such a sce-
nario, the edge can point from the root node of a knowledge
graph representing a present version of the API to the root
node of another knowledge graph representing a prior ver-
sion (i.e., the version immediately preceding the present
version) of the API.

In some examples, the ontology of knowledge graphs
representing APIs can define an edge or property hasApi-
ChangeVersion which has the range of RootNode. In such a
scenario, the edge can point from a sub-node of a knowledge
graph representing a present version of the API to the root
node of another knowledge graph representing an earlier
version of the API in which the metadata object represented
by the sub-node was last changed.

In some examples, the ontology of knowledge graphs
representing APIs can define an edge or property initially-
IntroducedInVersion which has the range of RootNode and
the domain of SubNode. In such a scenario, the edge can
point from a sub-node of a knowledge graph representing a
present version of the API to the root node of another
knowledge graph representing an earlier version of the API
in which the metadata object represented by the sub-node
was first introduced.

In some examples, the ontology of knowledge graphs
representing APIs can define a pair of edges or properties
hasMinCardinality and hasMaxCardinality, both of which
can have the range of Integer. These two edges or properties
can point from a selected sub-node to two value nodes which
respectively represent minimum and maximum cardinalities
of the metadata object represented by the selected sub-node.

In some examples, the ontology of knowledge graphs
representing APIs can define an edge or property hasVersion
which can have the range of String. In this case, the edge can
point from the root node of the knowledge graph to a value
node representing a version number (e.g., expressed in
String) of the API represented by the knowledge graph.

In some examples, the ontology of knowledge graphs
representing APIs can define an edge or property hierarchy-
SequenceNumber which can have the range of Integer. In
this case, the edge can point from a sub-node to a value node
which represents a hierarchical order number of the sub-
node within the knowledge graph.

In some examples, the ontology of knowledge graphs
representing APIs can define an edge or property hasApiPort
which can have the range of Integer. In this case, the edge
can point from the root node of a knowledge graph to a value node representing a port number provided by the API publisher for accessing the API represented by the knowledge graph.

In some examples, the ontology of knowledge graphs representing APIs can define an edge or property last-Changed which can have the range of Date. In this case, the edge can point from the root node (or a sub-node) of a knowledge graph to a value node representing a date when the API represented by the knowledge graph (or a corresponding metadata object represented by the sub-node) was last modified.

In some examples, the ontology of knowledge graphs representing APIs can define an edge or property isKey which can have the range of Boolean. In this case, the edge can point from a sub-node to a value node which indicates whether the metadata object represented by the sub-node has a key property.

It is to be understood that the above labels of the edges or properties are merely exemplary, and different naming conventions can be used to label the edges or properties. Additionally, it is to be understood that the some of the edges or properties (e.g., isKey, hasApiPort, hasPriorVersion, hasApiChangeVersion, initiallyIntroducedInVersion, etc.) described above can be optional, whereas additional edges or properties can be included in the ontology, as needed.

Example 8—Example Methods of Creating Nodes and Edges of Knowledge Graphs Representing APIs Additional information of the method 600 shown in FIG. 6 is described herein.

In some examples, instantiating the plurality of nodes (e.g., step 630 of FIG. 6) can include instantiating a root node (e.g., having the node type RootNode) identifying the API, instantiating one or more value nodes (e.g., having the node type Value) representing data values associated with the API, and instantiating one or more sub-nodes (e.g., having the node type SubNode) representing metadata objects associated with the API. As described herein, a sub-node can be connected to another sub-node or a value node by one of the plurality of edges.

In some examples, creating the plurality of edges (e.g., step 640 of FIG. 6) can include creating an edge connecting from a first sub-node (e.g., having the node type SubNode) to a second sub-node (e.g., having the node type SubNode). This created edge can indicate that a first metadata object represented by the first sub-node includes a second metadata object represented by the second sub-node.

In some examples, creating the plurality of edges (e.g., step 640 of FIG. 6) can include creating an edge connecting from a sub-node (e.g., having the node type SubNode) to a value node (e.g., having the node type DataType). This created edge can indicate that a metadata object represented by the sub-node has a specific data type (e.g., expressed in String) represented by the value node.

In some examples, creating the plurality of edges (e.g., step 640 of FIG. 6) can include creating an edge connecting from a sub-node (e.g., having the node type SubNode) to a value node (e.g., having the node type Value). This value node can represent a version of the API (e.g., expressed in String) in which a metadata object represented by the selected sub-node is first introduced.

In some examples, creating the plurality of edges (e.g., step 640 of FIG. 6) can include creating an edge connecting from a sub-node (e.g., having the node type SubNode) to two value nodes (e.g., having the node type Value). These two leaf nodes can respectively represent minimum cardinality and maximum cardinality (e.g., expressed in Integer) of a metadata object represented by the sub-node.

In some examples, creating the plurality of edges (e.g., step 640 of FIG. 6) can include creating an edge connecting the root node (e.g., having the node type RootNode) to a value node (e.g., having the node type Value) representing a current version (e.g., expressed in String) of the API.

Figure 9:
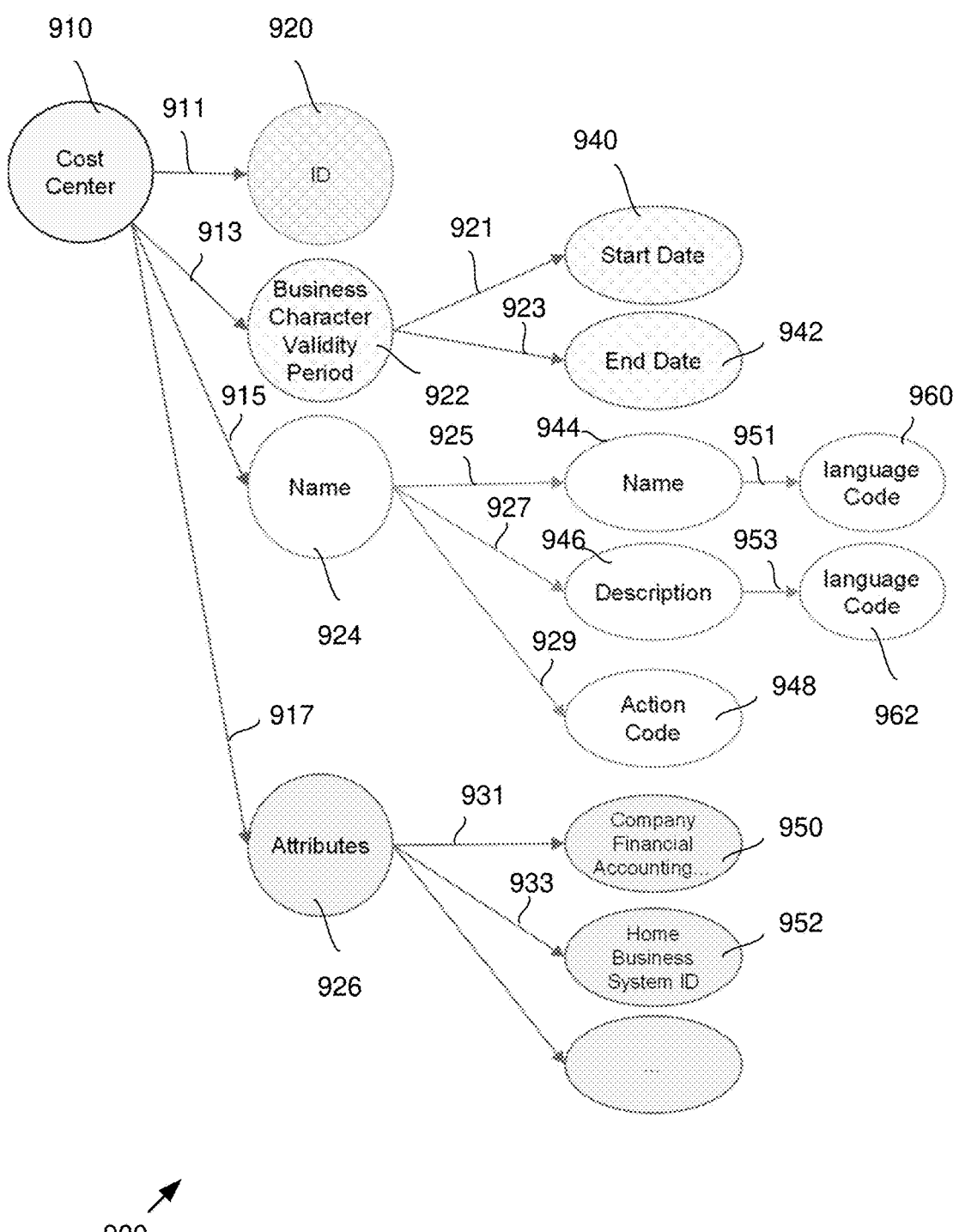
FIG. 9 depicts a portion of a knowledge graph transformed from the API specification document of FIG. 8.

Example 9—Example Use Case of Generating a Knowledge Graph Representation of an API The method 600 can be further illustrated using an example described herein with reference to FIGS. 7-9.

FIG. 7 depicts a portion of software code 700 of an example API for CostCenter. FIG. 8 depicts a portion of an API specification document 800 generated from the software code of the API of FIG. 7. The API specification document 800 can be generated, e.g., using a WSDL adapter configured to parse the software code 700. In the depicted example, the API specification document 800 includes tabulated metadata objects (e.g., ID, Name, Attributes, etc., which can be nested to define a hierarchical structure) and schematic data values (e.g., cardinalities, etc.) of the API.

FIG. 9 depicts a portion of a knowledge graph 900 transformed from the API specification document of FIG. 8. As shown, the knowledge graph 900 includes a plurality of nodes representing metadata objects and data values embedded in software code 700 of the CostCenter API and included in the API specification document 800.

The nodes includes a root node 910 representing the CostCenter API and a plurality of sub-nodes and value nodes that are interconnected by edges (properties). For example, the root node 910 is connected to a plurality of sub-nodes 920, 922, 924, and 926 (respectively representing ID, BusinessCharacterValidityPeriod, Name, Attributes) via respective edges 911, 913, 915, and 917 (e.g., with hasSubnode property).

As shown in FIG. 9, the plurality of nodes are arranged in a hierarchy. For example, the node 922 (BusinessCharacterValidityPeriod) is connected to its two child nodes 940, 942 (respectively representing StartDate and EndDate) via respective edges 921, 923 (e.g., with hasSubnode property); the node 924 (Name) is connected to its three child nodes 944, 946, 948 (respectively representing Name, Description, ActionCode) via respective edges 925, 927, 929 (e.g., with hasSubnode property); the node 926 (Attributes) is connected to its child nodes 950, 952, etc. (respectively representing CompanyFinancialAccounting, HomeBusinessSystemID, etc.) via respective edges 931, 933, etc. (e.g., with hasSubnode property); the nodes 944 (Name) and 946 (Description) are connected to their respective child nodes 960, 962 (both representing languageCode) via respective edges 951, 953 (e.g., with hasSubnode property); and so on.

For clarity, some of the nodes are omitted from FIG. 9. For instance, the node 948 (ActionCode) can be connected to two value nodes representing minimum and maximum cardinalities of the ActionCode via two edges (e.g., with properties hasMinCardinality and hasMaxCardinality). As another example, the root node 910 can be connected to a value node representing a version number of the CostCenter API (e.g., with the property hasVersion).

Example 10—Example Overall Method of Message-Based API Management

FIG. 10 is a flowchart illustrating an example overall method 1000 of message-based API management, and can be performed, for example, by the computing system 100, 200, or 300 described above.

At 1010, a software provider (e.g., the API publisher 110 or 220) can register a new version of an API with an API registry (e.g., 120, 220, 320, 520, etc.).

At 1020, the API registry can transform the registered new version of the API to a first knowledge graph, e.g., using the method 600 described above with reference to FIG. 6.

At 1030, the API registry can compare the first knowledge graph to a second knowledge graph to determine a difference graph (which can also be referred to as a "difference knowledge graph" or "delta knowledge graph" or "change graph"). The second knowledge graph can be transformed from a prior version of the API. The difference graph connects the second knowledge graph to the first knowledge graph and identifies changes from the second knowledge graph to the first knowledge graph.

At 1040, the API registry can send the difference graph to selected entities who have subscribed to the API registry (e.g., one or more of the API subscribers 130 and 230).

In some examples, each entity who has subscribed to the API registry can create a customized subscription configuration file (also referred to as a "subscription profile"). The subscription configuration file can specify API change conditions that would trigger the difference graph to be sent from the API registry to the entity. Responsive to determining that the identified changes from the second knowledge graph to the first knowledge graphs satisfy at least one of the API change conditions specified in the entity's subscription configuration file, the API registry will notify (e.g., via a message broker) the entity the identified changes. In other words, the entity will receive notification if, and only if, that API changes fits within the subscription profile of the entity.

The API change conditions can include any changes identified in the difference graph. Example API change conditions can include: a creation of a new node in the first knowledge graph, a deletion of a node in the second knowledge graph, a datatype change for a node that is shared by both the first and second knowledge graphs, etc., as described further below.

For each entity who has subscribed to the API registry, the subscription configuration file can specify only those API change conditions that the entity is interested in. Thus, even if the difference graph indicates that there are many API changes, it is possible that only a subset of these API changes (or even none of the API changes) satisfy the API change conditions specified in an entity's subscription configuration file. As a result, the entity will not receive notification for API change conditions that the entity is not interested in.

For example, if the entity's subscription configuration file includes only one API change condition which is a datatype change for a particular node, then the entity will receive a notice from the API registry if, and only if, the particular node changes its datatype from the second knowledge graph to the first knowledge graph. Other identified changes in the difference graph (e.g., adding and/or deletion of a node) would not trigger notification to the entity. As another example, if the entity's subscription configuration file includes two API change conditions, e.g., addition of a new node and deletion of an existing node, then the entity will receive notification anytime when an existing node in the second knowledge graph is deleted in the first knowledge graph, or anytime when a new node is introduced in the first knowledge graph (i.e., the node is absent in the second knowledge graph). Other identified changes in the difference graph (e.g., change of datatypes for certain nodes) would not trigger notification to the entity.

Example 11—Example Overall Method of Generating Difference Graphs

Figure 11:
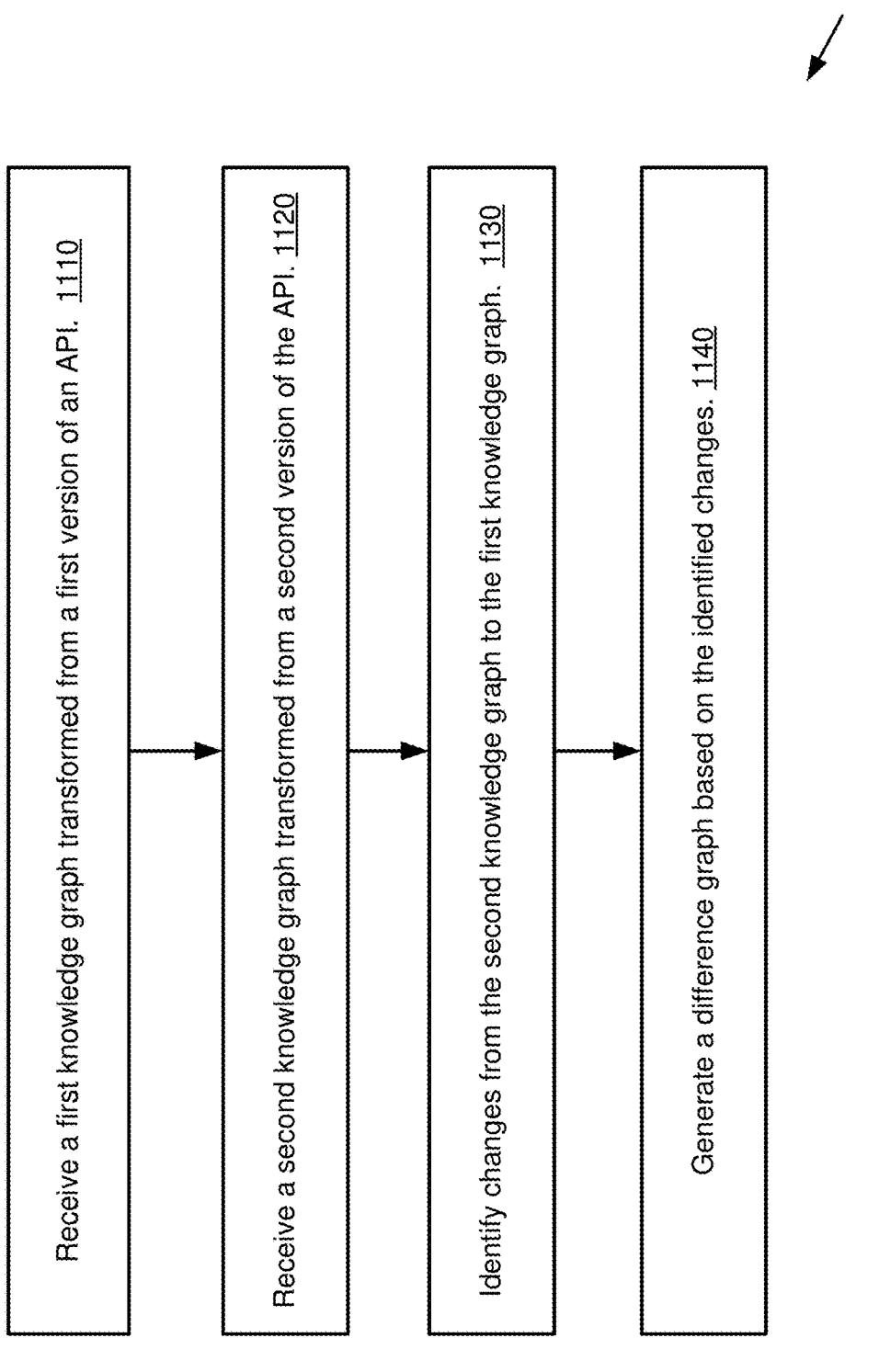
FIG. 11 is a flowchart illustrating an example overall method of generating a difference graph representing changes between two different versions of APIs.

FIG. 11 a flowchart illustrating an overall method 1100 of generating a difference graph representing changes between two different versions of APIs, and can be performed, e.g., by the predecessor and transformation maintenance module 342 of FIG. 3.

At 1110, the method 1100 can receive a first knowledge graph transformed from a first version of an API (e.g., using the method 600 described above with reference to FIG. 6). In some examples, the first knowledge graph can be retrieved from a knowledge graph storage (e.g., 334).

At 1120, the method 1100 can receive a second knowledge graph transformed from a second version of the API (e.g., using the method 600 described above with reference to FIG. 6). In some examples, the second knowledge graph can be retrieved from a knowledge graph storage (e.g., 334).

At 1130, the method 1100 can identify changes from the second knowledge graph to the first knowledge graph.

Such changes can include any changes in nodes or edges of between the two knowledge graphs. Identification of such changes can be performed by comparing topology of the first and second knowledge graphs. For example, each knowledge graph has a tree structure and can be traced from the root node to each of the leaf nodes to generate a plurality of paths, where each path links the root node to a corresponding leaf node, e.g., via zero, one, or more intermediate sub-nodes therebetween. By comparing the paths between the first and second knowledge graphs, differences in nodes and/or edges between the first and second knowledge graphs can be identified.

At 1140, the method 1100 can generate a difference graph based on the identified changes from the second knowledge graph to the first knowledge graph.

In some examples, the difference graph can connect the second knowledge graph to the first knowledge graph via one or more revision edges. The one or more revision edges can represent the identified changes from the second knowledge graph to the first knowledge graph.

Example 12—Example Ontology of Difference Graphs

The ontology of the difference graphs can include the same predefined schema of knowledge graphs representing APIs, as described above. Additionally, the ontology of the difference graphs can include additional predefined schema characterizing changes in nodes and/or edges between two different knowledge graphs.

In the following examples, unless explicitly stated otherwise, it is assumed that a difference graph represents identified changes from a second knowledge graph (e.g., representing an older version of an API) to a first knowledge graph (e.g., representing a newer version of the API).

In some examples, the difference graph can have some new classes or node types. One example node type is NewNode which represents a node that is present in the first knowledge graph but is absent from the second knowledge graph. The NewNode can represent metadata objects or data values introduced in the newer version of the API (and not present in the older version of the API). In some examples, two sub-classes or sub-node types, e.g., NewSubNode and NewValue, can be used to differentiate between new metadata objects and new data value introduced in the newer version of the API but not included in the older version of the API.

Another example node type is DeletedNode which represents a node that is present in the second knowledge graph but is absent from the first knowledge graph. The Deleted-Node can represent a metadata object or data value that is included in the older version of the API but not in the newer version of the API. In some examples, two sub-classes or sub-node types, e.g., DeletedSubNode and DeletedValue, can be used to differentiate between metadata objects and data values deleted from in the older version of the API (and not included in the newer version of the API).

In some examples, the difference graph can have some new edges or properties, also referred to as revision edges. Each revision edge points from a node in the second knowledge graph to a node in the first knowledge graph, where the node in the second knowledge graph can be deemed as a parent node and the node in the first knowledge graph can be deemed as a child node.

One example revision edge can be a NewNode edge which points from a parent node in the second knowledge graph to a child node (e.g., with the NewNode node type) in the first knowledge graph representing a new node. In some examples, two different revision edges or sub-properties, e.g., NewSubNode and NewValue, can be used to connect parent nodes in the second knowledge graph to child nodes in the first knowledge graph having NewSubNode and NewValue sub-node types, respectively.

Another example revision edge can be a DeletedNode edge which points from a parent node in the second knowledge to a child node (e.g., with the DeletedNode node type) in the first knowledge graph representing a deleted node. In some examples, two different revision edges or sub-properties, e.g., DeletedSubNode and DeletedValue, can be used to connect parent nodes in the second knowledge graph to child nodes in the first knowledge graph having DeletedSubNode and DeletedValue sub-node types, respectively.

Another example revision edge can be a PropertyChange edge which points from a parent node in the second knowledge graph to a child node in the first knowledge graph, where the parent node and the child node represent the same metadata object which nonetheless have with different properties in the two versions of API. In some examples, different revisions edges or sub-properties can be used to represent different types of property changes. For example, a Data-typeChange edge can indicate that the child node has a changed datatype compared to the parent node, a NameChange edge can indicate that the child node has a name change compared to the parent node, a DeletedKey edge can indicate that a key field in the parent node is deleted in the child node, a NewKey edge can indicate that the child node has a new key field that is absent in the parent node, etc.

Example 13—Example Use Cases of Generating Difference Graphs

Figure 12:
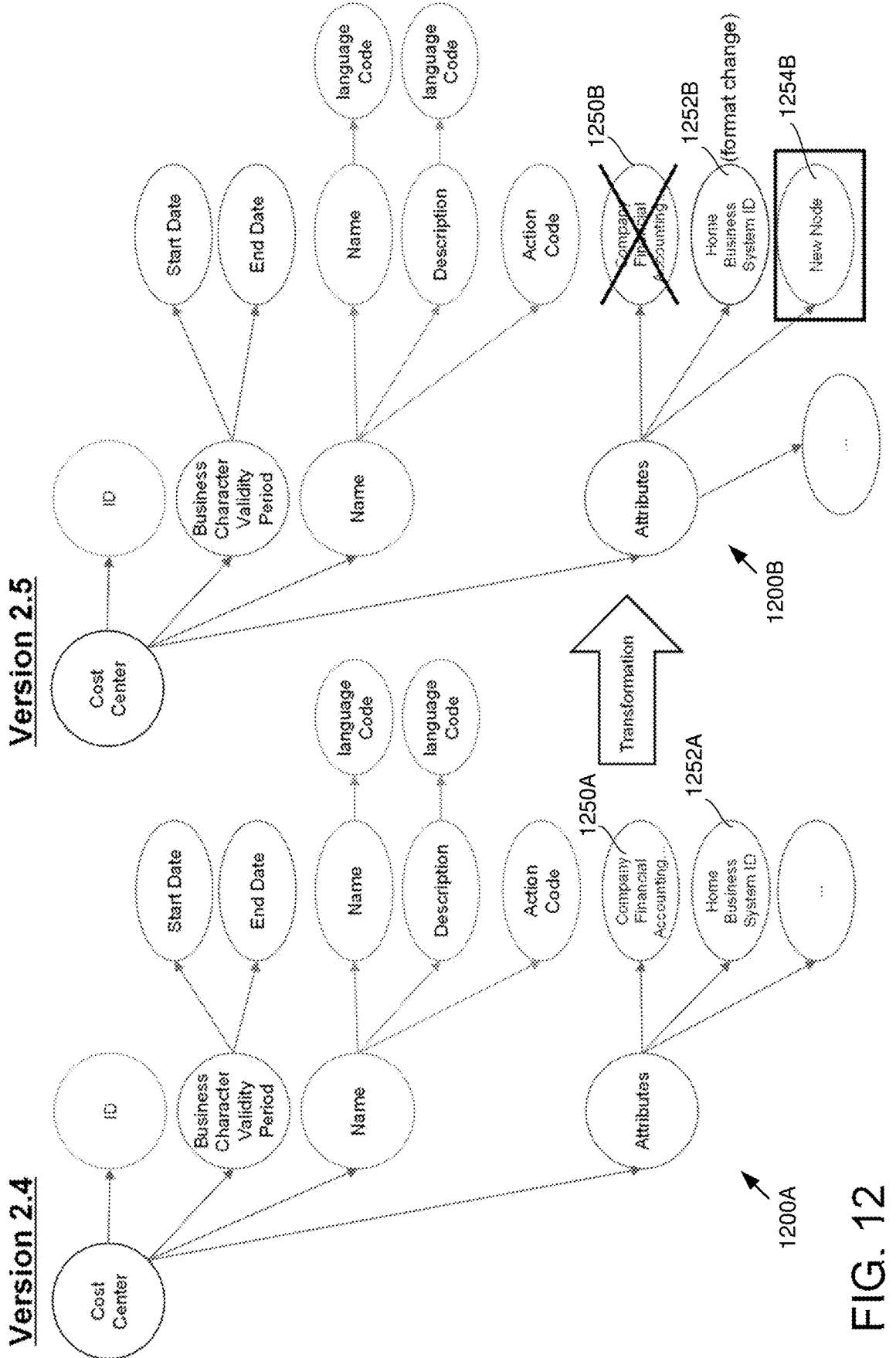
FIG. 12 depicts portions of two knowledge graphs representing two different versions of an API.
Figure 13:
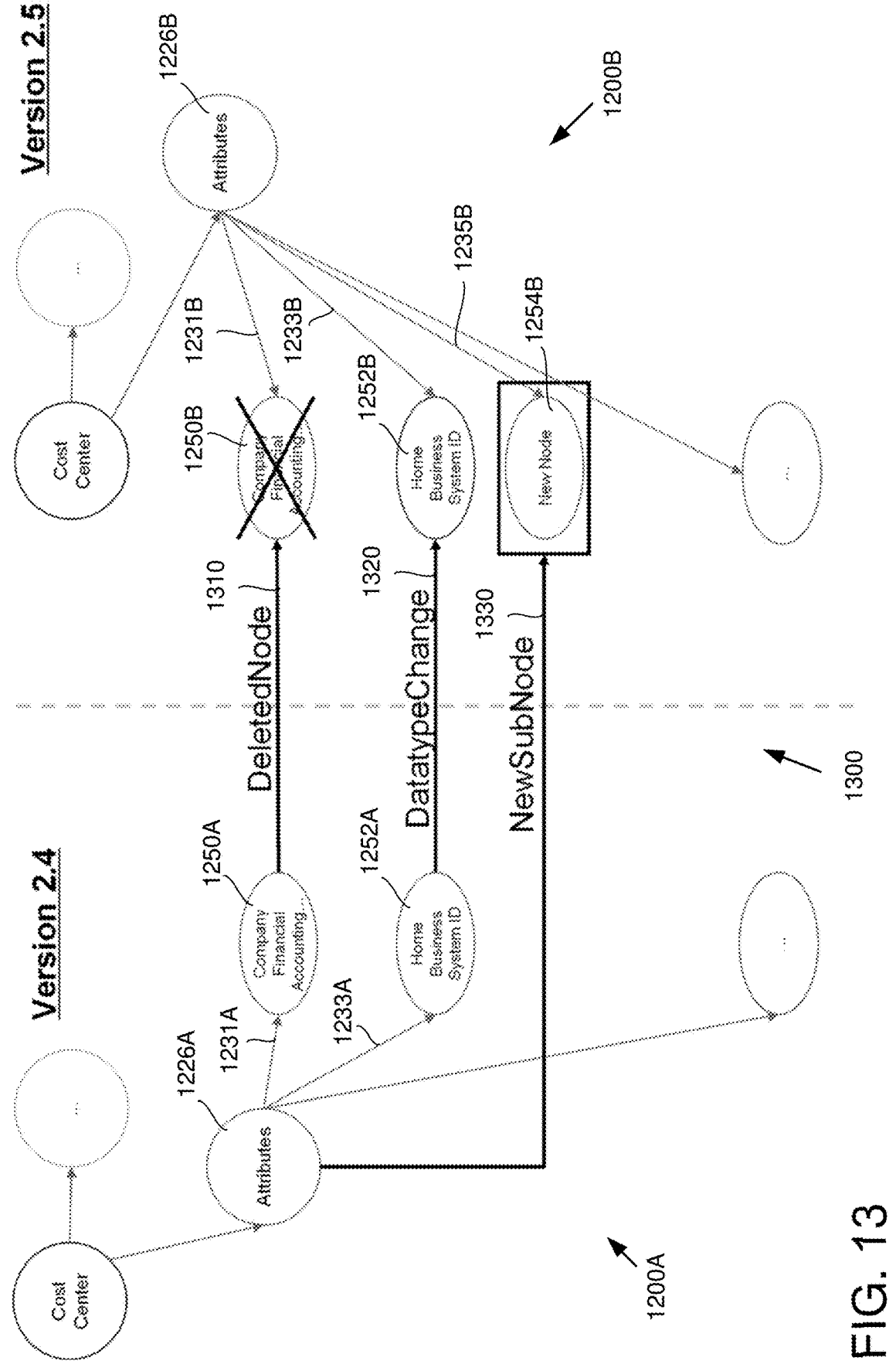
FIG. 13 depicts a portion of a difference knowledge graph representing changes between the two different versions of API of FIG. 12.

FIGS. 12-13 illustrate an example of generating a difference graph based on two knowledge graphs 1200A and 1200B and representing two different versions (e.g., version 2.4 and version 2.5) of an API.

In the example depicted in FIG. 12, three differences can be identified between the knowledge graphs 1200A and 1200B: First, the node 1250A in the knowledge graph 1200A (representing the metadata object CompanyFinancia-lAccounting in version 2.4 of the API) is not present in the knowledge graph 1200B, indicating that version 2.5 of the API does not have the metadata object CompanyFinancia-lAccounting. However, to generate the difference graph, a "deleted node" 1250B (corresponding to the node 1250A) can be artificially created in the knowledge graph 1200B. Second, the node 1252A in the knowledge graph 1200A (representing the metadata object HomeBusinessSystemID in version 2.4 of the API) and the node 1252B in the knowledge graph 1200B (representing the same metadata object HomeBusinessSystemID in version 2.5 of the API) have different datatypes or data formats. Third, a new node 1254B in the knowledge graph 1200B represents a new metadata object that is introduced in version 2.5 of the API, but no corresponding node is present in the knowledge graph 1200A.

FIG. 13 shows a difference graph 1300 generated based on the identified differences between the two knowledge graphs 1200A and 1200B. As shown, the difference graph 1300 can connect the knowledge graph 1200A to the knowledge graph 1200B by a plurality of revision edges including: (1) a DeletedNode edge connecting from the node 1250A in the knowledge graph 1200A to the "deleted node" 1250B that is artificially created in the knowledge graph 1200B; (2) a DatatypeChange edge connecting from the node 1252A in the knowledge graph 1200A to the node 1252B in the knowledge graph 1200B; and (3) a NewSubNode edge connecting from the node 1226A (representing the metadata object Attributes in version 2.4 of the API) in the knowledge graph 1200A to the new node 1254B in the knowledge graph 1200B.

Example 14—Example Methods of Creating Revision Edges

Example methods for creating revisions edges in a difference graph are described herein. Similarly, it is assumed that a difference graph represents identified changes from a second knowledge graph (e.g., representing an older version of an API) to a first knowledge graph (e.g., representing a newer version of the API).

In some examples, the identifying changes can include identifying a legacy node in the second knowledge graph that is not included in the first knowledge graph. As described herein, the legacy node represents a metadata object or data value defined in the older version of the API but not in the newer version of the API. When generating the difference graph, a copy of the legacy node can be created in the first knowledge graph. A deleted-node revision edge (e.g., with the DeletedNode edge property) can be added to connect from the legacy node in the second knowledge graph to the copy of the legacy node in the first knowledge graph. A parent node of the legacy node in the second knowledge graph can be identified. Then the copy of the legacy node can be connected to another node in the first knowledge graph which matches the parent node of the legacy node in the second knowledge graph.

For example, FIG. 12 shows that the identified changes between the two knowledge graphs 1200A and 1200B includes a legacy node 1250A which is present in the knowledge graph 1200A but absent in the knowledge graph 1200B. Thus, to create the difference graph 1300, a copy of the legacy node 1250A, i.e., 1250B can be created in the knowledge graph 1200B. As shown in FIG. 13, a revision edge 1310 (with DeletedNode edge property) can be added which points from the legacy node 1250A in the knowledge graph 1200A to its copy 1250B in the knowledge graph 1200B. Because an edge 1231A (e.g., with the hasSubnode property) points from the node 1226A to the legacy node 1250A, the node 1226A can be identified as the parent node of the legacy node 1250A. It can be further identified that the node 1226B in the knowledge graph 1200B is a matching node of the node 1226A (i.e., the nodes 1226A and 1226B represent the same metadata object of the API). Thus, a corresponding edge 1231B (e.g., with the hasSubnode property) can be added to point from the node 1226B to the node 1250B.

In some examples, the identifying changes can include identifying a new node in the first knowledge graph that is not included in the second knowledge graph. As described herein, the new node represents a metadata object or data value defined in the newer version of the API but not in the older version of the API. When generating the difference graph, a new-node revision edge (e.g., with the NewSub-Node edge property) can be added to connect from a selected node in the second knowledge graph to the new node in the first knowledge graph. A parent node of the new node in the first knowledge graph can be identified. The selected node in the second knowledge graph can be identified as a node that matches the parent node of the new node in the first knowledge graph.

For example, FIG. 12 shows that the identified changes between the two knowledge graphs 1200A and 1200B includes a new node 1254B which is present in the knowledge graph 1200B but absent in the knowledge graph 1200A. Thus, to create the difference graph 1300, a revision edge 1330 (with NewSubNode edge property) can be added which points from a selected node 1226A in the knowledge graph 1200A to the new node 1254B in the knowledge graph 1200B. Here, the node 1226A is selected because it matches the node 1226B in the knowledge graph 1200B, and the node 1226B can be identified as a parent node of the new node 1254B (e.g., an edge 1235B with the hasSubnode property points from the node 1226B to the new node 1254B).

In some examples, the identifying changes can include identifying a pair of matching nodes comprising a first node in the first knowledge graph and a second node in the second knowledge graph. The first node in the first knowledge graph represents a metadata object having a first datatype, and the second node in the second knowledge graph represents the same metadata object having a second datatype which is different from the first datatype. When generating the difference graph, a datatype-changed revision edge (e.g., with the DatatypeChange edge property) can be added to connect from the second node in the second knowledge graph to the first node in the first knowledge graph. Other property changes (e.g., name change, added a key field, deleted a key field, etc.) between a pair of nodes representing the same metadata object can be similarly reflected in the difference graph by adding an edge between the pair of nodes with a corresponding edge property (e.g., NameChange, NewKey, DeletedKey, etc.).

For example, FIG. 12 shows that the identified changes between the two knowledge graphs 1200A and 1200B includes a datatype change from the node 1252A in the knowledge graph 1200A to the node 1252B in the knowledge graph 1200B. Thus, to create the difference graph 1300, a revision edge 1320 (with DatatypeChange edge property) can be added which points from a node 1252A in the knowledge graph 1200A to the node 1252B in the knowledge graph 1200B.

Example 15—Example Method of Cascading or Merging Difference Graphs

In some examples, the difference graphs between multiple versions of the API can be cascaded and/or merged.

For example, the difference graph generated at 1140 of FIG. 11 can be denoted as a first difference graph. The method 1100 can further receive a third knowledge graph transformed from a third version of the API, identify changes from the third knowledge graph to the second knowledge graph, and generate a second difference graph based on identified changes from the third knowledge graph to the second knowledge graph. The second version of the API can be an intermediate version between the third and first versions of the API.

Accordingly, the first difference graph and the second difference graph can be connected together or cascaded using the second knowledge graph as an intermediary between the first knowledge graph and the third knowledge graph.

In some examples, the first difference graph and the second difference graph can be merged together to generate a merged difference graph. For examples, the first difference graph can include one or more first revision edges connecting the second knowledge graph to the first knowledge graph, where the one or more first revision edges represent the identified changes from the second knowledge graph to the first knowledge graph. The second difference graph can include one or more second revision edges connecting the third knowledge graph to the second knowledge graph, where the one or more second revision edges represent the identified changes from the third knowledge graph to the second knowledge graph. The merged difference graph can connect the third knowledge graph to the first knowledge graph via one or more consolidated revision edges based on the one or more first revision edges and the one or more second revision edges, where the one or more consolidated revision edges represent accumulated changes from the third knowledge graph to the first knowledge graph. The second knowledge graph can be omitted from the merged difference graph.

Figure 14:
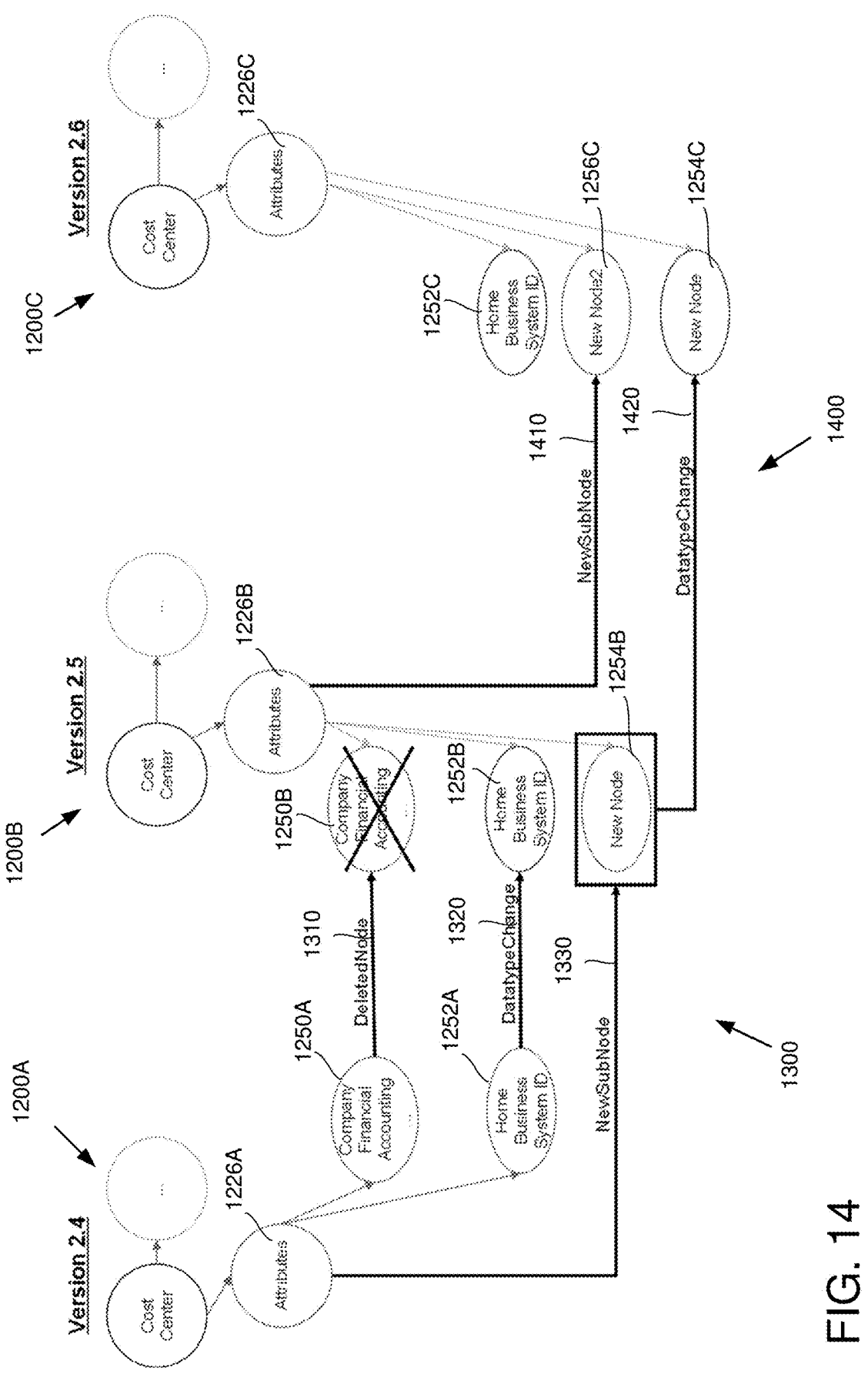
FIG. 14 depicts portions of two difference knowledge graphs representing changes between three different versions of an API.

As an example, FIG. 14 shows two difference graphs 1300 and 1400 generated based on three knowledge graphs 1200A, 1200B, 1200C, which respectively represent three different versions (e.g., version 2.4, version 2.5, and version 2.6) of an API.

As described above, the difference graph 1300 is generated based on the identified differences between the two knowledge graphs 1200A and 1200B. As shown, the difference graph 1300 include a first revision edge 1310 (with DeletedNode edge property) connecting from the legacy node 1250A in the knowledge graph 1200A to a copy of the legacy node 1250B in the knowledge graph 1200B, a second revision edge 1320 (with DatatypeChange edge property) connecting from the node 1252A in the knowledge graph 1200A to the node 1252B in the knowledge graph 1200B, and a third revision edge (with NewSubNode edge property) connecting from a selected node 1226A in the knowledge graph 1200A to the new node 1254B in the knowledge graph 1200B.

Similarly, the difference graph 1400 can be generated based on two identified differences between the two knowledge graphs 1200B and 1200C. First, another new node 1256C is added to the knowledge graph 1200C (and linked to its parent node 1226C). Second, the new node 1254B introduced in the knowledge graph 1200B has a property (datatype) change in the knowledge graph 1200C. Accordingly, the difference graph 1400 includes one revision edge 1410 (with NewSubNode edge property) connecting from a selected node 1226B (which matches the parent node 1226C) in the knowledge graph 1200B to the new node 1256C in the knowledge graph 1200C, and another revision edge 1420 (with DatatypeChange edge property) connecting from the node 1254B in the knowledge graph 1200B to the node 1254C in the knowledge graph 1200C.

As shown, the two difference graphs 1300 and 1400 are cascaded to link the three knowledge graphs 1200A, 1200B, and 1200C together, wherein the knowledge graph 1200B acts as an intermediary between the knowledge graphs 1200A and 1200C.

Figure 15:
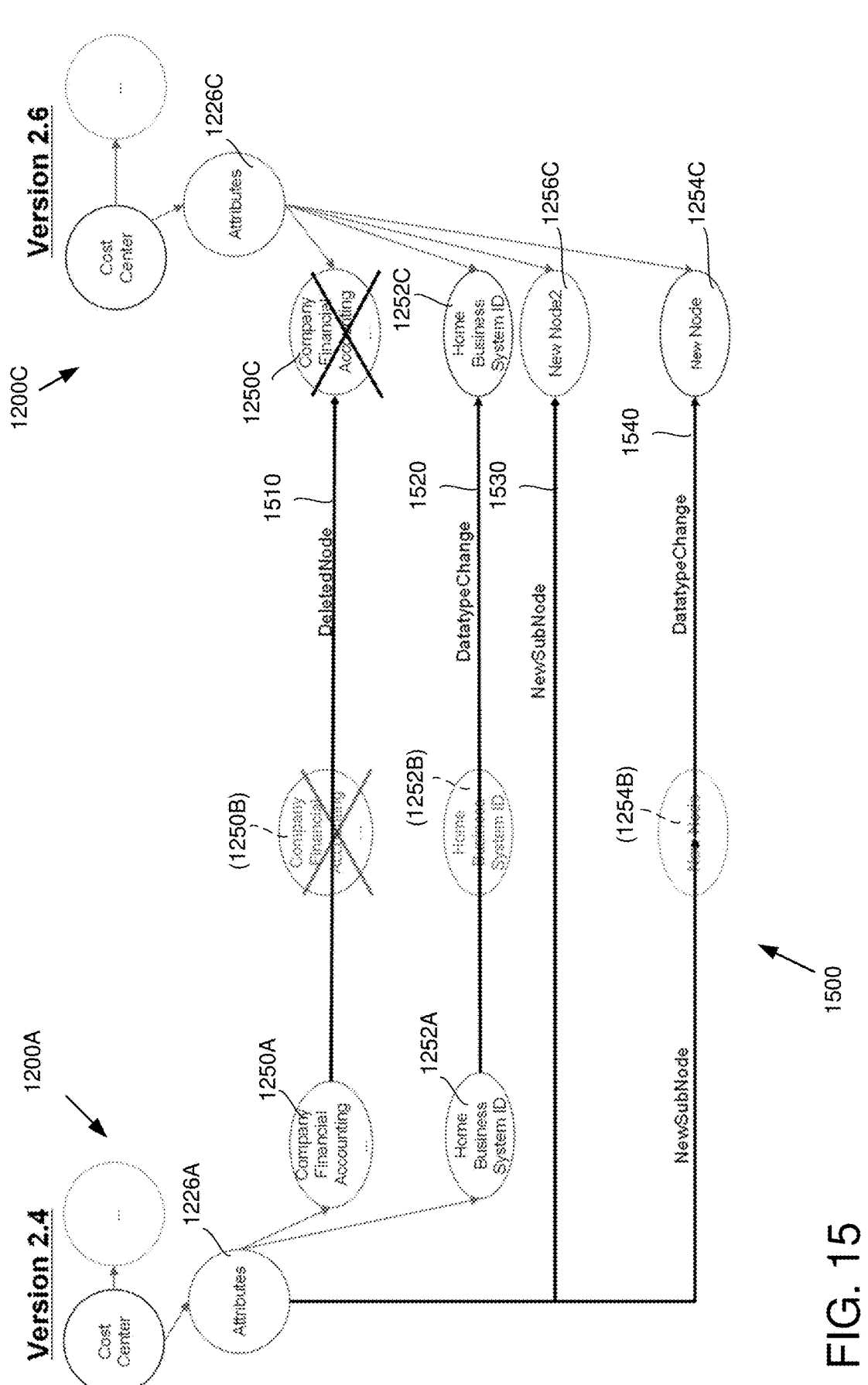
FIG. 15 depicts a portion of a difference knowledge graph by merging the two difference knowledge graphs of FIG. 14.

FIG. 15 shows an example difference graph 1500 generated by merging the two difference graphs 1300 and 1400 depicted in FIG. 14. As shown, the difference graph 1500 include consolidated revision edges, e.g., 1510, 1520, 1530, and 1540, which directly connect nodes in the knowledge graph 1200A to corresponding nodes in the knowledge graph 1200C. The knowledge graph 1200B can be omitted from the difference graph 1500 (e.g., relevant nodes 1250B, 1252B, and 1254B are grayed in FIG. 15 for illustrative purpose, but these nodes can be completely hidden in the merged difference graph 1500).

As shown, the revision edge 1510 (with DeletedNode edge property) connects from the node 1250A in the knowledge graph 1200A to the node 1250C in the knowledge graph 1200C. The node 1250C can be duplicated from the node 1250B in the knowledge graph 1200B to indicate that the deletion of legacy node 1250A from the knowledge graph 1200B is propagated to the knowledge graph 1200C. Similarly, the node 1250C can be connected to a parent node 1226C which matches the node 1226A.

The revision edge 1520 (with DatatypeChange edge property) connects from the node 1252A in the knowledge graph 1200A to the node 1252C in the knowledge graph 1200C, indicating that the datatype change for the underlying metadata object (e.g., from the node 1252A to the node 1252B) is persisted to the node 1252C.

The revision edge 1530 (with NewSubNode edge property) connects from the node 1226A in the knowledge graph 1200A to the node 1256C in the knowledge graph 1200C, indicating that the node 1256C is newly introduced in the knowledge graph 1200C. The parent node 1226C of the node 1256C in the knowledge graph 1200C matches the node 1226A in the knowledge graph 1200A (i.e., the nodes 1226A and 1226C represent the same metadata object of the API).

The revision edge 1540 (with combined NewSubNode and DatatypeChange edge properties) connects from the node 1226A in the knowledge graph 1200A to the node 1254C in the knowledge graph 1200C. This indicates that the metadata object represented by node 1254C is first introduced in an intermediate version of the API (e.g., version 2.5 represented by the knowledge graph 1200B) and subsequently have a change of datatype. Similarly, the parent node 1226C of the node 1254C in the knowledge graph 1200C matches the node 1226A in the knowledge graph 1200A.

In some examples, it may not be needed to first generate two difference knowledge graphs 1300 and 1400, and then merge them together to generate the difference graph 1500. Instead, the difference graph 1500 can be generated directly by using the method 1100 described above, e.g., based on identified changes from the knowledge graph 1200A to the knowledge graph 1200C, without examining the intermediate knowledge graph 1200B. This approach may simplify the calculation and reduce the memory usage (e.g., no need to save multiple difference graphs).

In other examples, it may be desired to generate a series of difference graphs between different versions of the API and then merge those difference graphs together to generate a merged difference graph. Using this merged approach can reveal revision histories between different versions of APIs. For example, in the merged difference graph 1500, the consolidated revision edge 1540 has combined NewSubNode and DatatypeChange edge properties, indicating two sequential revisions related to the metadata object represented by the node 1254C. If the difference graph 1500 is directly generated based only on the knowledge graphs 1200A and 1200C, the corresponding revision edge linking the nodes 1226A and 1254C would have the NewSubNode edge property only because the datatype change from version 2.5 to version 2.6 of the API would not be revealed.

Additionally, as described below, sometimes the automatically generated difference graphs may be manually modified, e.g., to correct certain errors. The merged difference graph can capture such manual corrections. For example, if an error is manually corrected in the difference graph 1300, such a correction will be reflected in the merged difference graph 1500. On the other hand, if the difference graph 1500 is directly generated based only on the knowledge graphs 1200A and 1200C, the manual correction made to the difference graph 1300 would be lost in the difference graph 1500.

Example 16—Example Method for Manual Review of Knowledge Graphs

Figure 16:
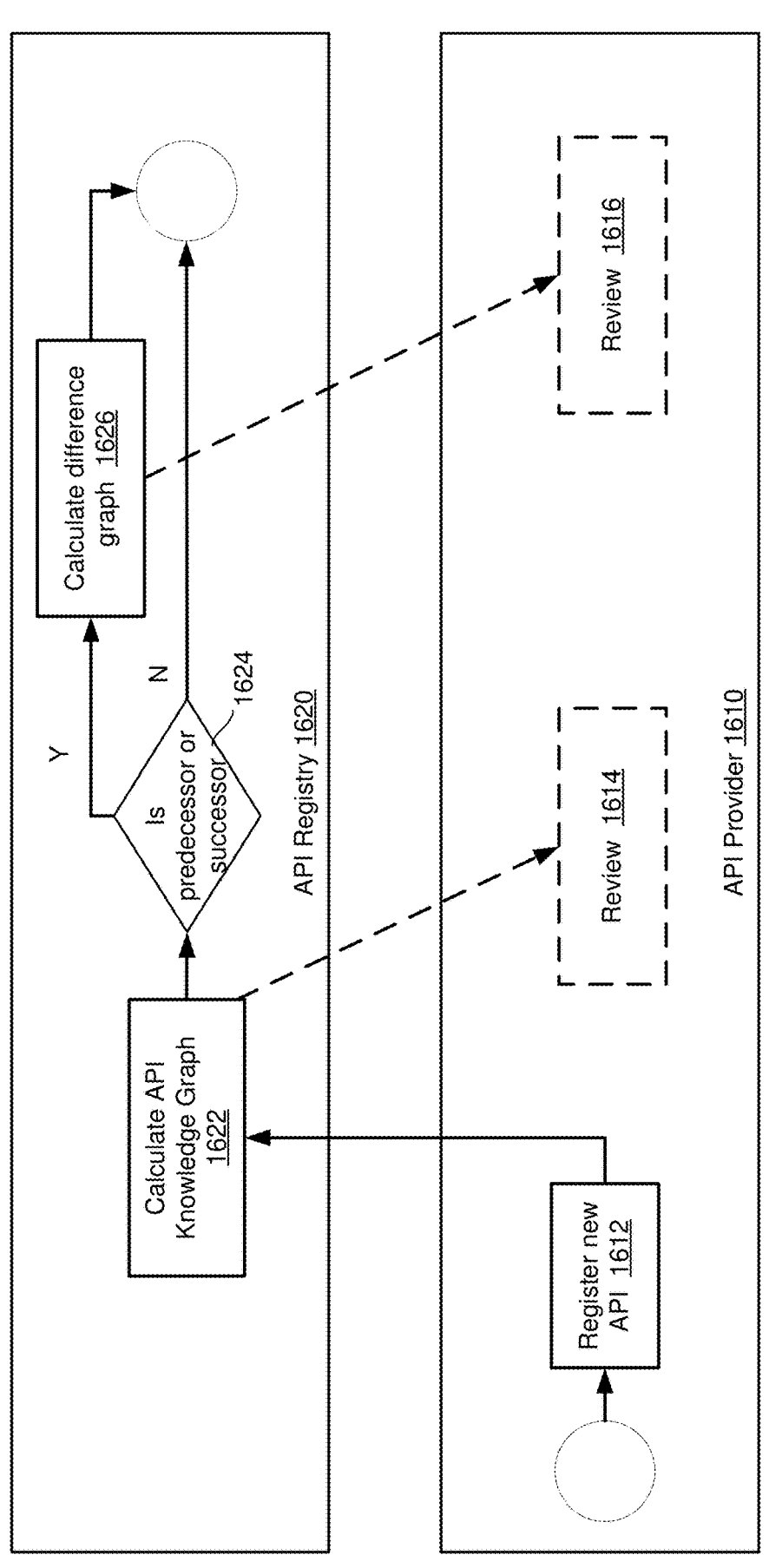
FIG. 16 is a high-level flow diagram illustrating an example process for manual review and edit of the knowledge graphs automatically generated by an API registry.

In certain examples, API providers can review and edit the knowledge graphs (including the difference graphs) generated by the API registry, as illustrated by the high-level flow diagram of FIG. 16.

At 1612, an API provider 1600 can register a new API with an API registry 1620.

At 1622, the API registry 1620 can automatically calculate or generate a knowledge graph representation of the newly registered API, e.g., according to the method 600 described above.

Optionally, at 1614, the automatically generated knowledge graph representation of the newly registered API can be presented to the API provider 1610, e.g., through a graphical user interface. The API provider 1610 can review and edit the knowledge graph, as necessary. For example, the API provider 1610 can add annotations to the knowledge graph to explain some of the nodes or edges in the knowledge graph. In another example, the API provider 1610 can manually modify the knowledge graph, if needed.

At 1624, the API registry 1620 can check if there is a predecessor or successor of the newly registered API. For example, the API registry 1620 can search a knowledge graph repository (e.g., 334) to check if there is a previously stored knowledge graph which represents an older version (i.e., predecessor) or a newer version (i.e., successor) of the API than the newly registered API.

If the condition check at 1624 returns yes, the API registry 1620 can proceed to 1626 to calculate or determine a difference graph between the knowledge graph corresponding to the newly registered API and the previously stored knowledge graph (corresponding to the predecessor or successor of the newly registered API), e.g., according to the method 1100 described above. No difference graph is generated if the condition check at 1624 returns no.

Optionally, at 1616, the generated difference graph can be presented to the API provider 1610 for review, e.g., through a graphical user interface. The API provider 1610 can review and edit the difference graph, as necessary. For example, the API provider 1610 can add annotations to the difference graph to explain reasoning for some of the changes between two different versions of the API. In another example, the API provider 1610 can manually correct some errors made in the automatically generated difference graph.

For instance, between two different versions of the API, one metadata object may be renamed. As a result, the automatically generated difference graph may incorrectly identify that a new node is added in the knowledge graph representing the newer version of the API and a legacy node is deleted from the knowledge graph representing the older version of the API, but such new node and deleted legacy node actually represent the same attribute. In such a case, the API provider 1610 can manually correct the mistake in the difference graph, e.g., by revoking the node deletion (from the older version of knowledge graph) and node addition (to the newer version of the knowledge graph), and directly linking the two nodes (representing the same metadata object) in the two knowledge graphs with a revision edge (e.g., with the NameChange edge property).

Example 17—Example User Interfaces of API Registry

FIGS. 17-20 shows several example user interfaces through which an API publisher or an API subscriber can interface with the API registry (e.g., 120, 220, 320, 520, etc.). It is to be understood that the layout of the user interfaces are merely for illustration purposes and any of the user interfaces described below can be modified as needed.

Figure 17:
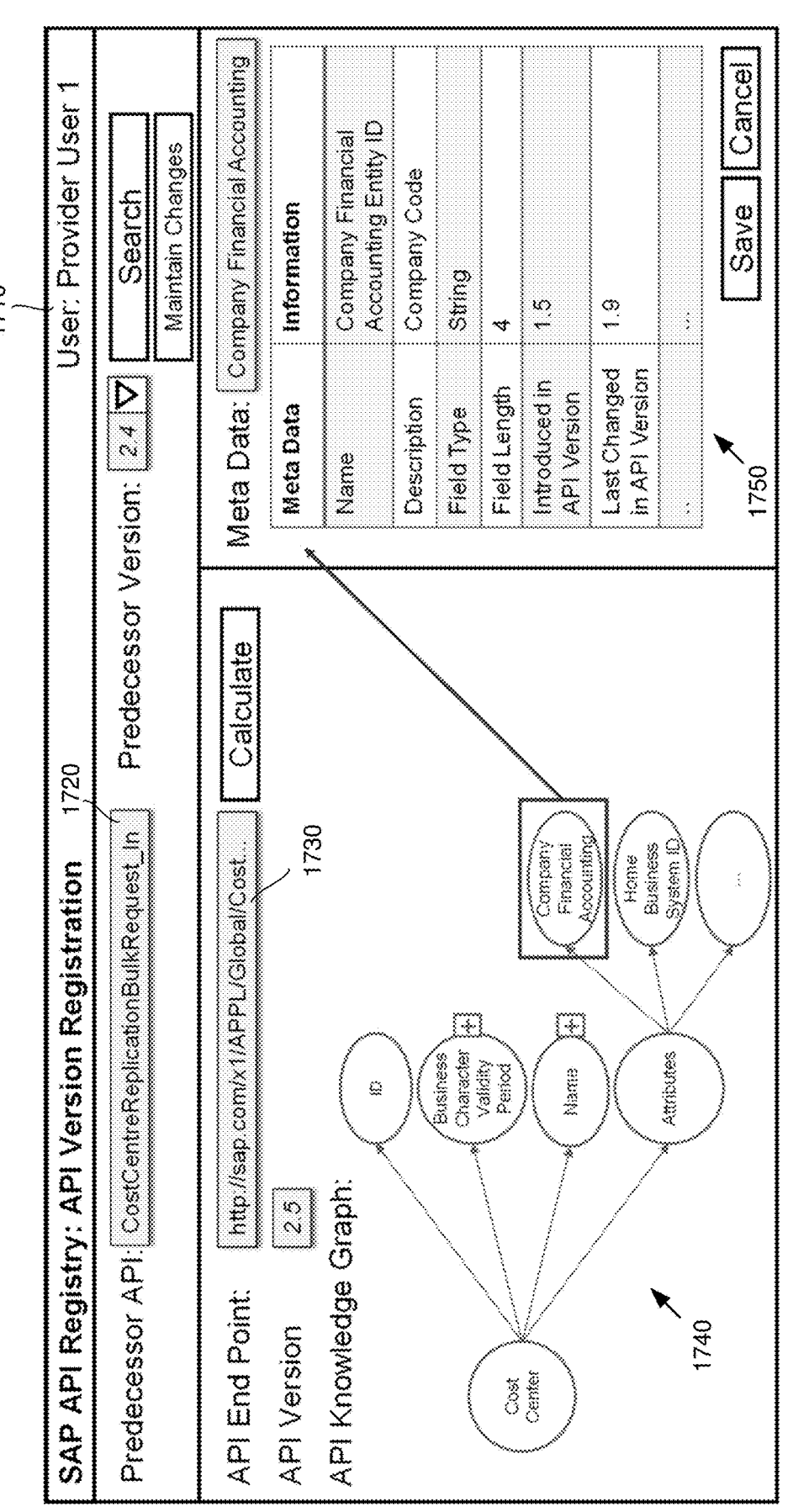
FIG. 17 is an example user interface displaying a knowledge graph representing a selected version of an API.

FIG. 17 shows one example user interface 1700 through which a user 1710 (e.g., an API publisher named "Provider User 1") can register a new version (e.g., version 2.5) of an API. In the depicted example, the user interface 1700 provides a link or reference 1720 (e.g., a URL) to a prior version of the API (e.g., version 2.4), or predecessor API. The API provider can enter an address or location 1730 of an API specification document (e.g., generated by a Swagger adapter, etc.) corresponding to the new version of the API. Then, the API provider can trigger (e.g., by clicking a "Calculate" button, etc.) transformation of the API to generate a knowledge graph representing the API (e.g., using the method 600 described above). The generated knowledge graph can be displayed in a display window 1740. The knowledge graph can be arranged (e.g., left-to-right, top-to-bottom, etc.) to show hierarchical relationship between the nodes. The user can scale the knowledge graph, e.g., by collapsing/hiding or expanding/showing child nodes of any given node. The user can also zoom, pan, and/or otherwise browse through different portions of the knowledge graph within the display window 1740. Corresponding metadata and schematic data value of the API can be shown in another window 1750. For example, the user can click individual node of the knowledge graph to view meta data represented by the node. In certain examples, the user can edit the knowledge graph, e.g., by annotating and/or changing information presented in the window 1750.

Figure 18:
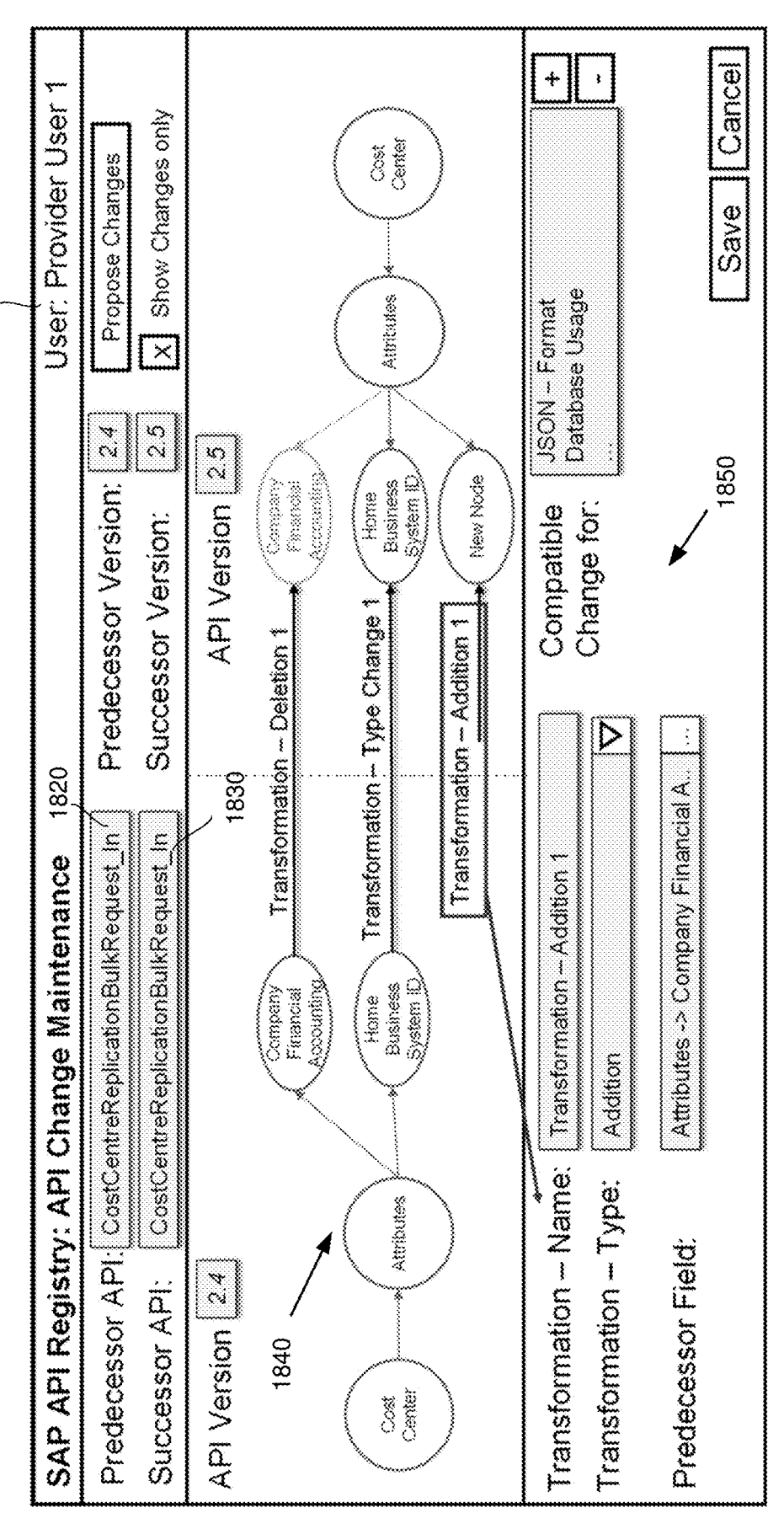
FIG. 18 is an example user interface displaying a difference graph representing changes between two different versions of an API.

FIG. 18 shows another example user interface 1800 through which a user 1810 (e.g., an API publisher named "Provider User 1") can generate a difference graph based on two knowledge graphs representing two different versions of an API. In the depicted example, the user can select a link or reference 1820 (e.g., a URL) to a prior version (e.g., version 2.4) of the API, or predecessor API, and another link or reference 1830 (e.g., another URL) to a newer version (e.g., version 2.5) of the API, or successor API. The user can then trigger calculation of a difference graph based on two knowledge graphs which respectively represent the two versions of the API. The generated difference graph can be displayed in a display window 1840. In some examples, the revision edges in the difference graph can be highlighted. Similarly, the user can scale the difference graph, e.g., by collapsing/hiding or expanding/showing child nodes of any given node, and the user can also zoom, pan, and/or otherwise browse through different portions of the difference graph within the display window 1840. Information for the revision edges can be shown in another window 1850. For example, the user can click any revision edge to view information pertaining to changes between the two nodes connected by the revision edge. In certain examples, the user can edit the difference graph, e.g., by annotating and/or changing information presented in the window 1850. For example, as described above, the user can modify revision edges that are deemed to be incorrect.

Figure 19:
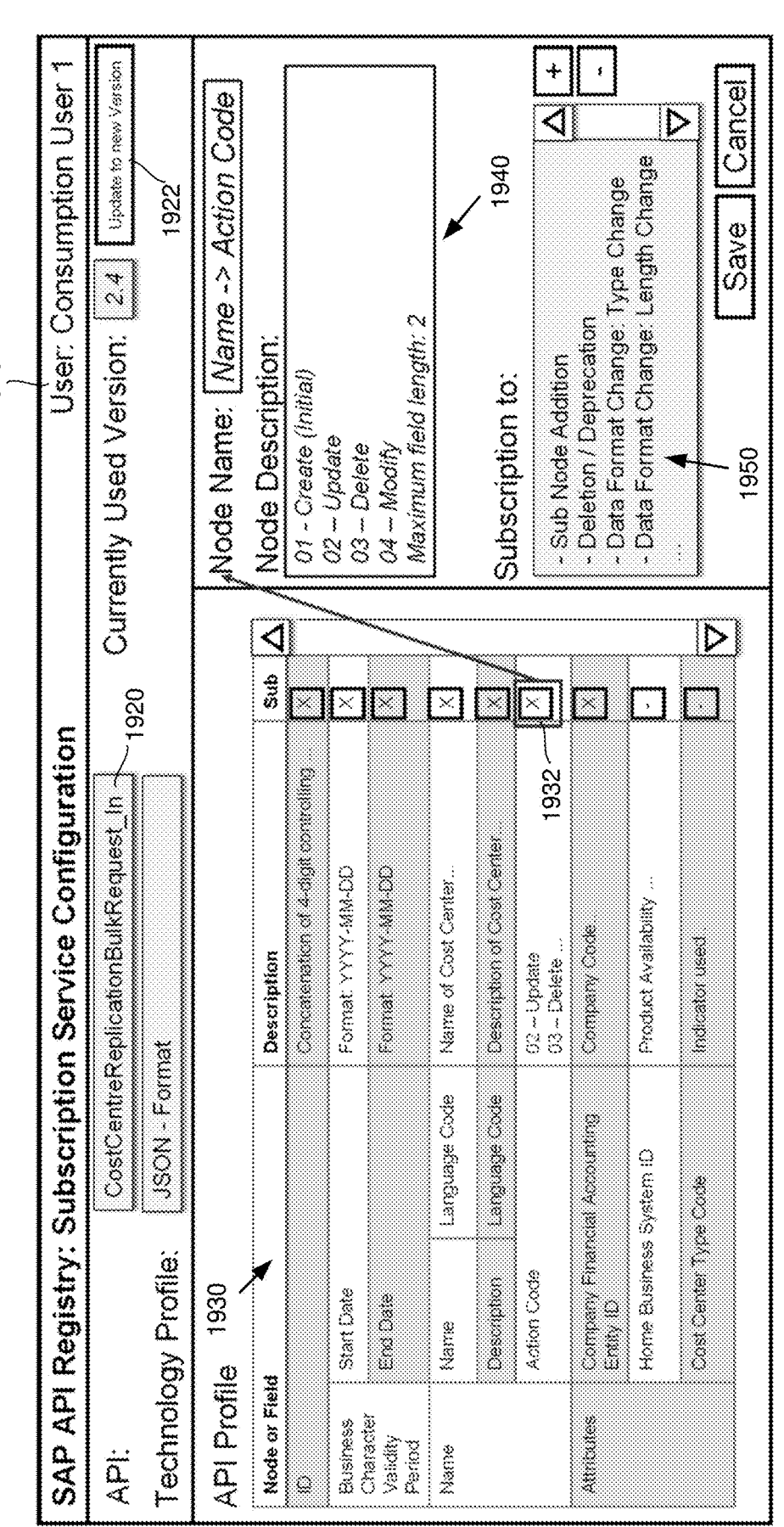
FIG. 19 is an example user interface through which a subscriber of an API registry can create a subscription profile.

FIG. 19 shows another example user interface 1900 through which a user 1910 (e.g., an API subscriber named "Consumption User 1") can create a subscription profile (or subscription configuration file). In the depicted example, the user can select a link or reference 1920 (e.g., a URL) to a specific version (e.g., version 2.4) of an API. A subscription profile of the user can be shown in an API profile window 1930. The displayed subscription profile can list metadata objects underlying all nodes of a knowledge graph representation of the API, e.g., in a tabularized format as depicted in FIG. 19. In other examples, the subscription profile can be presented in the knowledge graph format (e.g., similar to the knowledge graph and metadata shown in windows 1740 and 1750 depicted in FIG. 17). The user can select individual nodes (e.g., by checking boxes under the "Sub" column and next to the corresponding metadata object). In some examples, the API registry can provide one or more default subscription profiles from which the user can use. For example, one subscription profile can have a default setting where all nodes are selected or deselected. As another example, one default subscription profile can have particular types of nodes being selected while leaving other nodes deselected. For each selected node (e.g., the node 1932 representing metadata object ActionCode), all possible change conditions related to the selected node (e.g., initial node creation, node update, node deletion, node modification, etc.) can be displayed in a node description window 1940. The user can select which change conditions pertaining to the selected node are of interest. The user-selected change conditions can be displayed on another window 1950. In some examples, the default subscription profile(s) can pre-select or deselect certain change conditions. Once saved into the user's subscription profile, the user has subscribed to the selected change conditions pertaining to each of the selected nodes. As a result, the user is notified if, and only if, an API change satisfies one of the user-selected change conditions of the selected nodes. For example, if the user's subscription profile specifies that the user is only interested in any datatype change on one specific sub-node, the user will receive notification if the sub-node has a datatype change, but will not be notified if the sub-node merely has a name change.

Figure 20:
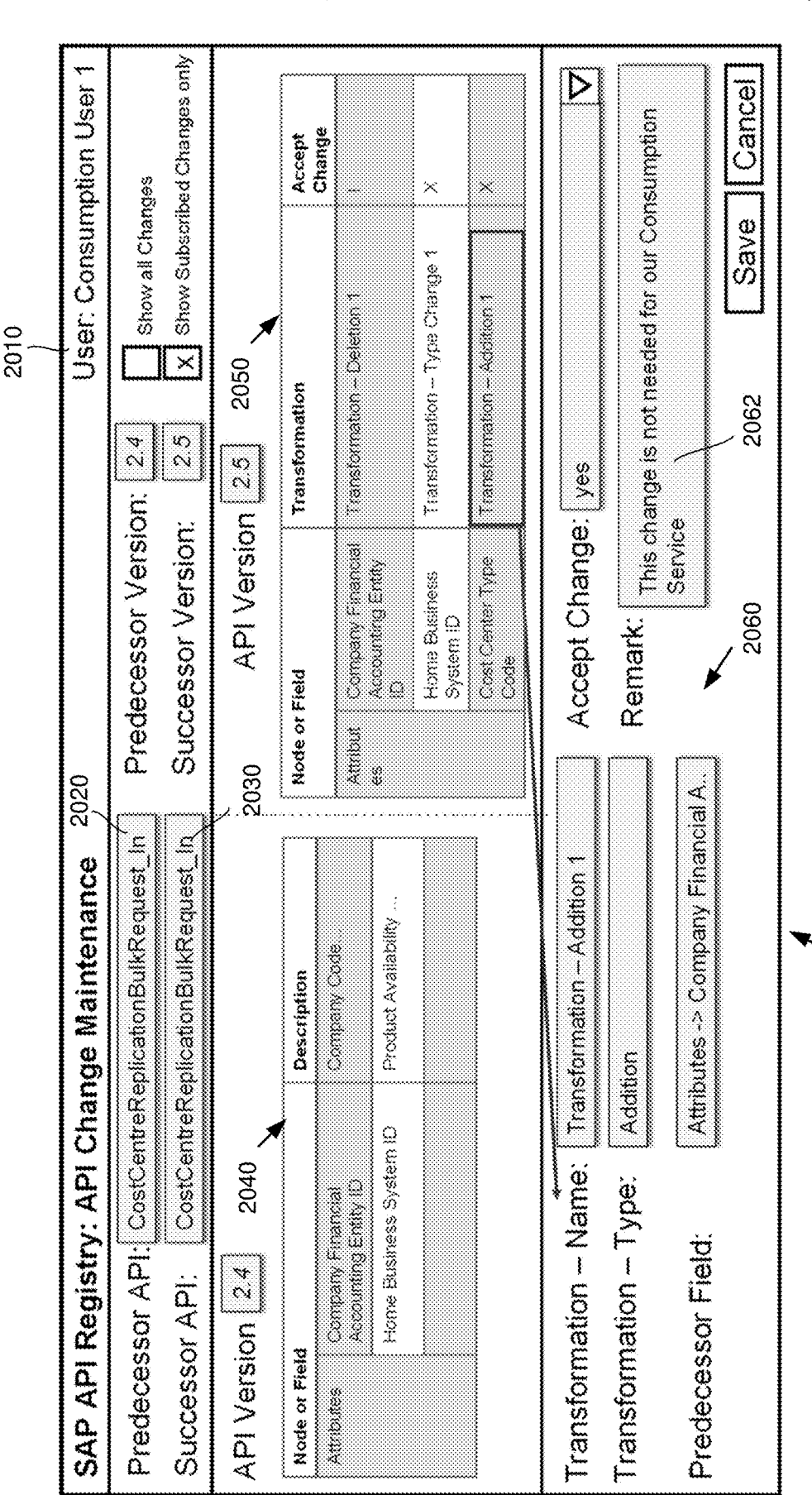
FIG. 20 is an example user interface through which a subscriber of an API registry can assess effects of an API update by simulation.

FIG. 20 shows another example user interface 2000 through which a user 2010 (e.g., an API subscriber named "Consumption User 1") can compare two different versions of APIs. In the depicted example, the user can select a link or reference 2020 (e.g., a URL) to a prior version (e.g., version 2.4) of the API, or predecessor API, and another link or reference 1830 (e.g., another URL) to a newer version (e.g., version 2.5) of the API, or successor API. In some examples, the predecessor API can be the API the user is currently using, and the successor API can be a new version API the user is considering upgrading to. The user can manually trigger a compatibility test between two version of the API. For example, the user interface 2000 can appear after the user wants to know the impacts of upgrading to a new version of the API, e.g., by clicking an "Update to new version" button 1922 in the user interface 1900 of FIG. 19.

In the background, a difference graph can be calculated based on two knowledge graphs which respectively represent the predecessor API and the successor API. The difference graph can be compared to the user's subscription profile to identify API changes (e.g., revision edges and nodes associated with the revision edges) that satisfy change conditions specified in the user's subscription profile. These identified API changes, also referred to as "profile-compatible API changes," can be a subset of all API changes represented by the difference graph. For example, some of the API changes that the user is not interested in (e.g., not satisfying the change conditions specified in the user's subscription profile) will not be identified as profile-compatible API changes.

As shown, metadata objects pertaining to the profile-compatible API changes can be displayed in windows 2040 and 2050, based on which the user can view the compatibility of the API according to the user's subscription profile. The window 2040 can display metadata objects represented by nodes of the knowledge graph representing the predecessor API, and the window 2050 can display metadata objects represented by corresponding nodes of the knowledge graph representing the successor API. The window 2050 can also display the types of changes (e.g., under the "Transformation" column) based on the properties of the revision edges (e.g., NewNode edge indicates an "Addition" transformation, DeletedNode edge indicates a "Deletion" transformation, DatatypeChange edge indicates a "Type Change" transformation, etc.). Although the windows 2040 and 2050 show the metadata in a tabularized format, in other examples, profile-compatible API changes can be shown in a graphic format. For instance, revision edges and nodes in the difference graph that are associated with profile-compatible API changes can be shown in the windows 2040 and 2050. Thus, the information displayed in windows 2040 and 2050 is a customized comparison (between the predecessor API and successor API) that is tailored to the subscription profile of the user.

Additional details of each profile-compatible API change can be further listed in another window 2060. The user can also choose to accept or reject each profile-compatible API change and add remarks (e.g., to explains reasons for the acceptance or rejection). In some examples, the user interface 2000 can be connected to a ticketing system. The user's acceptance/rejection of the profile-compatible API changes, together with the remarks, once confirmed (e.g., by clicking a "Save" button), can automatically trigger the ticketing system to generate of a ticket, which can be automatically sent to the API publisher for review. Based on the received tickets, the API publisher can access impact of releasing the new API on API subscribers.

Example 18—Example Method of Running Simulations on API Registry

The API registry described herein allow both API publishers and API subscribers to run simulations.

For example, an API publisher can run simulation on the API registry to quantify how many active users (e.g., API subscribers) are interested in or still using a particular metadata object of an API by searching the subscription profiles stored on the API registry. Similarly, by analyzing the stored subscription profiles, the API publisher can also assess the impact of particular changes to the API (e.g., the API provider can determine how many API subscribers would receive notifications triggered by a particular API change). Such simulation results can be used by the API publisher to determine and/or adjust the API development/release/support strategy accordingly. Additionally, the API provider can receive feedback on API changes (e.g., through a ticketing system in connection with the API registry) and can react to the feedback received, as described above.

On the other side, an API subscriber can run simulations to determine the technical impact of upgrading or downgrading the API via the subscription profile. As described above, the API subscriber can run a compatibility test between two version of the API. The API subscriber can also conveniently review, document, and analyze the revision history of the API through a graphical user interface. Additionally, the API subscriber can also provide feedback to the API publisher (e.g., through a ticketing system in connection with the API registry).

Example 19—Example Computing System Supporting Intelligent API Update

Figure 21:
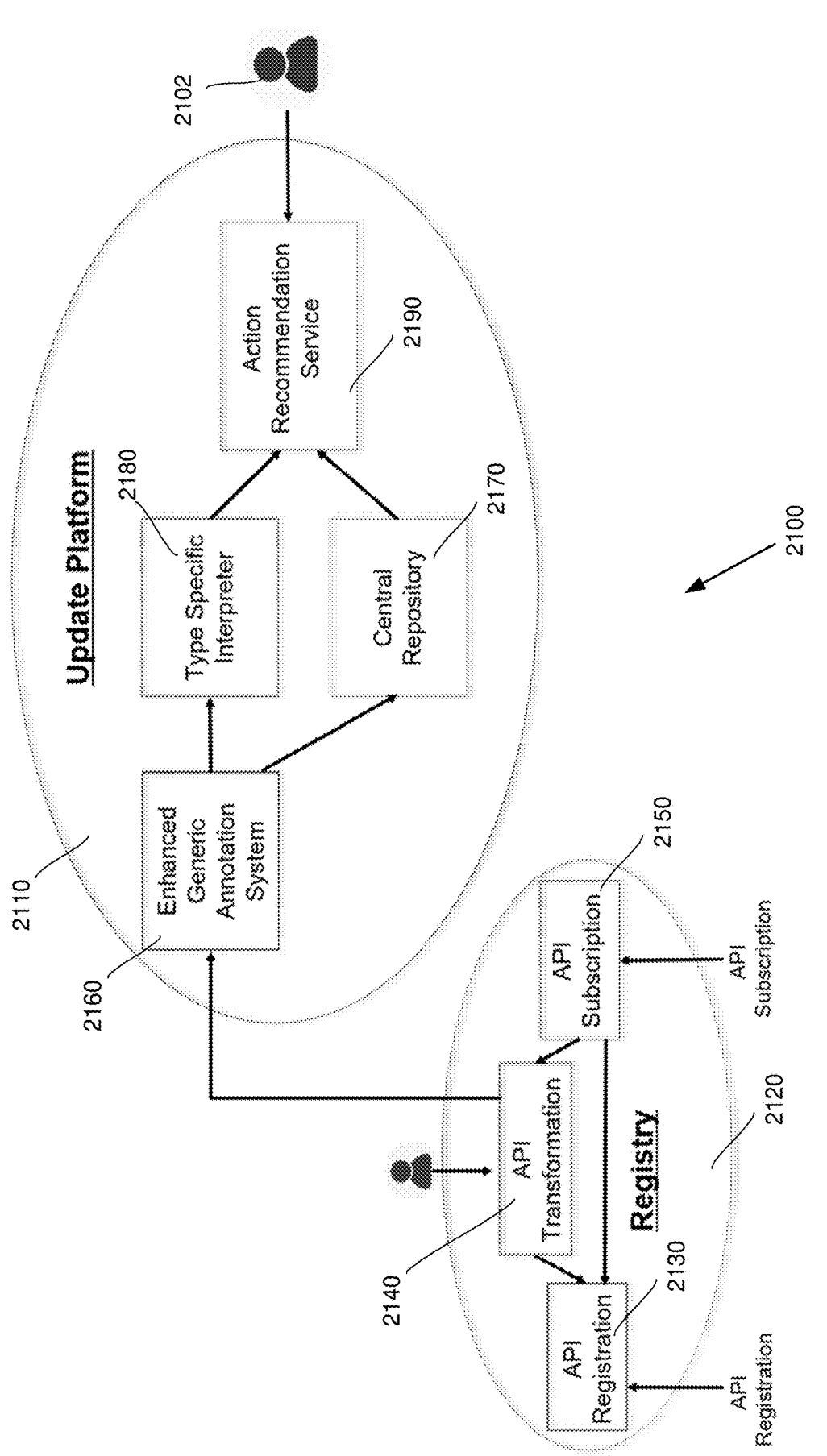
FIG. 21 is an overall block diagram of an example computing system including an API update platform for facilitating intelligent API updates.

FIG. 21 shows an overall block diagram of an example computing system 2100 supporting intelligent API update. The system 2100 includes an API registry 2120 and an update platform 2110. Although the API registry 2120 and the update platform 2110 are depicted as two separate parts in FIG. 21, in some examples, the API registry 2120 and the update platform 2110 can be integrated, as described below.

The API registry 2120 can be similar to the API registry 320 depicted in FIG. 3. For example, the API registry 2120 can include a registration unit 2130, a transformation unit 2140, and a subscription unit 2150. In some examples, the registration unit 2130 can include a knowledge graph storage (similar to the knowledge graph storage 334) which stores a plurality of knowledge graphs representing different versions of APIs, and the transformation unit 2140 can include a transformation storage module (similar to the transformation storage module 344) which stores a plurality of difference graphs representing changes between different versions of APIs.

The update platform 2110 can include an enhanced generic annotation system 2160, a central storage 2170 (also referred to as a central repository), an interpreter platform 2180 (also referred to as a type specific interpreter), and an action recommendation service 2190.

As described further below, the enhanced generic annotation system 2160 allows tenants or users of the update platform 2110 (e.g., API providers, platform administrators, third-party software developers, etc.) to annotate revision edges of one or more difference graphs. Such annotation can include defining standard and/or custom actions for implementing specific API changes represented by the corresponding revision edges. In some examples, the standard actions can be defined based on a generic standard function that is programming language independent. In some examples, the enhanced generic annotation system 2160 can be integrated with the API transformation unit 2140.

The annotations (e.g., the defined standard and/or custom actions) can be stored in a code repository of the central storage 2170. In some examples, the central storage 2170 can be integrated with the knowledge graph storage associated with the registration unit 2130 and the transformation storage module associated with the API transformation unit

2140. In such cases, the central storage 2170 can also store knowledge graphs and difference graphs created by different tenants (e.g., API providers, API consumers, third-party software developers or consultants, etc.).

The interpreter platform 2180 can be configured to interpret the annotations made to the revision edges of the difference graphs. Such interpretation can automatically translate predefined standard and/or custom actions into function packages written in specific programming languages. In some examples, the interpreter platform 2180 also allows some users (e.g., API providers, platform administrators, third-party software developers, etc.) to modify the automatically generated function packages.

An API consumer 2102 can interact with the update platform 2110 to perform intelligent API update. For example, the action recommendation service 2190 can recommend to the API consumer 2102 on what software or function packages to install and implement specific API updates.

Example 20—Example Overall Process and Methods for Intelligent API Update

Figure 22:
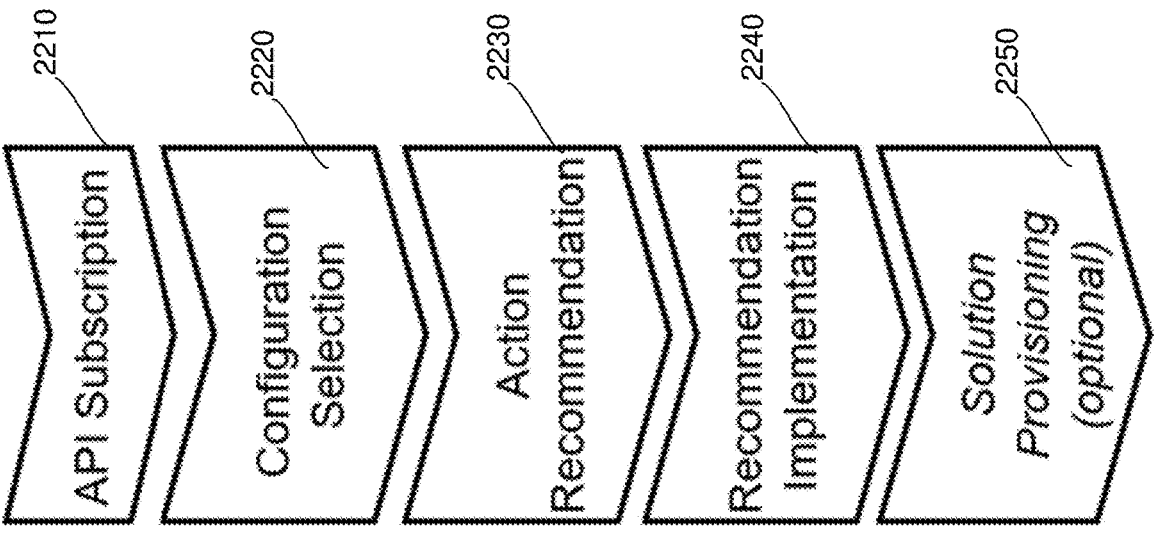
FIG. 22 is an example process flow of performing intelligent API updates.

FIG. 22 is a flow diagram depicting an example process 2200 for performing intelligent API updates.

At 2210, as described above, the API registry can notify a registered API consumer that an API has a newer version and prompt the API consumer to update the API.

At 2220, the API consumer can configure parameters for implementing the API update. For example, the API consumer can select a source version (e.g., the current version of API running on the API consumer's computing system), a target version (e.g., the new version of the API that is available for upgrade), and a target programming language that is used by the API consumer.

At 2230, the update platform can recommend to the API consumer (e.g., via the action recommendation service 2190) what actions to take. In some examples, the update platform can generate a list of change recommendations. For example, the update platform can recommend the API consumer to download an "old API to new API" adapter, and/or download "old API to new API" change source code, etc. In some examples, the "old API to new API" adapter can be configured to retrieve annotations (e.g., the defined standard and/or custom actions) stored in the code repository.

At 2240, the API consumer can use the list of change recommendations as implementation basis for the API update. For example, the API consumer can select and implement some of the recommended actions, e.g., installing the "old API to new API" adapter, reviewing the "old API to new API" change source code, etc. In some examples, installing the "old API to new API" adapter can cause automatic installation of function packages which are written in the target programming language and implement API changes to update the API from the source version to the target version.

Optionally, at 2240, the API consumer can choose to provide his solution for the API update to other API consumers, e.g., by publishing or documenting (e.g., in the central storage 2170) which actions he has taken to implement the API update. In some examples, the information or feedback provided by many API consumers can be pooled, summarized, and analyzed to derive a "wisdom of the crowd," which can be further used by the update platform to generate more intelligent recommendations to future API consumers on how to update the API between different API versions.

FIG. 23 is a flowchart of an example overall method 2300 for performing intelligent API updates, and can be performed, e.g., by the computing system 2100 of FIG. 23.

At 2310, a user (e.g., the API consumer 2102) can specify a source version and a target version of an API and a target programming language (e.g., Java, Python, etc.).

At 2320, a difference graph can be retrieved (e.g., from the central storage 2170 or a transformation storage module). The difference graph can connect a source knowledge graph characterizing the source version of the API to a target knowledge graph characterizing the target version of the API. As described above, the difference graph can include one or more revision edges representing changes of the API between the source version and the target version.

At 2330, one or more function packages written in the target programming language and associated with the one or more revision edges can be installed by the user.

Then, at 2340, the user can run the one or more function packages to update the API from the source version to the target version.

Example 21—Example Enhanced Annotation of Revision Edges in Difference Graphs As described above, a difference graph can include one or more revision edges (e.g., PropertyChange edge, Deleted-Node edge, NewNode edge, etc.) representing API changes between two different versions of the API. Properties of the revision edges can be defined by the ontology of the difference graph. In some examples, the revision edges in the difference graph can be further annotated (e.g., using the enhanced generic annotation system 2160) so that the revision edges can be linked to predefined actions or functions that configured to implement corresponding changes of the API represented by those revision edges.

Figure 24:
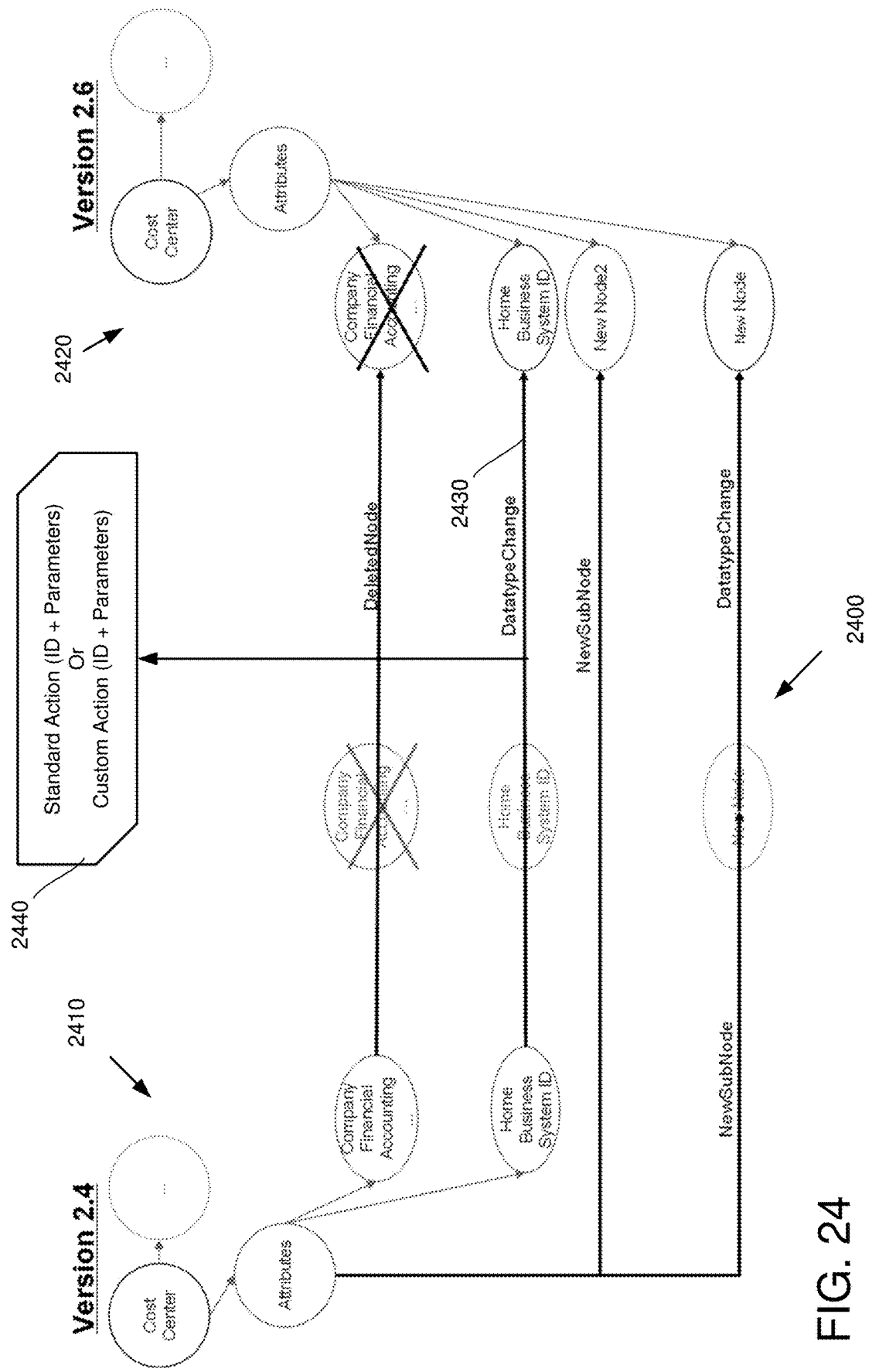
FIG. 24 illustrates annotating a revision edge of an example difference graph.

FIG. 24 illustrates annotating a revision edge of an example difference graph 2400, which includes a plurality of revision edges connecting between a source knowledge graph 2410 representing version 2.4 of an API and a target knowledge graph 2420 representing version 2.6 of the API. For each selected revision edge, e.g., the DatatypeChange edge 2430, an action or function 2440 can be defined and linked to the selected revision edge. As described herein, an action or function refers to a software artifact that can implement the API change represented by the selected revision edge. For example, the action 2440 can be a function configured to change the datatype for the metadata object HomeBusinessSystemID in the depicted example.

For example, the selected revision edge 2430 can be annotated by assigning an API change identifier, an action identifier, and one or more action parameters to the revision edge. The API change identifier can indicate that the API changes from the source version to the target version (e.g., the API change identifier can be a string "API 2.4=>API 2.6" or the like). The action identifier can indicate an action or function 2440 that is defined for the revision edge. The one or more action parameters can specify input to the action or function 2440. Other revision edges can be similarly annotated.

Example 22—Example Standard Actions and Custom Actions

As described herein, one or more standard actions (or standard functions) can be defined for implementing specific changes of the API represented by respective revision edges. In some examples, the standard actions can be language independent.

In some examples, the one or more standard actions can be defined based on a generic standard action (or generic standard function). The generic standard action is a generic representation of the one or more standard actions. For example, the generic standard action can define a variable input type, a variable return type, and a parameter construct for the one or more standard functions. The parameter construct can represent a variable set of parameter names and parameter values that are input parameters of the one or more standard actions. Thus, the generic standard action can be deemed as a generic function based on which the one or more standard actions can be defined.

As an example, FIG. 25 shows a generic standard action 2500 implemented in Java. In this example, the generic standard action 2500 defines a generic method "standardAction" which has two parameters: "InputType" which is a placeholder for the node type in the source API, and "ReturnType" which is a placeholder for the node type in the target API. The generic method "standardAction" also provides a generic construct "Map<String, Object>" which can be used to specify action parameters including parameter names ("String") and corresponding parameter values ("Object"). Notably, FIG. 25 merely shows one of many options of implementing the generic standard action in Java. In typed languages (like Java), a generic representation of the "standardAction" is recommended but not strictly required (which can be implementation specific). In non-typed languages (such as JavaScript or Python), a representation of a generic standard action may be omitted.

As described herein, each standard action can be mapped to two or more target programming languages. To illustrate, let's assume that a standard action for rounding up a value. FIG. 26 depicts two example implementations of such standard action: a function "RoundUpStandardAction" 2610 written in Java, and another function "roundUpStandardAction" 2620 written in Python.

The standard action 2610 is defined based on the generic standard action 2500 described above, where the data type for both the "InputType" and the "ReturnType" are specified to be "double." Notably, the roundup operation does not require additional input parameters. Thus, the generic construct "Map<String, Object>" can be left unspecified in this example. Based on the same generic standard action 2500, other standard actions (e.g., round down, type casting, date conversion, value pass-through, etc.) can be similarly implemented. For some standard actions, the action parameters need to be specified. For example, to implement the standard action for type casting, the generic construct "Map<String, Object>" needs two action parameters to respectively specify a source data type and a target data type.

On the other hand, because Python is a non-typed language, the standard action 2620 can be implemented without a generic representation.

Figure 27:
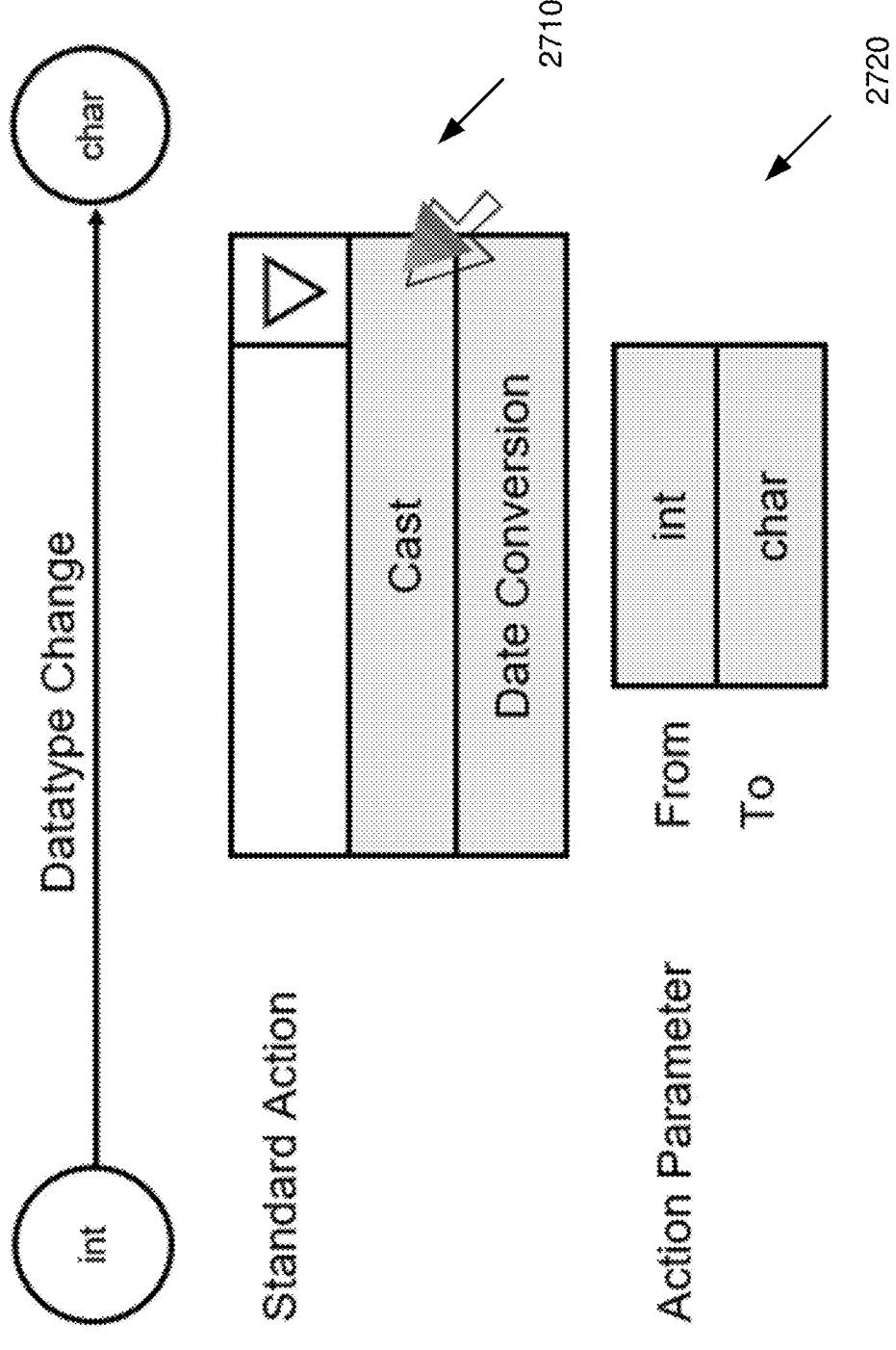
FIG. 27 depicts an example user interface for implementing a standard action.

In some examples, each defined standard action can be persisted via a low-code/no-code user interface, as illustrated in FIG. 27. In this example, a standard action is defined to implement a datatype change from integer to a string (e.g., a standard type casting action which changes data from datatype "int" to datatype "char"). Such standard action can be persisted via a drop-down menu 2710. By selecting the standard action ("Cast" in the depicted example), a sub-menu 2720 can be displayed which shows that the source data type (e.g., from "int") and the target data type (e.g., to "char").

In some examples, the standard actions can be defined by different parties. For example, the API or platform provider can provide multiple standard actions. Any platform tenant such as third-party software developers (also referred to as partners) and/or API consumers can define standard actions. In some examples, the API or platform provider can access the standard actions defined by each tenant. In some examples, standard actions can be moved or shared between tenants (a third-party software developer may ship standard actions to API consumers). Thus, cooperations between different parties is possible. In some examples, third-party software developers may define their own standard actions that are only visible to them and their customers.

In some examples, users (e.g., by API providers, third-party developers, API consumers, etc.) can define custom actions to implement some more complicated transformation functions that may require a detailed source code or low-code/no-code editor. Custom actions are actions not available as a standard menu option in the user interface (e.g., the example depicted in FIG. 27) because they can be specific to a restricted use case. For example, some revision edges can be annotated so that they are linked to custom actions which require more extensive or very specific (non-generic) coding (i.e., availability in only one programming language).

In some examples, a user can define custom actions using default domain specific language (DSL) containing a limited set of operations that are implementable in all programming languages (e.g., addition, subtraction, variable declaration, etc.). The DSL contains basic programming constructs that have interpretations in any programming language. In other examples, if the DSL is not sufficient, a user can create a programming-language-specific custom action that is limited to a previously selected programming target language. As such, the custom action is then only available for this language and may have to be rewritten for other languages.

Some example custom actions can be defined to implement the following functions: shortening of data type (e.g., String 80 to String 50), business relevant changes (e.g., the introduction of new tax parameters), changing the first letter from "D" to "I" and dropping leading zeros, etc. Generally, for each customer action, action parameters may be needed.

Figure 28:
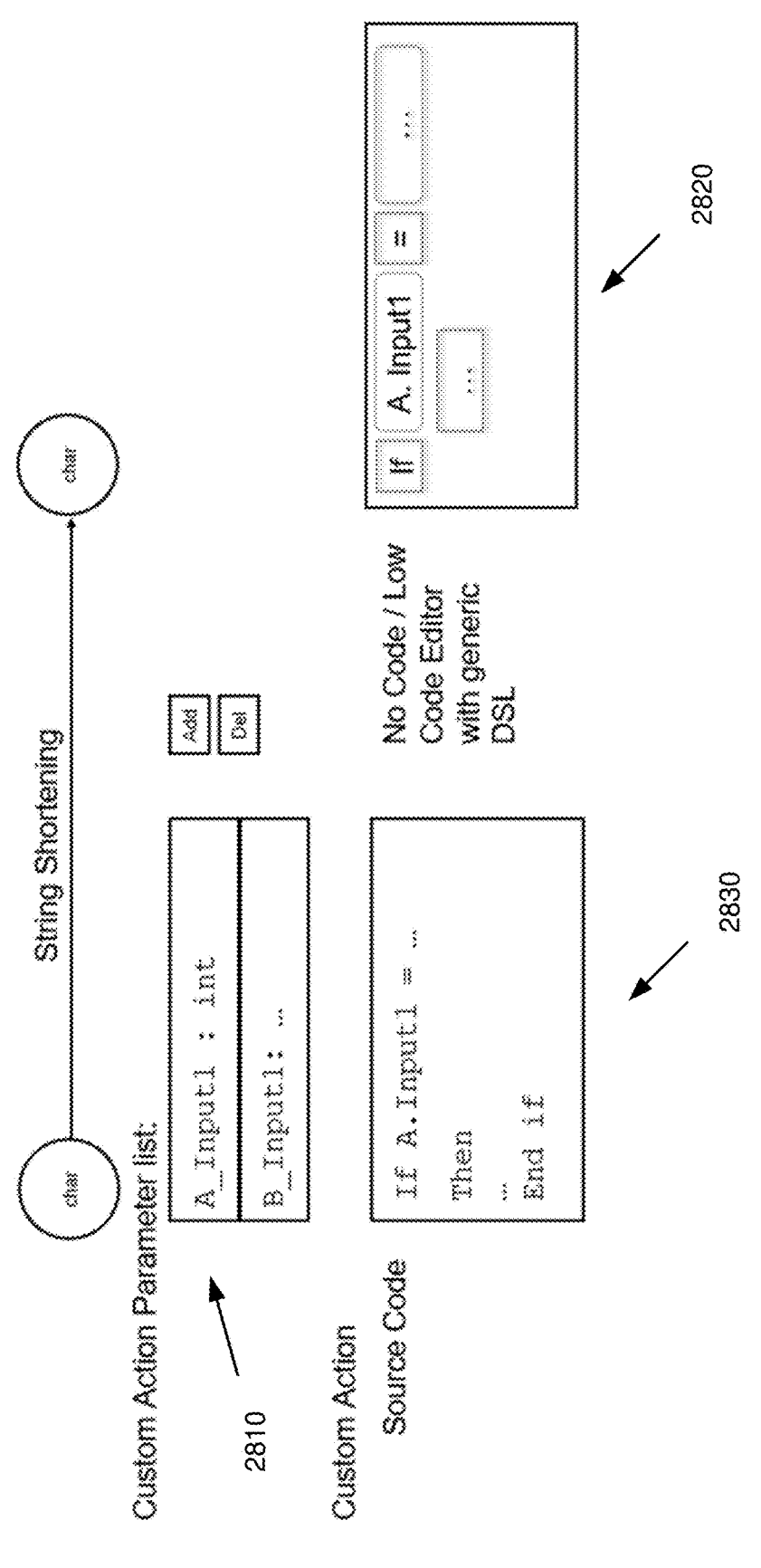
FIG. 28 depicts an example user interface for implementing a custom action.

As an example, FIG. 28 illustrates a user interface for defining a custom action. In this example, the custom action is implemented to shorten a string. Through a parameter list 2810, the user can specify parameters for the custom action (e.g., the parameter A_input1 may indicate the number of characters to be kept in the string after the shortening operation. Through a no code/low code editor 2820, the user can specify high-level operations (e.g., using DSL) to shorten a string. The actual source code 2830 for the string shortening function can be automatically generated based on the user specified high-level operations.

Example 23—Example Language-Specific Function Interpretations

In practical applications, each API consumer can have its own specific system and development landscape. As a result, different API consumers can have different software components and use different programming languages. To further reduce the effort of API upgrade, the annotated revision edges in the difference graph can be interpreted into different programming languages, e.g., Python, C++, Java, etc. Such interpretation can be performed by an interpretation platform 2900 depicted in FIG. 29. For example, the interpretation platform 2900 can receive an annotated difference graph 2910 as input and generate function packages 2960 (also referred to as "reconciliation functions") as output. The function packages 2960 are converted from standard and/or custom actions that are associated with the annotated revision edges in the difference graph 2910 but are written in a specific or target programming language. In other words, the function packages 2960 comprise software codes (written in specific programming languages) for implementing API changes represented by the revision edges in the difference graph 2910. The interpretation platform 2900 can be an example embodiment of the interpreter platform 2180 of FIG. 21.

Figure 29:
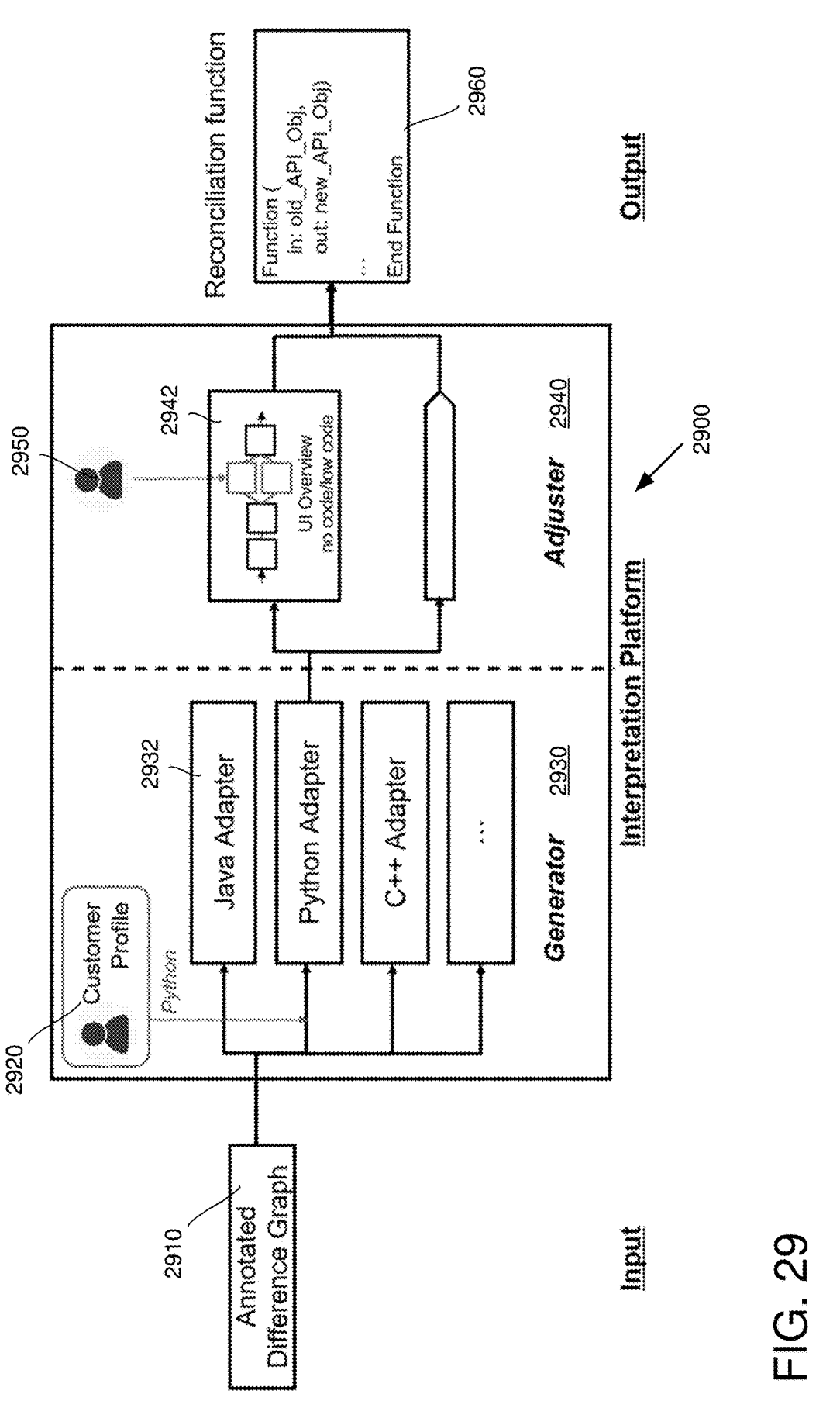
FIG. 29 depicts an example interpretation platform configured for converting a predefined standard or custom action into a function written in a specific programming language.

As shown in FIG. 29, the interpretation platform 2900 can include a function generator 2930 and an adjuster 2940. The function generator 2930 can include a plurality of adapters 2932 (e.g., Java adapter, Python adapter, C++ adapter, etc.), which are configured to translate or convert functions written in one programming language to another programming language. By providing a bridge between the two languages, each adapter 2932 can map the syntax, data types, and constructs of one language to the equivalent elements in another language. Thus, by providing multiple adapters 2932, one standard or customer action can be converted into multiple function packages 2960 written in different programming languages.

In some examples, an API consumer can specify a target programming language in a customer profile 2920, based on which an appropriate adapter 2932 can be selected. For example, if the API consumer specifies Python as the target programming language, the Python adapter can be selected for converting the standard and/or custom actions (which can be written in languages other than Python) associated with the annotated revision edges to function packages 2960 written in Python.

Optionally, a user 2950 (e.g., the API provider, platform administrator, third-party software developer, etc.) can manually modify and/or annotate the software code generated by the adapters 2932 before rolling it out in production. For example, the adjuster 2940 can have a user interface 2942 which provides a no code/low code environment for the user 2950 to review, edit, and/or annotate the software code generated by the adapters 2932.

Example 24—Example Data Storage Platform Supporting Intelligent API Update

Figure 30:
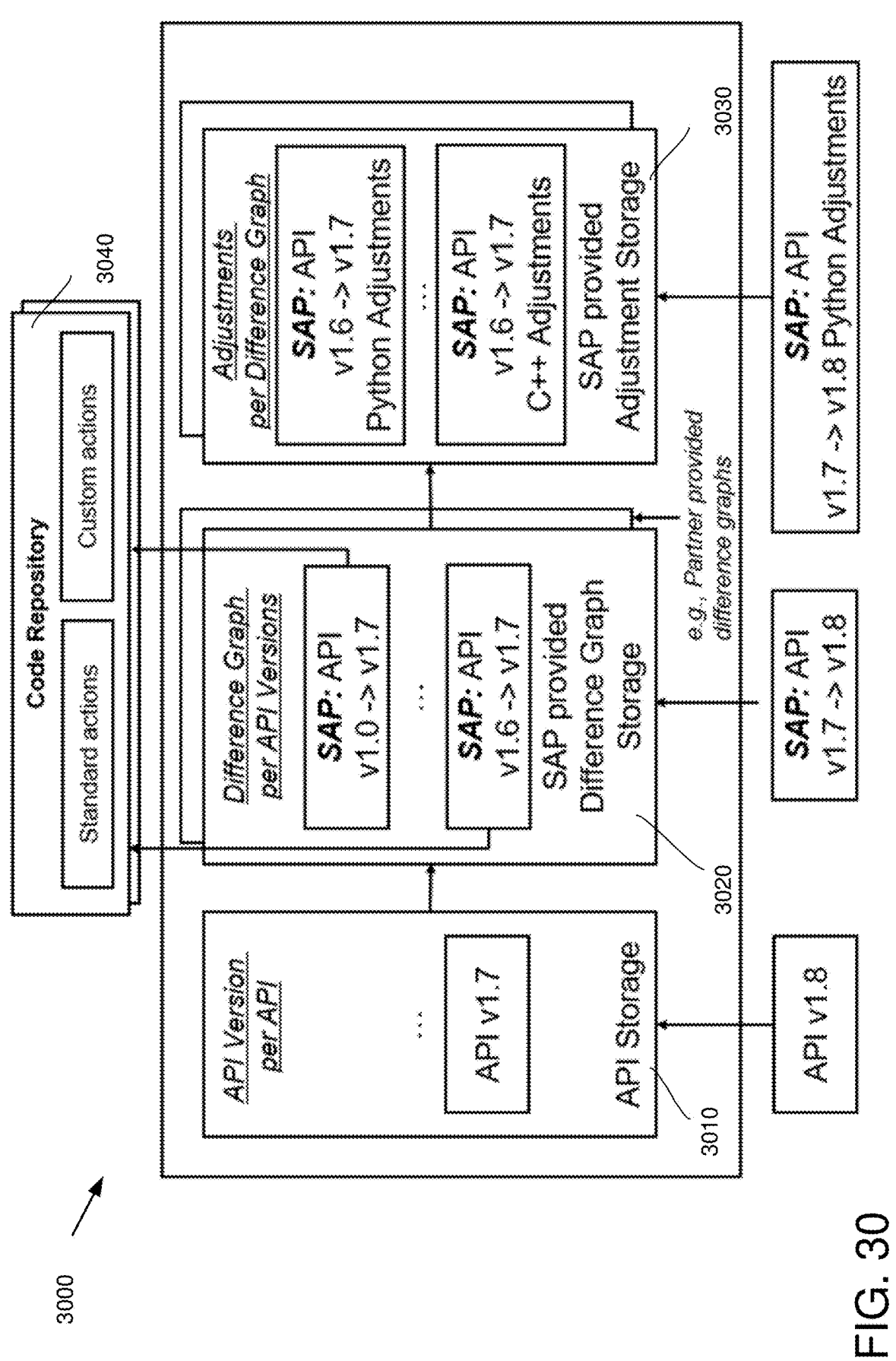
FIG. 30 depicts an example central storage system supporting intelligent API updates.

FIG. 30 depicts an example central storage system 3000 which can be used as a wisdom of the crowd storage supporting intelligent API updates. The central storage system 3000 can be an example of the central storage 2170 depicted in FIG. 21.

As shown, the central storage system 3000 can include an API storage 3010 (similar to the knowledge graph storage 334) configured to store knowledge graphs corresponding to different versions of APIs. The central storage system 3000 also includes a difference graph storage 3020 (similar to the transformation storage module 344) configured to store difference graphs created by various parties (e.g., API providers, API consumers, third-party software developers, etc.). For example, an API provider can provide one set of difference graphs corresponding to a list of API updates, and an API consultant can provide another set of difference graphs corresponding to the same or a different list of API updates.

As described above, the difference graphs can be annotated by defining standard and/or custom actions for implementing specific API changes represented by the corresponding revision edges in the difference graphs. The central storage system 3000 can include a code repository 3040 configured to store standard and/or custom actions that are linked to corresponding revisions edges in the difference graphs. Annotation of the difference graphs can be performed by different parties (e.g., API providers, API consumers, third-party software developers, etc.). As such, the standard and/or custom actions stored in the code repository 3040 can be contributed by different parties. In other words, different parties can offer different solutions for the same API update (e.g., from API version 1.7 to API version 1.8).

Optionally, the central storage system 3000 can also include an adjustment storage 3030 configured to store adjusted difference graphs. Similarly, the adjusted difference graphs can be created by different parties (e.g., API providers, API consumers, third-party software developers, etc.). The adjusted difference graphs can include specific adjustment users made to the difference graphs. In some examples, the adjusted difference graphs include edits and/or annotations users made to the function packages 2960 generated by the adapters 2932, e.g., through the adjuster 2940 of FIG. 29.

Figure 31:
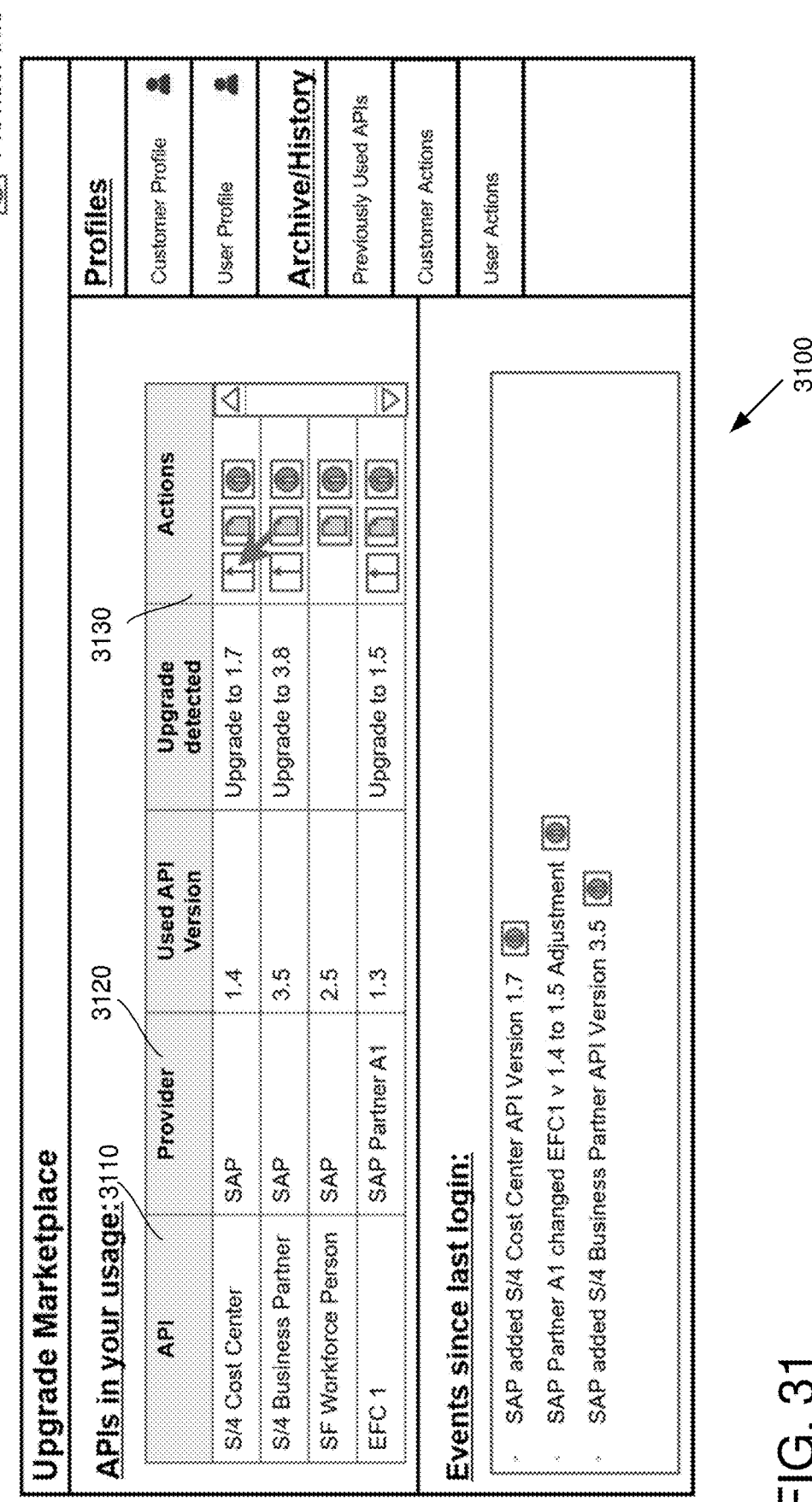
FIG. 31 is an example user interface which displays options for API updates.

Example 25—Example Difference Graph Recommendations for Intelligent API Update FIG. 31 shows an example user interface 3100 through which a user (e.g., an API consumer) can receive notification of available API updates (e.g., through the API registry described above). Further, by scanning the central storage system 3000, the update platform 2110 can display and recommend available solutions 3130 (e.g., with annotated difference graphs) for specific API update 3110 and the list of providers 3120 for the API update solutions. Recommendation of API update solutions can be performed, for example, by the action recommendation service 2190 of FIG. 21.

Figure 32:
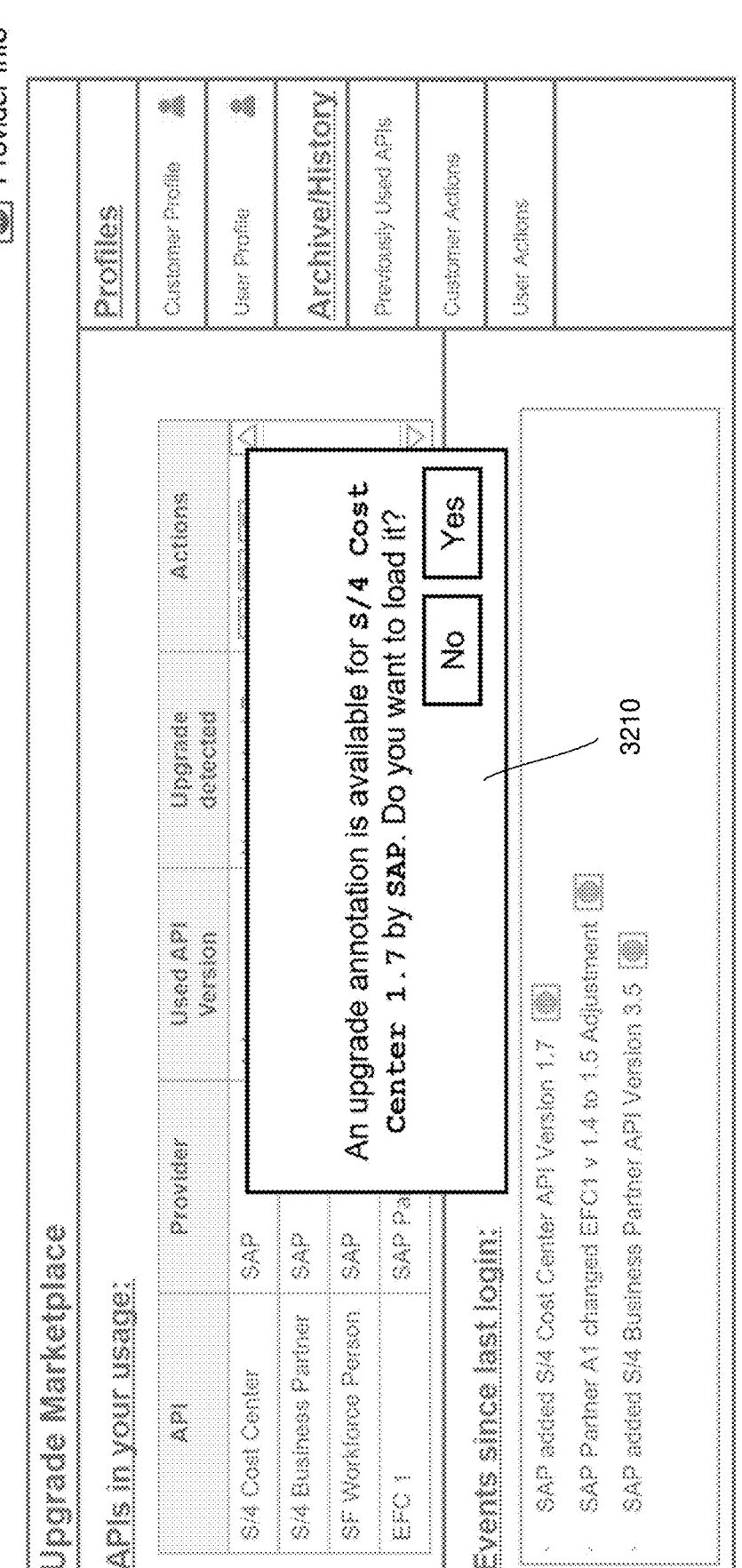
FIG. 32 is an example user interface which prompts a user to update an API.

Additionally, for each listed API update solution, the user is provided with a direct link to take actions to implement the API update. As an example, after the user clicks an arrow button corresponding to a solution provided by SAP to update S/4 Cost Center API from version 1.4 to version 1.7, the user can be presented with a popup window 3210 shown in FIG. 32, asking the user to confirm selecting that API update solution. If the user confirms the selection, the annotated difference graph corresponding to the S/4 Cost Center API update from version 1.4 to version 1.7 can be retrieved from the difference graph storage 3020 and used for updating the S/4 Cost Center API.

In some examples, there can be multiple solutions developed by different parties for implementing the same API update. For examples, third-party developers or API consumers can build their own difference graphs and can publish/provide them via the central storage system 3000 as "unofficial" API update solutions. Other users can use these solutions and vote on them. The vote count can be stored in the central storage system 3000 and used to rank these solutions in user interfaces.

Figure 33:
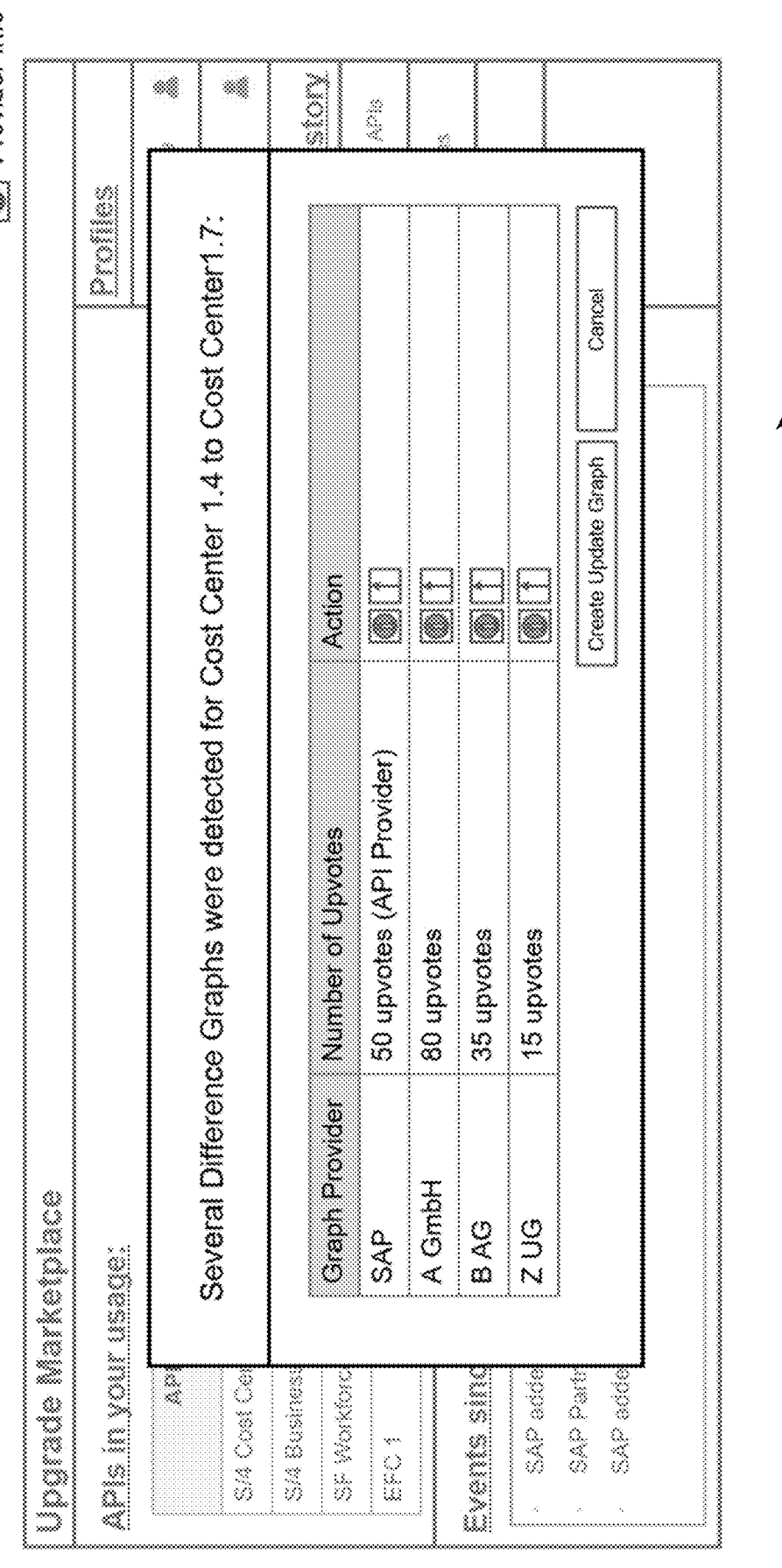
FIG. 33 is an example user interface which provides a ranked list of available difference graphs for updating an API.

As an example, FIG. 33 shows a user interface 3300 which lists four annotated difference graphs that have been respectively created by four different parties for updating the Cost Center API from version 1.4 to version 1.7. Each difference graph can have revision edges that are linked to standard and/or custom actions defined by a corresponding party. The user can select a specific difference graph from the list for implementing the Cost Center API update.

To facilitate the user's selection, the listed difference graphs can be ranked based on counts of user selection (or vote) of the difference graphs to update the API, providers of the difference graphs, or both. For example, FIG. 33 shows that the difference graph provided by SAP has been selected (or voted) by 50 users for the API update and the difference graph provided by A GmbH has been selected (or voted) by 80 users for the API update. The difference graph provided by SAP can be ranked higher than the difference graph provided by A GmbH because SAP is the provider of Cost Center API.

In some circumstances, an API provider may not have uploaded a complete out-of-the-box solution in the central storage system 3000 for every possible API update operation (e.g., the API provider may provide a difference graph for updating an API from version 1.2 to version 1.3, but not for updating the API from version 1.1 to version 1.3). In these situations, the system can still assist the user in updating the API easily by suggesting alternative solutions. For example, the user can select an "unofficial" API update solution provided by a third-party developer.

Figure 34:
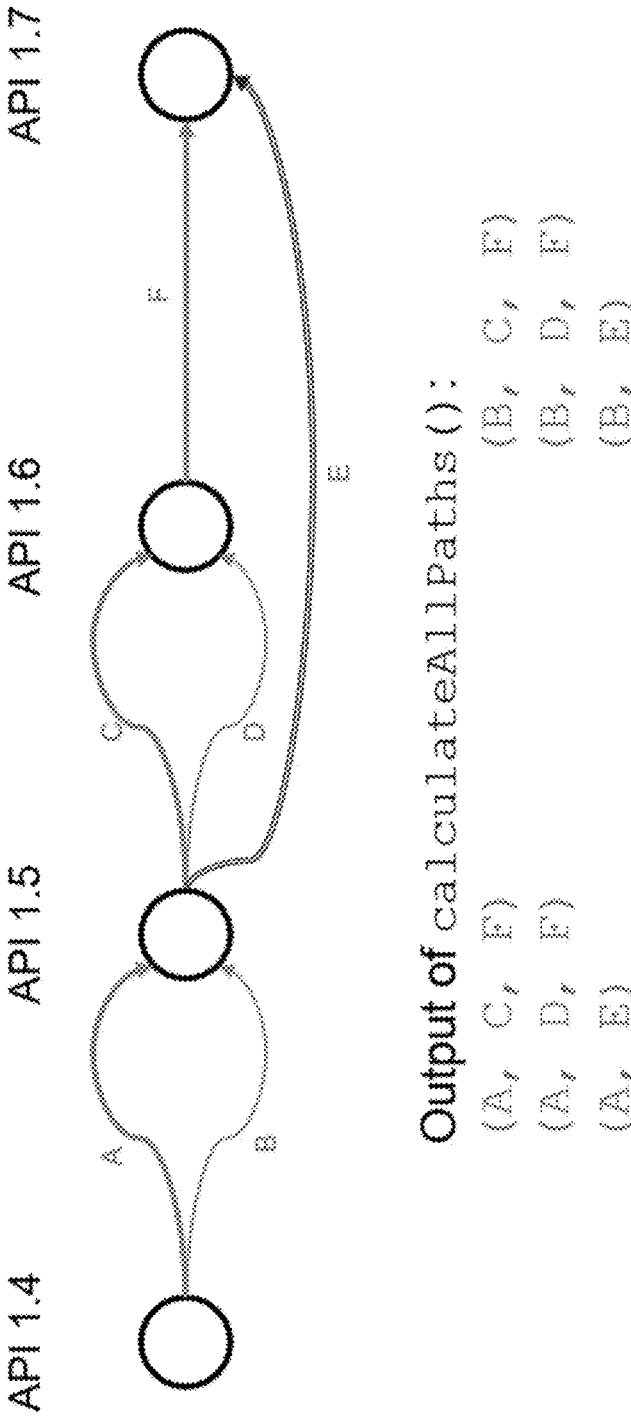
FIG. 34 illustrates different combinations of difference graphs linking knowledge graphs representing different versions of an API.

In some circumstances, a difference graph for a particular API update may not be found in the central storage system 3000. In such cases, the system may assist the user to build the desired difference graph by combining some available difference graphs. An example is shown in FIG. 34, which shows four different versions of an API (e.g., API 1.4, API 1.5, API 1.6, and API 1.7). In this example, no different graph is available for directly updating API 1.4 to API 1.7. However, there are existing difference graphs (also referred to as sub-change graphs) developed by different parties for implementing incremental API updates, such as two sub-change graphs A and B for updating API 1.4 to API 1.5, two sub-change graphs C and D for updating API 1.5 to API 1.6, one sub-change graph E for updating API 1.5 to API 1.7, and one sub-change graph F for updating API 1.6 to API 1.7.

In some examples, a graph algorithm can be applied to calculate all paths of updating API from version 1.4 to version 1.7. For example, the graph algorithm can determine six different paths for updating API 1.4 to API 1.7: (A, C, F), (A, D, F), (A, E), (B, C, F), (B, D, F), and (B, E). For each path, the involved sub-change graphs can be cascaded or combined, as described above with reference to FIGS. 14-15, to generate the desired difference graph for updating API 1.4 to API 1.7. In some examples, different paths generated by the graph algorithm can be ranked based on various criteria, such as the number of sub-change graphs involved in the path (e.g., the shortest path is ranked higher), providers of the sub-change graphs (e.g., some providers may be ranked higher and some providers may be black-listed), number of user votes for the sub-change graphs, programming language availability, etc.

Figure 35:
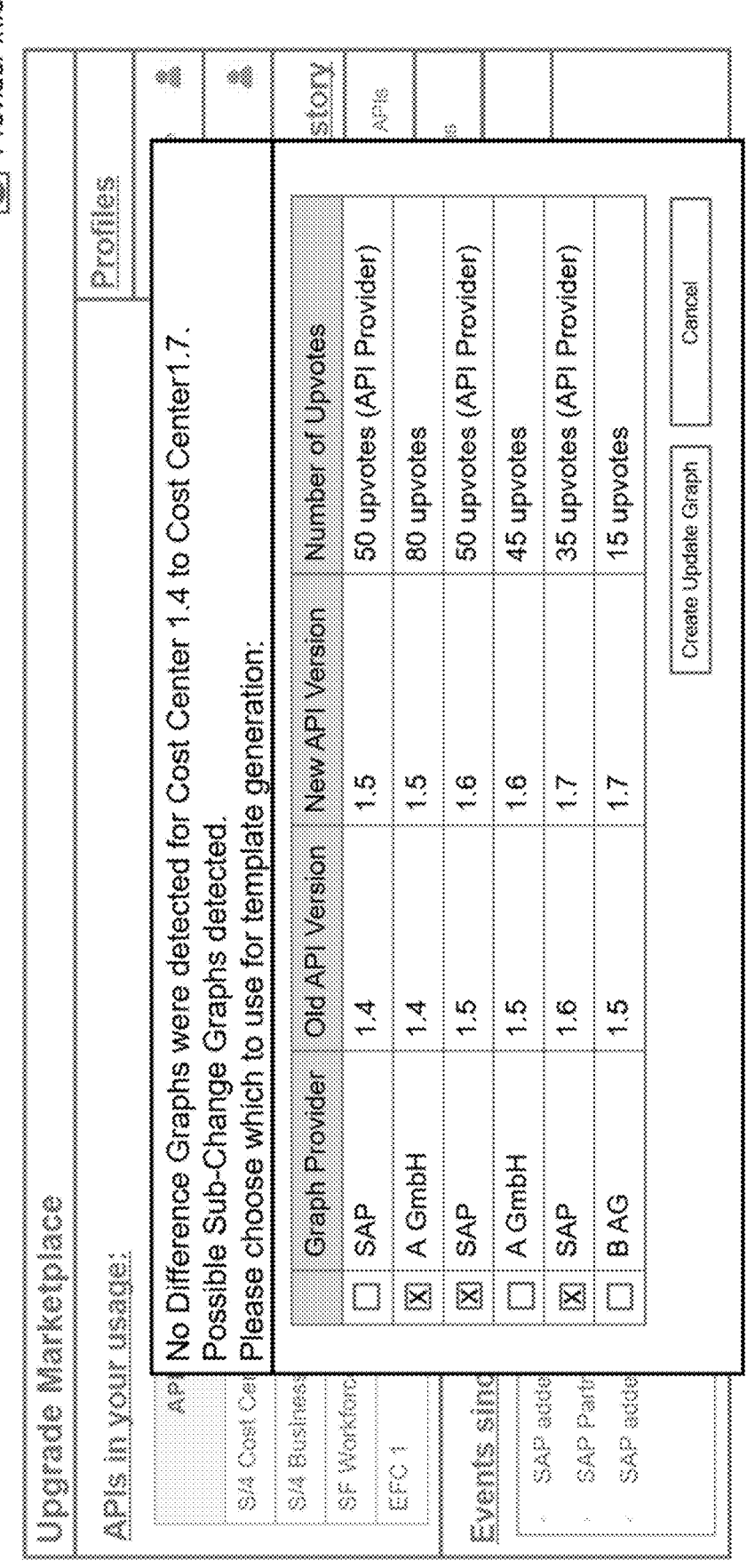
FIG. 35 is an example user interface which provides a ranked list of available sub-change graphs which can be combined to generate a desired difference graph.

For example, FIG. 35 shows a user interface 3500 which provides a list of available sub-change graphs which can be combined to generate a desired difference graph for updating the Cost Center API from version 1.4 to version 1.7. The available sub-change graphs can be ranked, e.g., based on the provider and/or number of received votes, etc. In this example, the user can select three sub-change graphs (API 1.4 to API 1.5 provided by A GmbH, API 1.5 to API 1.6 provided by SAP, and API 1.6 to API 1.7 provided by SAP) to build the difference graph for updating API 1.4 to API 1.7.

Example 26—Example Action Recommendations for Intelligent API Update

After a user selects (or builds) an annotated difference graph for an API update, the standard and/or custom actions associated with the revision edges of the annotated difference graph can be retrieved from the code repository. As described above, the retrieved standard and/or custom actions can be automatically converted (e.g., by the interpretation platform 2900) to corresponding function packages written in a target programming language specified by the user. The converted function packages can then be installed and executed on the user's system to update the API.

An annotated difference graph can have many revision edges. In some examples, not all revision edges are annotated by the provider of the difference graph. For example, standard actions for certain revision edges may be missing in an annotated difference graph. In such cases, recommendation can be provided to the user to choose appropriate standard actions for those revision edges. Recommendation of actions for revision edges can be performed, for example, by the action recommendation service 2190 of FIG. 21.

In some examples, a crowd proposal approach can be used to recommend standard actions for revision edges that are not annotated in a difference graph. Specifically, the action recommendation service can search the central storage system to find other standard actions that can implement API changes represented by an unannotated revision edge.

For example, let's assume that a revision edge representing metadata object "BusinessPartnerID" change in a difference graph A representing Cost Center API update between versions 1.4 and 1.7 is note annotated (i.e., has no linked standard action). The same "BusinessPartnerID" change may be represented by an annotated revision edge in another difference graph B representing Cost Center API update between versions 1.4 and 1.6 (note: the providers of the difference graphs A and B may be the same or different). In such a case, a standard action linked to the annotated revision edge in the difference graph B can be recommended to the user. In other words, if another user annotated "BusinessPartnerID" change between API versions 1.4 and 1.6, this annotated change can also be used for updating the API version from 1.4 to 1.7 if the change operation (revision edge) and the involved metadata object are identical.

As another example, let's assume that the metadata object "BusinessPartnerID" change is a specific type change (e.g., from INT to CHAR). If the specific type change is also represented by other annotated revision edges in one or more difference graphs (which can represent the same API update or a different API update), then standard actions linked to those annotated revision edges can also be recommended to the user. For example, if a revision edge representing another metadata object "HomeSystemID" change also represents the same type change, then the standard action used to implement "HomeSystemID" change can also be used implement the "BusinessPartnerID" change because the underlying operations (e.g., type change) is the same.

In some examples, the crowd proposal approach described above can be implemented in a waterfall model so that the recommended actions can be prioritized or given different weights. For example, actions annotated for the same change operations (revision edges) for the same metadata object in the same API but with different update versions can be given a higher priority than actions annotated for the same change operations (revision edges) for a different metadata object in the same API (with the same or different update versions). As another example, actions annotated for the same change operations (revision edges) for a different metadata object in the same API can be given a higher priority than actions annotated for the same change operations (revision edges) for a different metadata object in a different API.

In case the crowd proposal approach described above does not find any actions stored in the central storage system can perform the same change operations for an unannotated revision edge, the action recommendation service can propose default actions, which are predefined or hard-coded proposals for certain default situations. For example, the default action for a datatype change from CHAR(10) to CHAR(20) can be an empty function (i.e., do nothing); the default action for a datatype change from INT to DOUBLE can be a predefined standard function CAST(int, double). In other words, change operations for unannotated revision edges can be mapped to some default or predefined standard actions.

Figure 36:
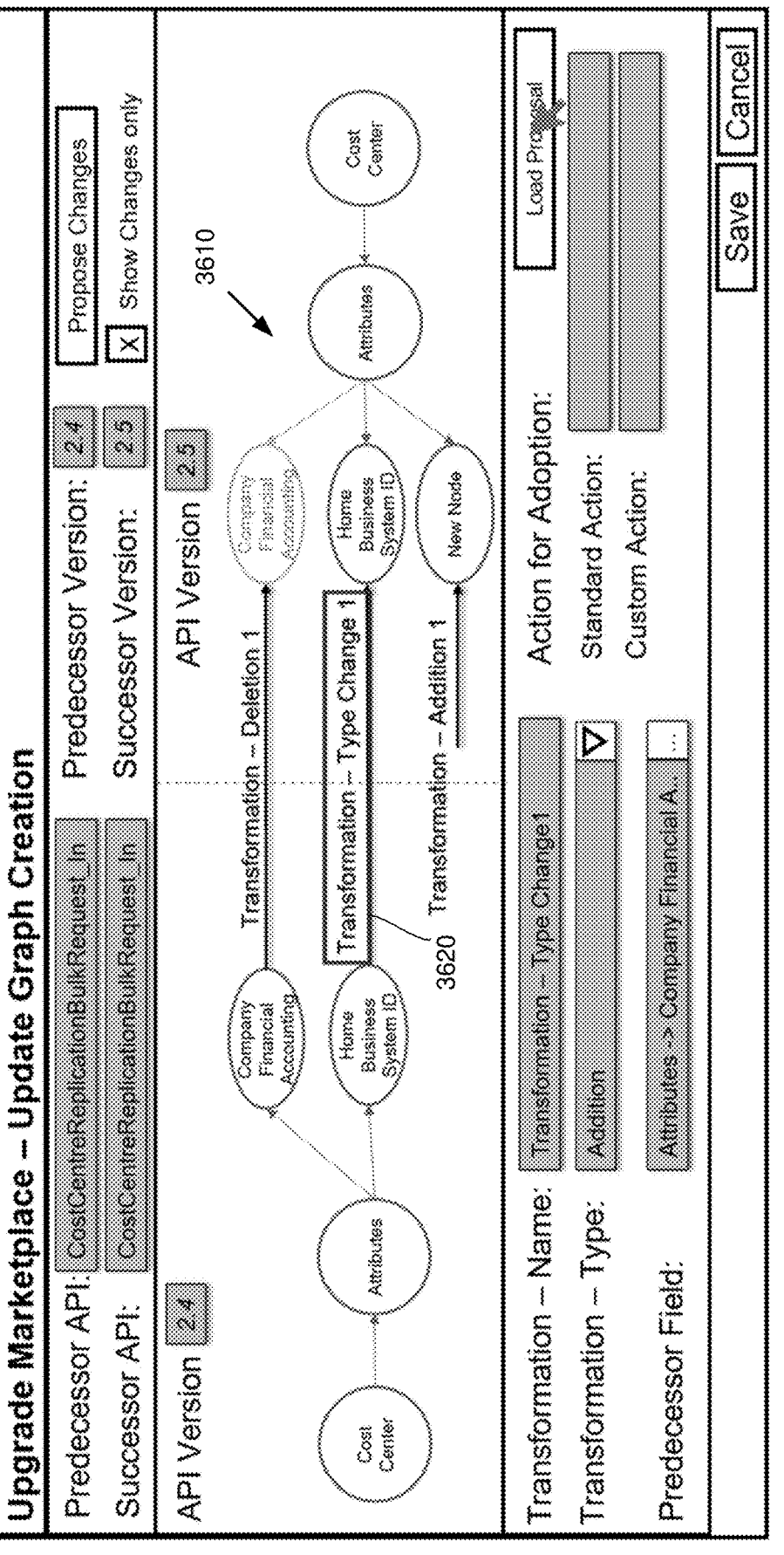
FIG. 36 is an example user interface which allows a user to find crowd proposals for implementing a change of an API represented by a revision edge of a difference graph.

FIG. 36 is an example user interface 3600 which shows a difference graph 3610 selected by a user. Similar to the user interface 1800 of FIG. 18, the user interface 3600 can display all revision edges 3620 (and related information) of the difference graph 3610. Different from the user interface 1800, the user interface 3600 provides additional controls which allow a user to select actions for implementing API changes corresponding to the revision edges 3620. Specifically, for each selected revision edge 3620, the update platform 2110 can recommend actions for implementing specific API changes represented by the selected revision edge 3620.

Figure 37:
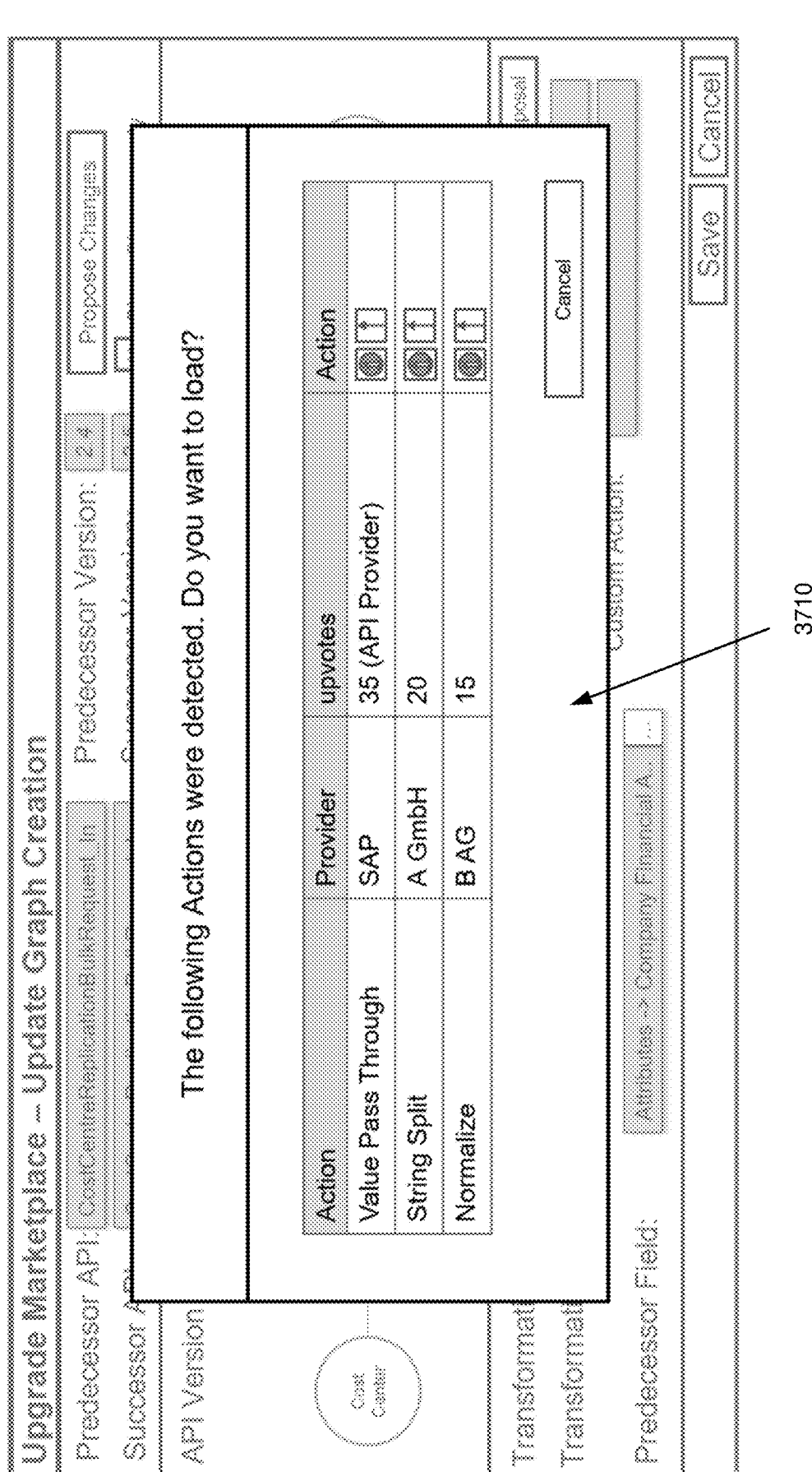
FIG. 37 is an example user interface which provides a ranked list of available actions that were designed to implement an API change.

For example, after the user selects a revision edge "Transformation—Type Change 1," the user can click the button "Load Proposal" to view a list of recommended standard actions that can implement the type change corresponding to the selected revision edge, as shown in the popup window 3710 of FIG. 37. The list of recommended standard actions shown in FIG. 37 can be generated based on the crowd proposal approach described above. In this example, the update platform found that three standard actions defined by three different providers are available for the user to download and install. For each recommended standard action, the number of download (or vote) by other users can also be displayed. To facilitate the user to decide which action to install, the list of available actions can be ranked based on counts of user download, providers of the action, or both.

Figure 38:
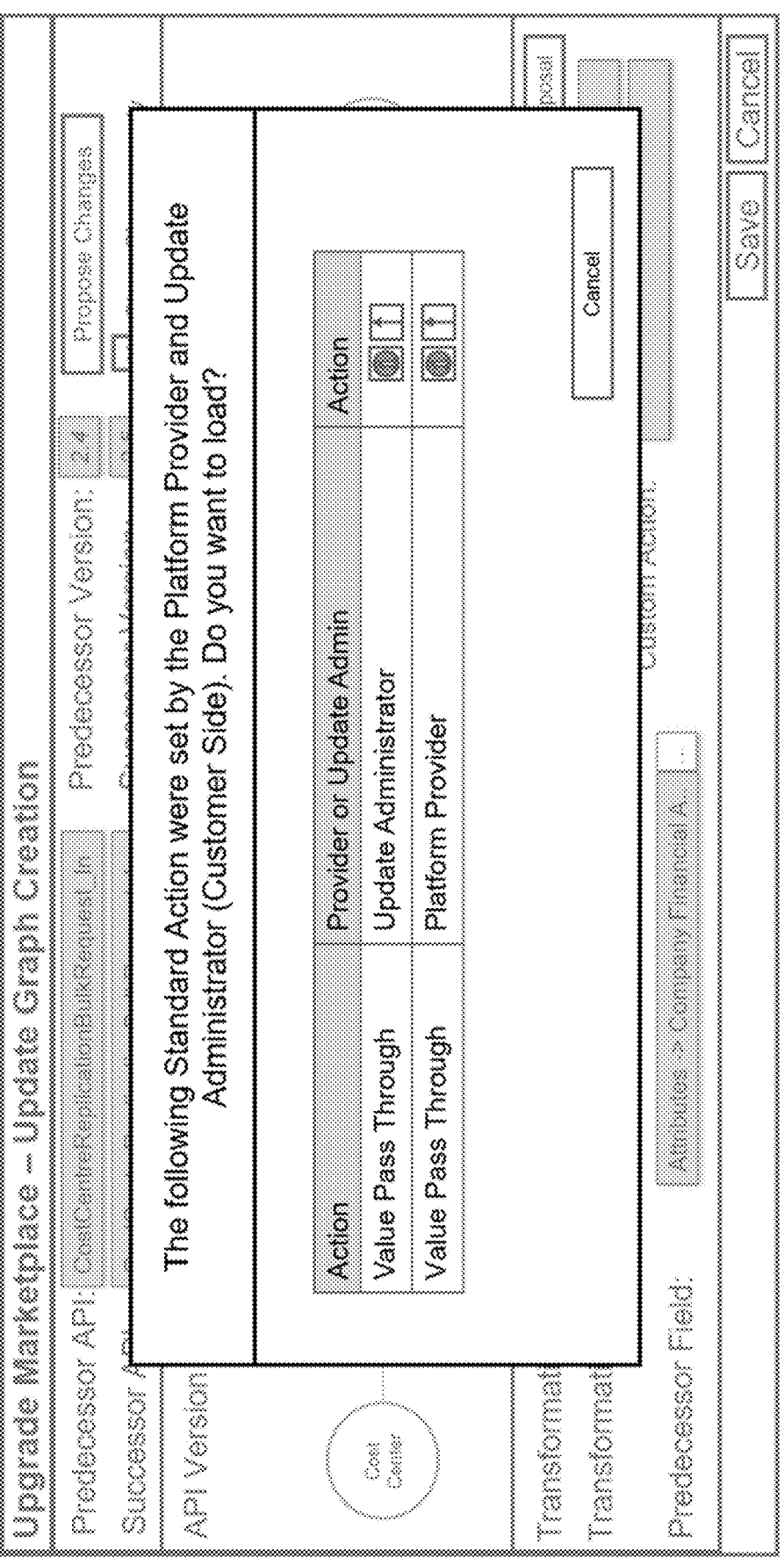
FIG. 38 is an example user interface which provides a ranked list of available actions that are deemed as potential candidates for implementing an API change.
Figure 39:
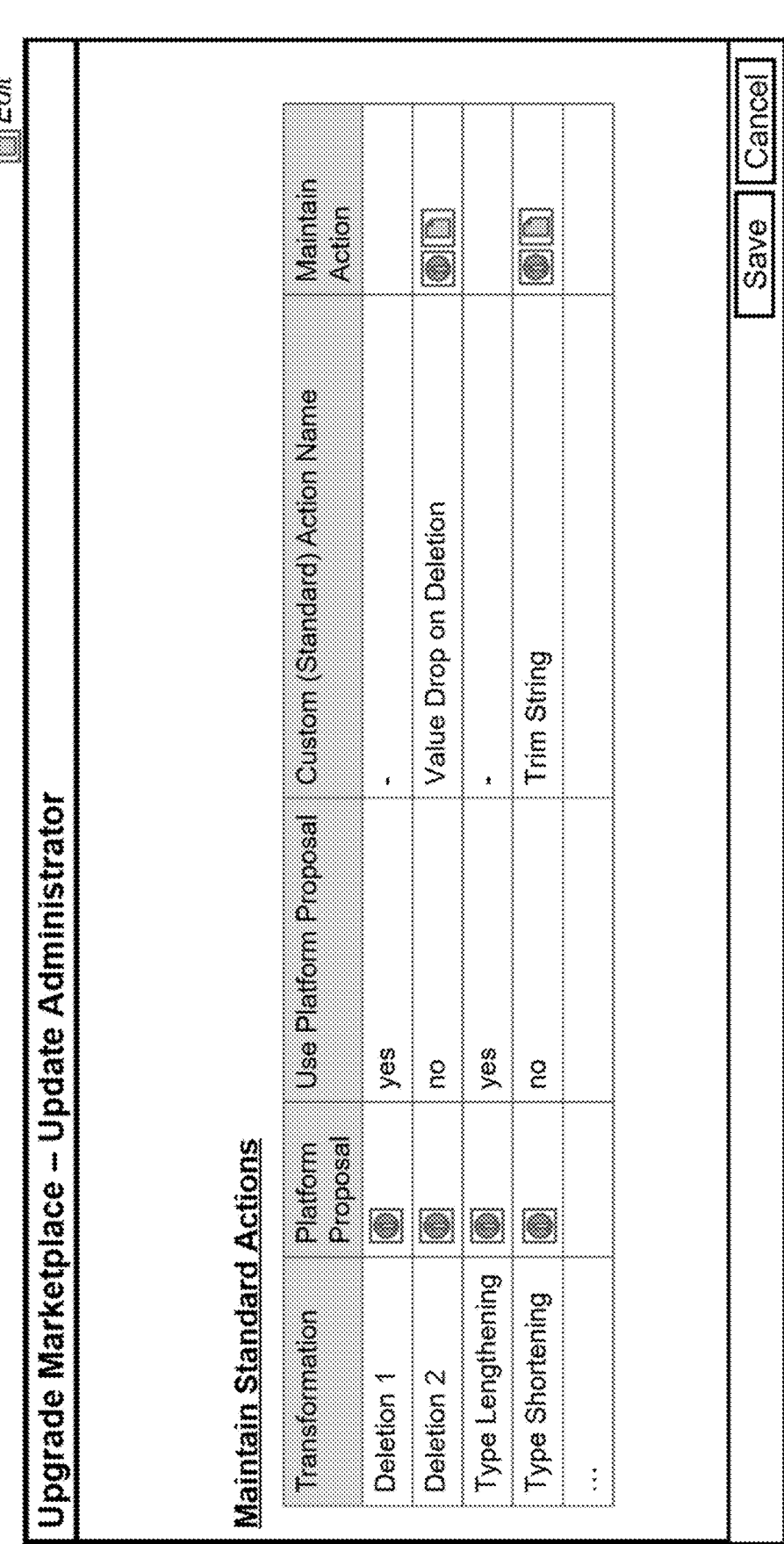
FIG. 39 is an example user interface which provides a list of default actions that can be used implement predefined API changes.

FIG. 38 shows an example user interface which shows default actions for unannotated revision edges representing value pass-through operations and predefined by the provider and/or administrator of the update platform (in case the crowd proposal approach described above does not find any actions defined by tenants of the update platform can perform the same value pass-through operation). As illustrated in another example user interface shown in FIG. 39, the provider or administrator of the update platform can maintain a library of default actions (e.g., adding, editing, or deleting default actions). Additionally, the provider or administrator of the update platform can configure conditions for recommending default actions to users (e.g., the configuration may allow default actions to be recommended to the users along with other actions found by the crowd proposal approach).

Example 27—Example Advantages

A number of advantages can be achieved via the technology described herein.

In one aspect, compared to conventional API change management techniques, the knowledge graph representation of APIs described herein is technology-agnostic because the knowledge graph representations of the APIs have a generic ontology that is applicable to all APIs, regardless of the programming languages used in the APIs and/or adapters used to document the APIs.

In another aspect, compared to conventional text-based API specification documents, the knowledge graph representation of APIs can provide a conceptually easier-to-understand visualization of the structure of the APIs, including hierarchical relationship between different metadata objects embedded in the APIs.

In another aspect, using the difference graphs, changes between different versions (e.g., reflected by the revisions edges) of an API can be easily and intuitively identified. The difference graphs can be cascaded to show incremental revision history between each pair of consecutive versions of the API, and/or merged to show consolidated changes between two versions of the API that are separated by many intermediate versions of the API.

In yet another aspect, a user of the API, by subscribing the API registry and creating a customized subscription profile, can receive immediate notifications of API changes that are of interests to the user (as defined by the subscription profile). The user will not be bothered to receive notifications for API changes that are not relevant to the user (e.g., the API changes that are outside the scope of the subscription profile).

In still another aspect, by analyzing subscription profiles, an API provider can quantitatively determine how many users are using an API, and even how many users are actively using a particular metadata object within the API. The API provider can also determine the impact of changing the API. Such analysis can guide the API provider's decision-making process for API development, release, and/or support strategies.

In a further aspect, a user of the API, by subscribing to the API registry and creating a customized subscription profile, can run simulations to assess the effects of upgrading or downgrading the API (without actually performing the API upgrade or downgrade) according to the user's subscription profile. Thus, the user can effectively estimate the effort to be invested in API version management projects.

Furthermore, a user of the API not only can receive timely notification of relevant API changes, but also can easily implement those API changes, even if the user does not have programming skills or technical expertise on the API. Using the update platform described herein, the difference graphs can be annotated by linking revision edges to standard and/or custom actions which can implement corresponding API changes represented by those revision edges. Additionally, each tenant of the update platform can publish or provide its own solutions (e.g., annotated difference graphs) for different API updates. For each specific API update, the update platform can provide a list of available solutions and rank those solutions based on predefined criteria. Thus, the user of the API can simply select a solution from the list to self-implement the API update. Specifically, after the user selects a specific solution, the standard and/or custom actions associated with the annotated difference graph can be automatically retrieved. The retrieved actions can also be automatically converted to function packages written in a target programming language specified by the user. These function packages can then be installed on the user's computing system to complete the API update. Moreover, even in situations where the difference graphs are not completed annotated (e.g., some revision edges may not be linked to predefined actions), the update platform can use the wisdom of the crowd (e.g., by searching the central storage system) to recommend appropriate actions for those unannotated revision edges.

Example 28—Example Computing Systems

Figure 40:
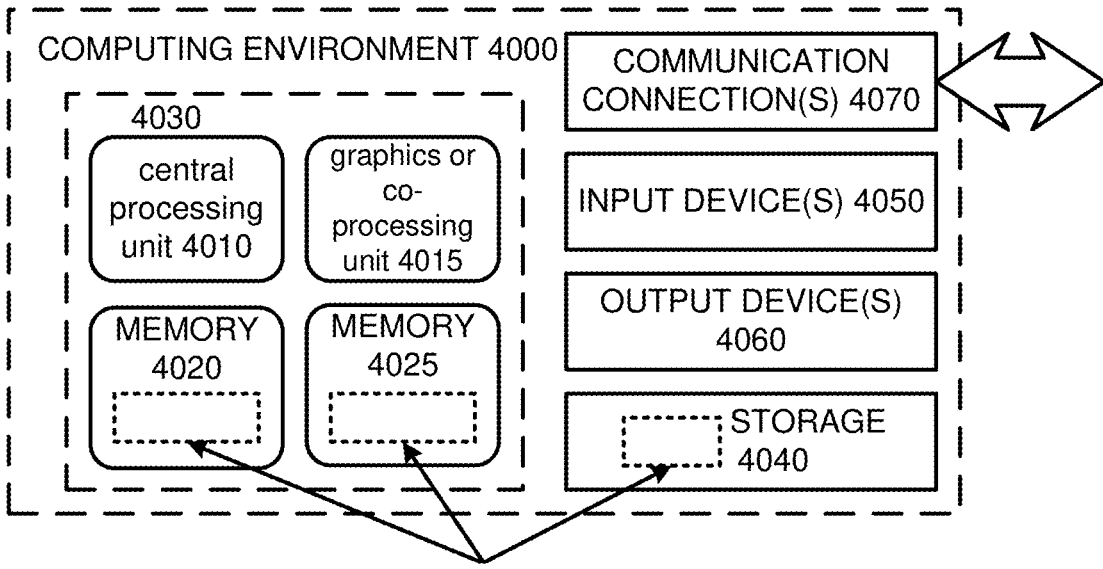
FIG. 40 is a block diagram of an example computing system in which described technologies can be implemented.

FIG. 40 depicts an example of a suitable computing system 4000 in which the described innovations can be implemented. The computing system 4000 is not intended to suggest any limitation as to scope of use or functionality of the present disclosure, as the innovations can be implemented in diverse computing systems.

With reference to FIG. 40, the computing system 4000 includes one or more processing units 4010, 4015 and memory 4020, 4025. In FIG. 40, this basic configuration 4030 is included within a dashed line. The processing units 4010, 4015 can execute computer-executable instructions, such as for implementing the methods 600, 1000, 1100, 2300, etc., described in the examples herein. A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 40 shows a central processing unit 4010 as well as a graphics processing unit or co-processing unit 4015. The tangible memory 4020, 4025 can be volatile memory (e.g., registers, cache, RAM), non-volatile memory (e.g., ROM, EEPROM, flash memory, etc.), or some combination of the two, accessible by the processing unit(s) 4010, 4015. The memory 4020, 4025 can store software 4080 implementing one or more innovations described herein, in the form of computer-executable instructions suitable for execution by the processing unit(s) 4010, 4015.

A computing system 4000 can have additional features. For example, the computing system 4000 can include storage 4040, one or more input devices 4050, one or more output devices 4060, and one or more communication connections 4070, including input devices, output devices, and communication connections for interacting with a user. An interconnection mechanism (not shown) such as a bus, controller, or network can interconnect the components of the computing system 4000. Typically, operating system software (not shown) can provide an operating environment for other software executing in the computing system 4000, and coordinate activities of the components of the computing system 4000.

The tangible storage 4040 can be removable or non-removable, and includes magnetic disks, magnetic tapes or cassettes, CD-ROMs, DVDs, or any other medium which can be used to store information in a non-transitory way and which can be accessed within the computing system 4000. The storage 4040 can store instructions for the software 280 implementing one or more innovations described herein.

The input device(s) 4050 can be an input device such as a keyboard, mouse, pen, or trackball, a voice input device, a scanning device, touch device (e.g., touchpad, display, or the like) or another device that provides input to the computing system 4000. The output device(s) 4060 can be a display, printer, speaker, CD-writer, or another device that provides output from the computing system 4000.

The communication connection(s) 4070 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 29—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 30—Example Cloud Computing Environment

Figure 41:
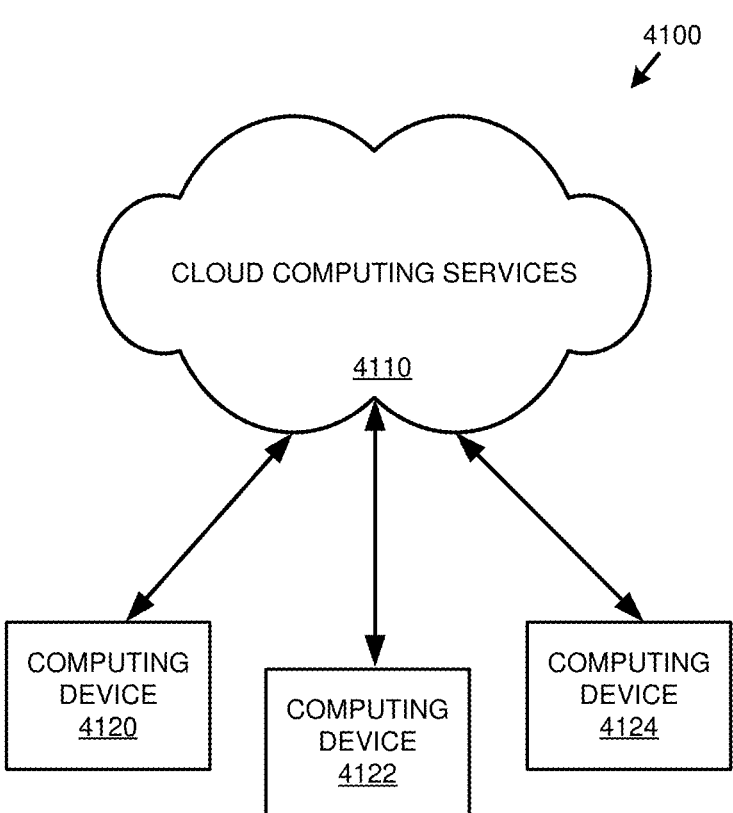
FIG. 41 is a block diagram of an example cloud computing environment that can be used in conjunction with the technologies described herein.

FIG. 41 depicts an example cloud computing environment 4100 in which the described technologies can be implemented, including, e.g., the system disclosed above and other systems herein. The cloud computing environment 4100 can include cloud computing services 4110. The cloud computing services 4110 can comprise various types of cloud computing resources, such as computer servers, data storage repositories, networking resources, etc. The cloud computing services 4110 can be centrally located (e.g., provided by a data center of a business or organization) or distributed (e.g., provided by various computing resources located at different locations, such as different data centers and/or located in different cities or countries).

The cloud computing services 4110 can be utilized by various types of computing devices (e.g., client computing devices), such as computing devices 4120, 4122, and 4123. For example, the computing devices (e.g., 4120, 4122, and 4124) can be computers (e.g., desktop or laptop computers), mobile devices (e.g., tablet computers or smart phones), or other types of computing devices. For example, the computing devices (e.g., 4120, 4122, and 4124) can utilize the cloud computing services 4110 to perform computing operations (e.g., data processing, data storage, and the like).

In practice, cloud-based, on-premises-based, or hybrid scenarios can be supported.

Example 31—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 32—Example Embodiments

Any of the following example embodiments can be implemented.

Example 1. A computer-implemented method comprising: specifying a source version and a target version of an application programming interface (API) and a target programming language; retrieving a difference graph connecting from a source knowledge graph characterizing the source version of the API to a target knowledge graph characterizing the target version of the API, wherein the difference graph comprises one or more revision edges representing changes of the API between the source version and the target version; installing one or more function packages written in the target programming language and associated with the one or more revision edges; and running the one or more function packages to update the API from the source version to the target version.

Example 2. The method of example 1, further comprising deriving the one or more function packages from one or more standard functions linked to the one or more revision edges, wherein the one or more standard functions are written in a language other than the target programming language.

Example 3. The method of example 2, further comprising defining the one or more standard functions for implementing the changes of the API represented by the respective revision edges.

Example 4. The method of example 3, wherein the one or more standard functions are defined based on a generic standard action, wherein the generic standard action defines a variable input type, a variable return type, and a parameter construct for the one or more standard functions, wherein the parameter construct represents a variable set of parameter names and parameter values that are input parameters of the one or more standard functions.

Example 5. The method of any one of examples 2-4, further comprising annotating the one or more revision edges, wherein the annotating comprises assigning an API change identifier, an action identifier, and one or more action parameters to at least one revision edge, wherein the API change identifier indicates the API changes from the source version to the target version, the action change identifier indicates the API changes from the source version to the target version, the action identifier indicates a standard function for the at least one revision edge, and the one or more action parameters specify input to the standard function.

Example 6. The method of any one of examples 2-5, wherein the installing comprises retrieving the one or more standard functions from a code repository.

Example 7. The method of any one of examples 2-6, further comprising: for a selected revision edge, generating a list of available standard functions suitable for implementing a change of the API represented by the selected revision edge; and selecting, from the list of available standard functions, a target standard function, wherein the installing comprises downloading the target standard function.

Example 8. The method of example 7, further comprising ranking the list of available standard functions based on counts of user download of the available standard functions, providers of the available standard functions, or both.

Example 9. The method of any one of examples 1-8, wherein the retrieved difference graph is selected from multiple difference graphs connecting from the source knowledge graph to the target knowledge graph, wherein the multiple difference graphs comprise respective revision edges, wherein the multiple difference graphs are ranked based on counts of user selection of the multiple difference graphs to update the API, providers of the multiple difference graphs, or both.

Example 10. The method of any one of examples 1-9, wherein at least one of the function packages is configured to change a datatype of a metadata object from the source version of the API to the target version of the API.

Example 11. A computing system comprising: memory; one or more hardware processors coupled to the memory; and one or more computer readable storage media storing instructions that, when loaded into the memory, cause the one or more hardware processors to perform operations comprising: specifying a source version and a target version of an application programming interface (API) and a target programming language; retrieving a difference graph connecting from a source knowledge graph characterizing the source version of the API to a target knowledge graph characterizing the target version of the API, wherein the difference graph comprises one or more revision edges representing changes of the API between the source version and the target version; installing one or more function packages written in the target programming language and associated with the one or more revision edges; and running the one or more function packages to update the API from the source version to the target version.

Example 12. The system of example 11, wherein the operations further comprise deriving the one or more function packages from one or more standard functions linked to the one or more revision edges, wherein the one or more standard functions are written in a language other than the target programming language.

Example 13. The system of example 12, wherein the operations further comprise defining the one or more standard functions for implementing the changes of the API represented by the respective revision edges.

Example 14. The system of any one of examples 12-13, wherein the operations further comprise annotating the one or more revision edges, wherein the annotating comprises assigning an API change identifier, an action identifier, and one or more action parameters to at least one revision edge, wherein the API change identifier indicates the API changes from the source version to the target version, the action identifier indicates a standard function for the at least one revision edge, and the one or more action parameters specify input to the standard function.

Example 15. The system of any one of examples 12-14, wherein the installing comprises retrieving the one or more standard functions from a code repository.

Example 16. The system of any one of examples 12-15, wherein the operations further comprise: for a selected revision edge, generating a list of available standard functions suitable for implementing a change of the API represented by the selected revision edge; and selecting, from the list of available standard functions, a target standard function, wherein the installing comprises downloading the target standard function.

Example 17. The system of example 16, wherein the operations further comprise ranking the list of available standard functions based on counts of user download of the available standard functions, providers of the available standard functions, or both.

Example 18. The system of any one of examples 11-17, wherein the retrieved difference graph is selected from multiple difference graphs connecting from the source knowledge graph to the target knowledge graph, wherein the multiple difference graphs comprise respective revision edges, wherein the multiple difference graphs are ranked based on counts of user selection of the multiple difference graphs to update the API, providers of the multiple difference graphs, or both.

Example 19. The system of any one of examples 11-18, wherein at least one of the function packages is configured to change a datatype of a metadata object from the source version of the API to the target version of the API.

Example 20. One or more non-transitory computer-readable media having encoded thereon computer-executable instructions causing one or more processors to perform a method comprising: specifying a source version and a target version of an application programming interface (API) and a target programming language; retrieving a difference graph connecting from a source knowledge graph characterizing the source version of the API to a target knowledge graph characterizing the target version of the API, wherein the difference graph comprises one or more revision edges representing changes of the API between the source version and the target version; installing one or more function packages written in the target programming language and associated with the one or more revision edges; and running the one or more function packages to update the API from the source version to the target version, wherein at least one of the function packages is configured to change a datatype of a metadata object from the source version of the API to the target version of the API.

Example 33—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
   receiving a source version and a target version of an application programming interface (API) and a target programming language specified by a user;
   automatically retrieving a difference graph from a difference graph storage, wherein the difference graph connects a source knowledge graph characterizing the source version of the API to a target knowledge graph characterizing the target version of the API,
   wherein the source knowledge graph and the target knowledge graph respectively comprise a plurality of nodes representing metadata objects or data values associated with corresponding versions of the API and a plurality of edges connecting the plurality of nodes, wherein the plurality of edges define a hierarchical relationship between the metadata objects or data values represented by the plurality of nodes,
   wherein the difference graph comprises one or more revision edges, wherein each revision edge connects a source node in the source knowledge graph to a target node in the target knowledge graph, and represents a change from a metadata object or data value represented by the source node to a metadata object or data value represented by the target node when comparing between the source version and the target version of the API;
   installing one or more function packages written in the target programming language and associated with the one or more revision edges; and
   running the one or more function packages to update the API from the source version to the target version.

2. The method of claim 1, further comprising deriving the one or more function packages from one or more standard functions linked to the one or more revision edges, wherein the one or more standard functions are written in a language other than the target programming language.

3. The method of claim 2, further comprising presenting the difference graph including the one or more revision edges on a graphical user interface; and providing, via the graphical user interface, a list of recommended standard functions corresponding to at least one of the revision edges.

4. The method of claim 2, wherein the one or more standard functions are defined based on a generic standard action, wherein the generic standard action defines a variable input type, a variable return type, and a parameter construct for the one or more standard functions, wherein the parameter construct represents a variable set of parameter names and parameter values that are input parameters of the one or more standard functions.

5. The method of claim 2, wherein the one or more revision edges has an associated annotation comprising an assigned API change identifier, an assigned action identifier, and one or more assigned action parameters, wherein the API change identifier indicates changes of the API from the source version to the target version, the action identifier indicates a standard function for at least one revision edge, and the one or more action parameters specify input to the standard function.

6. The method of claim 2, wherein the installing comprises retrieving the one or more standard functions from a code repository associated with the difference graph storage.

7. The method of claim 2, further comprising:
   for a selected revision edge, generating a list of available standard functions suitable for implementing a change of the API from the source version to the target version represented by the selected revision edge; and receiving a selection, from the list of available standard functions, a target standard function, wherein the installing comprises downloading the target standard function.

8. The method of claim 7, further comprising ranking the list of available standard functions based on counts of user download of the available standard functions, providers of the available standard functions, or both.

9. The method of claim 1, wherein the retrieved difference graph is selected from multiple difference graphs connecting from the source knowledge graph to the target knowledge graph, wherein the multiple difference graphs comprise respective revision edges, wherein the multiple difference graphs are ranked based on counts of user selection of the multiple difference graphs to update the API, providers of the multiple difference graphs, or both.

10. The method of claim 1, wherein at least one of the function packages is configured to change a datatype of one of the metadata objects from the source version of the API to the target version of the API.

11. A computing system comprising:
memory;
one or more hardware processors coupled to the memory; and
one or more computer readable storage media storing instructions that, when loaded into the memory, cause the one or more hardware processors to perform operations comprising:
receiving a source version and a target version of an application programming interface (API) and a target programming language specified by a user;
automatically retrieving a difference graph from a difference graph storage, wherein the difference graph connects a source knowledge graph characterizing the source version of the API to a target knowledge graph characterizing the target version of the API,
wherein the source knowledge graph and the target knowledge graph respectively comprise a plurality of nodes representing metadata objects or data values associated with corresponding versions of the API and a plurality of edges connecting the plurality of nodes, wherein the plurality of edges define a hierarchical relationship between the metadata objects or data values represented by the plurality of nodes,
wherein the difference graph comprises one or more revision edges, wherein each revision edge connects a source node in the source knowledge graph to a target node in the target knowledge graph, and represents a change from a metadata object or data value represented by the source node to a metadata object or data value represented by the target node when comparing between the source version and the target version of the API;
installing one or more function packages written in the target programming language and associated with the one or more revision edges; and
running the one or more function packages to update the API from the source version to the target version.

12. The system of claim 11, wherein the operations further comprise deriving the one or more function packages from one or more standard functions linked to the one or more revision edges, wherein the one or more standard functions are written in a language other than the target programming language.

13. The system of claim 12, wherein the operations further comprise presenting the difference graph including the one or more revision edges on a graphical user interface; and providing, via the graphical user interface, a list of recommended standard functions corresponding to at least one of the revision edges.

14. The system of claim 12, wherein the one or more revision edges has an associate annotation, an assigned API change identifier, an assigned action identifier, and one or more assigned action parameters, wherein the API change identifier indicates changes of the API from the source version to the target version, the action identifier indicates a standard function for at least one revision edge, and the one or more action parameters specify input to the standard function.

15. The system of claim 12, wherein the installing comprises retrieving the one or more standard functions from a code repository associated with the difference graph storage.

16. The system of claim 12, wherein the operations further comprise:
for a selected revision edge, generating a list of available standard functions suitable for implementing a change of the API from the source version to the target version represented by the selected revision edge; and
receiving a selection, from the list of available standard functions, a target standard function,
wherein the installing comprises downloading the target standard function.

17. The system of claim 16, wherein the operations further comprise ranking the list of available standard functions based on counts of user download of the available standard functions, providers of the available standard functions, or both.

18. The system of claim 11, wherein the retrieved difference graph is selected from multiple difference graphs connecting from the source knowledge graph to the target knowledge graph, wherein the multiple difference graphs comprise respective revision edges, wherein the multiple difference graphs are ranked based on counts of user selection of the multiple difference graphs to update the API, providers of the multiple difference graphs, or both.

19. The system of claim 11, wherein at least one of the function packages is configured to change a datatype of one of the metadata objects from the source version of the API to the target version of the API.

20. One or more non-transitory computer-readable media having encoded thereon computer-executable instructions causing one or more processors to perform a method comprising:
receiving a source version and a target version of an application programming interface (API) and a target programming language specified by a user;
automatically retrieving a difference graph from a difference graph storage, wherein the difference graph connects a source knowledge graph characterizing the source version of the API to a target knowledge graph characterizing the target version of the API,
wherein the source knowledge graph and the target knowledge graph respectively comprise a plurality of nodes representing metadata objects or data values associated with corresponding versions of the API and a plurality of edges connecting the plurality of nodes, wherein the plurality of edges define a hierarchical relationship between the metadata objects or data values represented by the plurality of nodes,
wherein the difference graph comprises one or more revision edges, wherein each revision edge connects a source node in the source knowledge graph to a target node in the target knowledge graph, and represents a change from a metadata object or data value represented by the source node to a metadata object or data value represented by the target node when comparing between the source version and the target version of the API;

installing one or more function packages written in the target programming language and associated with the one or more revision edges; and running the one or more function packages to update the API from the source version to the target version, wherein at least one of the function packages is configured to change a datatype of one of the metadata objects from the source version of the API to the target version of the API.

* * * * *